United States Patent [19]

Discount et al.

[11] Patent Number: 6,012,066

[45] Date of Patent: Jan. 4, 2000

[54] COMPUTERIZED WORK FLOW SYSTEM

[75] Inventors: Alan Discount, Plymouth; Tony Tong, Minneapolis, both of Minn.

[73] Assignee: Vallon, Inc., Minneapolis, Minn.

[21] Appl. No.: 08/942,401

[22] Filed: Oct. 1, 1997

[51] Int. Cl.[7] .................................................. G06F 17/30
[52] U.S. Cl. ............................................................ 707/103
[58] Field of Search ............................................. 707/103

[56] References Cited

U.S. PATENT DOCUMENTS

| | | | |
|---|---|---|---|
| 3,736,409 | 5/1973 | Boyan | 235/61.6 R |
| 4,827,411 | 5/1989 | Arrowood et al. | 370/432 |
| 4,839,829 | 6/1989 | Freedman | 345/329 |
| 4,965,772 | 10/1990 | Daniel et al. | 395/200.54 |
| 5,140,537 | 8/1992 | Tullis | 364/578 |
| 5,182,705 | 1/1993 | Barr et al. | 364/401 |
| 5,208,748 | 5/1993 | Flores et al. | 364/419 |
| 5,216,603 | 6/1993 | Flores et al. | 364/419 |
| 5,233,513 | 8/1993 | Doyle | 354/401 |
| 5,249,120 | 9/1993 | Foley | 364/401 |
| 5,301,320 | 4/1994 | McAtee et al. | 705/9 |
| 5,319,543 | 6/1994 | Wilhelm | 364/401 |
| 5,325,527 | 6/1994 | Cwikowski et al. | 395/200.52 |
| 5,555,244 | 9/1996 | Gupta et al. | 370/397 |
| 5,630,069 | 5/1997 | Flores et al. | 395/207 |
| 5,717,860 | 2/1998 | Graber et al. | 395/200.57 |
| 5,721,913 | 2/1998 | Ackroff et al. | 707/103 |
| 5,774,670 | 6/1998 | Montulli | 395/200.57 |
| 5,778,377 | 7/1998 | Marlin et al. | 707/103 |
| 5,784,562 | 7/1998 | Diener | 395/200.47 |
| 5,793,972 | 8/1998 | Shane | 395/200.49 |
| 5,799,063 | 8/1998 | Krane | 395/200.49 |
| 5,799,297 | 8/1998 | Goodridge et al. | 707/1 |
| 5,848,393 | 12/1998 | Goodridge et al. | 705/8 |

*Primary Examiner*—Paul R. Lintz
*Assistant Examiner*—Ella Colbert
*Attorney, Agent, or Firm*—Schwegman, Lundberg, Woessner & Kluth, P.A.

[57] ABSTRACT

A computerized work flow system and computerized web site generation are disclosed. In one embodiment of the invention, a computerized system includes a work flow server. The server instantiates a process having a plurality of activities, and tracks completion of the plurality of activities as each activity is independently performed. In another embodiment, the work flow server comprises a web application server that receives Internet world-wide-web site orders. The web application server tracks the performance of the orders such that each activity within a work flow of activities is assignable for independent completion by different individuals.

18 Claims, 79 Drawing Sheets

| | Order Form I: Put Your Printed Piece on the Web |
|---|---|
| 1 | Tell us about your company.<br>Company name .......................... Contact name ...........<br>Address 1 ............................... Phone number ...........<br>Address 2 ............................... Fax number .............<br>City/State/Zip ........................... E-mail address ......... |
| 2 | Choose the characteristics of your Website.     <u>Fill in appropriate retail price</u><br>*Check one of the options below to "Put your printed piece on the web".*<br>☐ Resume (01001#) .................................................. _____<br>☐ Brochure or flyer 1-sided (#01101) ................................ _____<br>☐ Brochure or flyer 2-sided (#01201) ................................ _____<br>☐ Other .............# of pages ............(#01301) .............. _____<br>    Less 10% discount for content on disk (must comply with requirements listed<br>      on back) ....................................................... [\_\_\_\_]<br>    Do you want your artwork/disk returned? ☐ No ☐ Yes<br>      ($9.95 shipping/handling fee) (#04011) ......................... _____<br>Subtotal 1 ............................................................ _____ |
| 3 | Select a Hosting Plan.<br>*Check one of the two Hosting Plans below, unless "Customer Waiver" is specified.*<br>☐ Hosting Plan A. Monthly plan for resumes only (#02001)<br>    #months ..... × $ ...../month = ................................ _____<br>    Enter a choice for common domain name: www.netpropulsion.net/ .........<br>☐ Hosting Plan B. Annual plan for flyers and brochures with first month free<br>    (#02101) ....................................................... _____<br>    Enter a choice for common domain name: www.netpropulsion.net/ .........<br>☐ Customer Waiver (#02601). For when customer is a) hosting website<br>    themselves or b) hosting by a third party vendor.<br>Service provider ...................... Contact name ...........<br>Phone number ........................ E-mail address .........<br>Has an account been established?<br>☐ Yes ☐ No              Account Number ........<br>URL ................................. Website IP address ...... |
| 4 | Figure the total cost.<br>Subtotal 2 ............................................................ _____<br>    Applicable sales tax ..................................... (+) _____<br>Grand Total ........................................................... _____<br>    Deposit received ......................................... (−) _____<br>Balance ............................................................... _____ |

*Please read "Terms and Conditions" on the back of this form before signing. By submitting content for use in your website you represent that you have the right to have those photos, artwork and copy reproduced. Do not submit content that you do not own the copyright for without written permission from the original owner for your own protection. By signing your acceptance below, you agree that you have read and agree to the terms and conditions on the reverse side of this order form.*

Authorized customer signature ............ Print name ........... Date .....

| FOR DEALER USE ONLY: Dealer name .............. Account number .......... |
|---|
|                               Contact name ............. Phone number .......... |

PPO-1/15/97                 Page 1 of 2

FIG. 5A

Guidelines for Submitting Content

In General

Be sure to complete and submit all applicable information as requested. Please use a Net Propulsion mailer envelope to ensure the safe shipment of your order and the related materials. Please complete a "Disk Information Form" to submit your content digitally.

"Put Your Printed Piece on the Web"

Websites for the "Put Your Printed Piece on the Web" package will be exact replicas of your printed materials. Please submit all artwork actual size. No scaling, cropping, rotating or editing is necessary. Please supply content as camera ready artwork or on disk. If submitting content on disk, please complete a disk information form.

Camera Ready Artwork

Camera ready artwork includes any black ink on white paper artwork that is crisp and clean. Photostats and Mechanicals are preferred. The following does not qualify as camera ready artwork: faxes, photocopies, printed halftones/tints, pencil sketches and blue ink print. It is preferred that finely detailed artwork and small or tin type be supplied on disk instead of hard copy to ensure quality reproductions.

Terms and Conditions

*Please review these terms and conditions prior to signing the customer acceptance area on the front of this order form.*

Order Placement

All orders must be either mailed or sent electronically to Net Propulsion for fulfillment. Production schedules quoted do not take into account the time it takes in transit for the website content to get to Net Propulsion. A completed copy of the Net Propulsion order form must accompany all orders. Similarly, all required content (customer supplied logos, copy, photos, etc.) must be sent in at time of order placement. Do not ship orders with incomplete content, as it will result in the delay of production of the final website.

Shipping Charges

All supplied content materials will be kept on file at Net Propulsion for approximately 6 months. Materials will not be returned to the dealer or their client unless requested at time of website purchase. Shipping and handling charges for returning content will be added to invoices. Overnight shipping is available upon request.

Ownership of the Work Product and Background Technology

Subject to full payment of the fees and expenses due hereunder, Net Propulsion hereby assigns to the Customer its entire right, title and interest in the content created specifically by Net Propulsion pursuant to the program (hereinafter all such content created by Net Propulsion as described in this program, shall be collectively referred to as the "Work Product"). Customer agrees that Net Propulsion shall retain any and all rights Net Propulsion may have in the Background Technology. "Background Technology" means all programs, systems, data and materials, in whatever form that is used by Net Propulsion to create the Work Product, that are owned either by Net Propulsion or licensed to Net Propulsion.

FIG. 5B

Changes or Cancellations
   Due to the speed at which orders are produced, changes or cancellations are not always possible. If a change must be made or the Customer must cancel their order, Net Propulsion will do everything we can to accommodate their request.

Warranties and Representations
   Net Propulsion warrants and represents that the Work Product will substantially conform to and operate in accordance with the functional and operational specifications expressly set forth in the complete order form. It Net Propulsion is notified by the Dealer or Customer that the Work Product does not substantially conform to such specifications, then Net Propulsion shall make every reasonable effort to repair the Work Product so that it substantially conforms to and operates in accordance with such specifications. The Customer understands that the general reliability of the Internet and of connections to and from the Internet may be controlled by factors beyond the control of Net Propulsion. Because of this, it is impossible for Net Propulsion to guarantee that Net Propulsion's provision of the services will be uninterrupted, that the Customer or public will be able to properly access and use the services or the Work Product, or that such services will be provided without error.
   THE WARRANTIES AND REPRESENTATIONS SET FORTH IN THIS ARTICLE ARE THE ONLY WARRANTIES GRANTED BY NET PROPULSION WITH RESPECT TO THE SERVICES OR WORK PRODUCT FURNISHED HEREUNDER. NET PROPULSION DISCLAIMS ALL OTHER WARRANTIES, EXPRESS OR IMPLIED, INCLUDING, WITHOUT LIMITATION, ANY IMPLIED WARRANTIES OR MERCHANTABILITY OR FITNESS FOR A PARTICULAR PURPOSE, AND ANY ORAL OR WRITTEN REPRESENTATIONS, PROPOSALS OR STATEMENTS MADE PRIOR TO THIS AGREEMENT.

Limitation of Liability
   IN NO EVENT SHALL NET PROPULSION BE LIABLE TO CLIENT FOR INCIDENTAL, CONSEQUENTIAL, SPECIAL OR INDIRECT DAMAGES EVEN IF NET PROPULSION HAS BEEN ADVISED OF THE POSSIBILITY OF SUCH DAMAGES. Net Propulsion shall not be liable for any claim or demand made against he Dealer or Customer by any third party. Net Propulsion's entire liability to the Customer, whether based in contract or tort, will be limited to the total of those fees paid by Customer and received by Net Propulsion as described on this completed order form.

Net Propulsion, 400 Fourth Street South, Suite 300, Minneapolis, MN 55415 • 1 (800) NET-9299 • Phone: (612) 376-7543 • www.netpropulsion.com PPO-1/15/97         Page 2 of 2

FIG. 5C

| Order Form II: Personalized Website | |
|---|---|
| 1 | Tell us about your company. |

Company name .............................. Contact name ................
Address 1 .................................. Phone number ...............
Address 2 .................................. Fax number .................
City/State/Zip .............................. E-mail address .............

2 Choose the characteristics of your Personalized Website. <u>Fill in appropriate retail price</u>
*Complete all of the following information. Refer to select template page for additional ordering information.*

Templated Personalized Website (#01401) See inside of form for information on
  providing artwork and copy ............................................. _____
Template (industry/profession) ................ (3 digits) 08 ........... 
Creative elements (3 digits) 09 ..... ........ .....
Typestyle family ............................. (2 digits) 072 ..... .....
Background texture (white will be used if left blank) (2 digits) 070 ..... .....
Color family ................................. (2 digits) 071 ..... .....
  or custom colors (list up to 4 Pantone® or CMYK colors): ... ... ... ...
Website options:
  Group A  Description ................... Product # ............... _____
           Description ................... Product # ............... _____
  Group B  Description ................... Product # ............... _____
           Description ................... Product # ............... _____
Subtotal 1 ......................................................... _____
  Less 10% discount for content on disk. (Must comply with requirements
    listed inside) ................................................... [_____]
  Do you want your artwork/disk returned? ☐ No ☐ Yes
    ($9.95 shipping/handling fee) (#04011) ........................... 
Website Cost ....................................................... _____

3 Indicate your Hosting Plan preferences.
*Check one option for Hosting and one option for Domain Name.*
Hosting         ☐ Plan C. Annual Plan with first month free (#02401) ..... _____
                ☐ Customer Waiver (#02601). Used when customer is
                    a) hosting website themselves or b) hosting by a third
                    party vendor. If selected, you must complete the
                    Customer Waiver information on the back page.
Domain Name     ☐ Independent Domain Name. This fee allows usage rights
                    for 2 yrs (#02701) ................................. _____
                  Enter domain name choices in order of preference
                    (example: www.your company name.com).
                    1) ............ 2) ............ 3) ............
                ☐ Common Domain Name. Enter name choice:
                    www.netpropulsion.net/ ............................

FIG. 6A

| 4 | Indicate your Maintenance Plan preference.<br>*Select if you want content updates on a monthly basis. Call Customer Service for different frequency or number of edits.*<br>☐ Plan E. Annual plan includes monthly updates of copy as shown on template, or up to 10 new photos (#03001) .................................... _____ |
|---|---|
| 5 | Figure the total cost.<br>Subtotal 2 ........................................................... _____<br>    Applicable sales tax ........................................ (+) _____<br>Grand Total ....................................................... _____<br>    Deposit received ............................................ (−) _____<br>Balance ............................................................. _____ |

*Please read "Terms and Conditions" on the back of this form before signing. By submitting content for use in your website you represent that you have the right to have those photos, artwork and copy reproduced. Do not submit content that you do not own the copyright for without written permission from the original owner for your own protection. By signing your acceptance below, you agree that you have read and agree to the terms and conditions on the reverse side of this order form.*

| FOR DEALER USE ONLY: Dealer name ............... Account number ......... |
|---|
|                             Contact name ............... Phone number ........... |

PWO-1/15/97                  Page 1 of 4

FIG. 6B

Submitting Content

Guidelines

In General

Be sure to complete and submit all applicable information as requested. Please use a Net Propulsion mailer envelope to ensure the safe shipment of your order and the related materials. Please complete a "Disk Information Form" to submit your content digitally. Files containing copy only must be labeled for placement.

For "Personalized Website"

Complete all of the information as requested on the inside pages of this order form. Refer to selected template page for specific ordering information. You may attach a separate sheet of paper to the order form if necessary. Please supply content as camera ready artwork or on disk. If submitting content on disk, please complete a disk information form.

For Camera Ready Artwork

Camera ready artwork includes any black ink on white paper artwork that is crisp and clean. Photostats and Mechanicals are preferred. The following does not qualify as camera ready artwork: faxes, photocopies, printed halftones/tints, pencil sketches and blue ink print. It is preferred that finely detailed artwork and small or tin type be supplied on disk instead of hard copy to ensure quality reproductions.

Graphics

Have you included your logo? (camera ready or on disk)  ☐ Yes  ☐ No
Are graphic images being supplied?  ☐ Yes  ☐ No
Please describe:

Photos

Have you included photos?  ☐ Yes  ☐ No
If Yes, what format?  ☐ Prints  ☐ Transparencies  ☐ Digital Files Labeling Photos

*To ensure proper placement, please label the back of each photo with the following information:*

1. The corresponding page number *and* position number as specified by the ordering information on the template you have selected (e.g. page 3, photo #2).
2. Any descriptive information that will help to ensure we assemble your website correctly (e.g. Product Name, Staff Member Name, etc.).
3. Your name and phone number.

FIG. 6C

Keywords

*List 20 keywords for search engine registration. Note: Critical for visitors to find your website.*

.............  .............  .............  .............  .............
.............  .............  .............  .............  .............
.............  .............  .............  .............  .............
.............  .............  .............  .............  .............

Links

*Please specify the links to other websites you would like (up to 5 included free). Note: Important for increasing customer traffic.*

| | Name | Description | URL |
|---|---|---|---|
| 1 | ................. | ........................... | ......................... |
| 2 | ................. | ........................... | ......................... |
| 3 | ................. | ........................... | ......................... |
| 4 | ................. | ........................... | ......................... |
| 5 | ................. | ........................... | ......................... |

Options and Enhancements

*When ordering options and enhancements, please use the space below to describe how you want your option to be created. (E.g., for a Slide Show Tour, please label your photos in sequence and include captions.)*

PWO-1/15/97         Page 2 of 4

FIG. 6D

Copy

*Type, write, or attach copy on this page. Clearly indicate special punctuation and capitalization, and pay special attention to word count as specified on template. Only fill in copy for the amount of pages specified on the template selected.*

*Note: Each Personalized Website includes pre-defined areas for placement of copy. Refer to selected template page for exact specifications and location of required copy.*

Page 1
Page Title . . . . . . . . . . . . . . . . . . Stock photo # (if applicable) . . . . . . . . . . . . . . . . . .
Body Copy . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .

Page 2
Page Title . . . . . . . . . . . . . . . . . . Stock photo # (if applicable) . . . . . . . . . . . . . . . . . .
Body Copy . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .

Page 3
Page Title . . . . . . . . . . . . . . . . . . Stock photo # (if applicable) . . . . . . . . . . . . . . . . . .
Body Copy . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .

Page 4
Page Title . . . . . . . . . . . . . . . . . . Stock photo # (if applicable) . . . . . . . . . . . . . . . . . .
Body Copy . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .

Page 5
Page Title . . . . . . . . . . . . . . . . . . Stock photo # (if applicable) . . . . . . . . . . . . . . . . . .
Body Copy . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .
. . . . . . . . . . . . . . . . . . . . . . . . . . . . . . . . . . . . . . . . . . . . . . . . . . . . . . . . . . . . . . . . . . . . . . . . . .

PWO-1/15/97        Page 3 of 4

FIG. 6E

Hosting Plan Waiver

*Fill out the information below if you chose the Hosting Plan Customer Waiver on the front page.*

Service provider .......................... Contact name ......................
Phone number ........................... E-mail address .....................
Has an account been established? ☐ Yes ☐ No   Account Number ...................
URL ................................... Website IP address .................

Terms and Conditions

*Please review these terms and conditions prior to signing the customer acceptance area on the front of this order form.*

Order Placement

All orders must be either mailed or sent electronically to Net Propulsion for fulfillment. Production schedules quoted do not take into account the time it takes in transit for the website content to get to Net Propulsion. A completed copy of the Net Propulsion order form must accompany all orders. Similarly, all required content (customer supplied logos, copy, photos, etc.) must be sent in at time of order placement. Do not ship orders with incomplete content, as it will result in the delay of production of the final website.

Shipping Charges

All supplied content materials will be kept on file at Net Propulsion for approximately 6 months. Materials will not be returned to the dealer or their client unless requested at time of website purchase. Shipping and handling charges for returning content will be added to invoices. Overnight shipping is available upon request.

Ownership of the Work Product and Background Technology

Subject to full payment of the fees and expenses due hereunder, Net Propulsion hereby assigns to the Customer its entire right, title and interest in the content created specifically by Net Propulsion pursuant to the program (hereinafter all such content created by Net Propulsion as described in this program, shall be collectively referred to as the "Work Product"). Customer agrees that Net Propulsion shall retain any and all rights Net Propulsion may have in the Background Technology. "Background Technology" means all programs, systems, data and materials, in whatever form that is used by Net Propulsion to create the Work Product, that are owned either by Net Propulsion or licensed to Net Propulsion.

Changes or Cancellations

Due to the speed at which orders are produced, changes or cancellations are not always possible. If a change must be made or the Customer must cancel their order, Net Propulsion will do everything we can to accommodate their request.

FIG. 6F

Warranties and Representations

Net Propulsion warrants and represents that the Work Product will substantially conform to and operate in accordance with the functional and operational specifications expressly set forth in the complete order form. If Net Propulsion is notified by the Dealer or Customer that the Work Product does not substantially conform to such specifications, then Net Propulsion shall make every reasonable effort to repair the Work Product so that it substantially conforms to and operates in accordance with such specifications. The Customer understands that the general reliability of the Internet and of connections to and from the Internet may be controlled by factors beyond the control of Net Propulsion. Because of this, it is impossible for Net Propulsion to guarantee that Net Propulsion's provision of the services will be uninterrupted, that the Customer or public will be able to properly access and use the services or the Work Product, or that such services will be provided without error.

THE WARRANTIES AND REPRESENTATIONS SET FORTH IN THIS ARTICLE ARE THE ONLY WARRANTIES GRANTED BY NET PROPULSION WITH RESPECT TO THE SERVICES OR WORK PRODUCT FURNISHED HEREUNDER. NET PROPULSION DISCLAIMS ALL OTHER WARRANTIES, EXPRESS OR IMPLIED, INCLUDING, WITHOUT LIMITATION, ANY IMPLIED WARRANTIES OR MERCHANTABILITY OR FITNESS FOR A PARTICULAR PURPOSE, AND ANY ORAL OR WRITTEN REPRESENTATIONS, PROPOSALS OR STATEMENTS MADE PRIOR TO THIS AGREEMENT.

Limitation of Liability

IN NO EVENT SHALL NET PROPULSION BE LIABLE TO CLIENT FOR INCIDENTAL, CONSEQUENTIAL, SPECIAL OR INDIRECT DAMAGES EVEN IF NET PROPULSION HAS BEEN ADVISED OF THE POSSIBILITY OF SUCH DAMAGES. Net Propulsion shall not be liable for any claim or demand made against he Dealer or Customer by any third party. Net Propulsion's entire liability to the Customer, whether based on contract or tort, will be limited to the total of those fees paid by Customer and received by Net Propulsion as described on this completed order form.

Net Propulsion, 400 Fourth Street South, Suite 300, Minneapolis, MN 55415 • 1 (800) NET-9299 • Phone: (612) 376-7543 • www.netpropulsion.com PWO-1/15/97        Page 4 of 4

FIG. 6G

| Order Form III: Deluxe Custom Website | |
|---|---|
| 1 Tell us about your company. | |
| Company name .................................. | Contact name ................ |
| Address 1 ...................................... | Phone number ............... |
| Address 2 ...................................... | Fax number ................. |
| City/State/Zip .................................. | E-mail address .............. |

2 Provide your quote number.

*Please write your quote number: If you have not requested a quote, fill out the Deluxe Custom Website Quoting Form.*

Quote Number .............

*If you need changes made to your quote, please describe:*

................................................................
................................................................
................................................................
................................................................
................................................................
................................................................
................................................................
................................................................
................................................................
................................................................

3 Figure the total cost.

Total price from quote referenced above ......................................... _____
    Applicable sales tax .................................................. (+) _____
Grand Total .............................................................. _____
    Deposit received ..................................................... (−) _____
Balance .................................................................. _____

*Please read "Terms and Conditions" on the back of this form before signing. By submitting content for use in your website you represent that you have the right to have those photos, artwork and copy reproduced. Do not submit content that you do not own the copyright for without written permission from the original owner for your own protection. By signing your acceptance below, you agree that you have read and agree to the terms and conditions on the reverse side of this order form.*

Authorized customer signature ............... Print name ............ Date .....

| FOR DEALER USE ONLY: | |
|---|---|
| Dealer name ................................... | Account number ............ |
| Contact name .................................. | Phone number ............. |

FOR NET PROPULSION OFFICE USE ONLY:

................................................................
................................................................
................................................................
................................................................

CWO-1/15/97         Page 1 of 6

FIG. 7A

Submitting Content

<u>Guidelines</u>

In General

Be sure to complete and submit all applicable information as requested. Please use a Net Propulsion mailer envelope to ensure the safe shipment of your order and the related materials. Please complete a "Disk Information Form" to submit your content digitally. Files containing copy only must be labeled for placement.

For "Deluxe Custom Website"

Complete all of the information as requested on the inside pages of this order form. Refer to selected template page for specific ordering information. You may attach a separate sheet of paper to the order form if necessary. Please supply content as camera ready artwork or on disk. If submitting content on disk, please complete a disk information form.

<u>Camera Ready Artwork</u>

For Camera Ready Artwork

Camera ready artwork includes any black ink on white paper artwork that is crisp and clean. Photostats and Mechanicals are preferred. The following does not qualify as camera ready artwork: faxes, photocopies, printed halftones/tints, pencil sketches and blue ink print. It is preferred that finely detailed artwork and small or tin type be supplied on disk instead of hard copy to ensure quality reproductions.

<u>Graphics</u>

Have you included your logo? (camera ready or on disk)    ☐ Yes   ☐ No

Are graphic images being supplied?    ☐ Yes   ☐ No

Please describe:

<u>Photos</u>

Have you included photos?    ☐ Yes   ☐ No

If Yes, what format?    ☐ Prints   ☐ Transparencies   ☐ Digital Files

<u>Labeling Photos</u>

*To ensure proper placement, please label the back of each photo with the following information:*

1. The corresponding page number *and* position number as specified by the ordering information on the template you have selected (e.g. page 3, photo #2).

2. Any descriptive information that will help to ensure we assemble your website correctly (e.g. Product Name, Staff Member Name, etc.).

3. Your name and phone number.

FIG. 7B

Keywords

*List 20 keywords for search engine registration. Note: Critical for visitors to find your website.*

.............   ..............   ..............   ..............   ..............
.............   ..............   ..............   ..............   ..............
.............   ..............   ..............   ..............   ..............
.............   ..............   ..............   ..............   ..............

Links

*Please specify the links to other websites you would like (up to 5 included free). Note: Important for increasing customer traffic.*

| Name | Description | URL |
|---|---|---|
| 1 .......................... | .............................. | .............................. |
| 2 .......................... | .............................. | .............................. |
| 3 .......................... | .............................. | .............................. |
| 4 .......................... | .............................. | .............................. |
| 5 .......................... | .............................. | .............................. |

Options and Enhancements

*When ordering options and enhancements, please use the space below to describe how you want your option to be created. (E.g., for a Slide Show Tour, please label your photos in sequence and include captions.)*

CWO-1/15/97               Page 2 of 6

FIG. 7C

Copy

*Type, write or attach copy on this page. Clearly indicate special punctuation and capitalization, and pay special attention to word count as specified on template. Only fill in copy for the amount of pages specified on the template selected.*

*Note: Each Personalized Website includes pre-defined areas for placement of copy. Refer to selected template page for exact specifications and location of required copy.*

Page 1
Page Title................ Stock photo # (if applicable).....  ....  ....  .....
Body Copy .........................................................................
    ..............................................................................
    ..............................................................................
    ..............................................................................
    ..............................................................................
    ..............................................................................
    ..............................................................................

Page 2
Page Title................ Stock photo # (if applicable).....  ....  ....  .....
Body Copy .........................................................................
    ..............................................................................
    ..............................................................................
    ..............................................................................
    ..............................................................................
    ..............................................................................
    ..............................................................................

Page 3
Page Title................ Stock photo # (if applicable).....  ....  ....  .....
Body Copy .........................................................................
    ..............................................................................
    ..............................................................................
    ..............................................................................
    ..............................................................................
    ..............................................................................
    ..............................................................................

Page 4
Page Title................ Stock photo # (if applicable).....  ....  ....  .....
Body Copy .........................................................................
    ..............................................................................
    ..............................................................................
    ..............................................................................
    ..............................................................................
    ..............................................................................

Page 5
Page Title................ Stock photo # (if applicable).....  ....  ....  .....
Body Copy .........................................................................
    ..............................................................................
    ..............................................................................
    ..............................................................................
    ..............................................................................
    ..............................................................................

CWO-1/15/97          Page 3 of 6

FIG. 7D

Additional Copy

*Use this sheet if additional space is required for specifying copy for your Deluxe Custom Website.*

Page # ..........
Page Title ................... Stock photo # (if applicable) ..... ..... ..... .....
Body Copy ..................................................................
..............................................................................
..............................................................................
..............................................................................
..............................................................................
..............................................................................

Page # ..........
Page Title ................... Stock photo # (if applicable) ..... ..... ..... .....
Body Copy ..................................................................
..............................................................................
..............................................................................
..............................................................................
..............................................................................
..............................................................................

Page # ..........
Page Title ................... Stock photo # (if applicable) ..... ..... ..... .....
Body Copy ..................................................................
..............................................................................
..............................................................................
..............................................................................
..............................................................................
..............................................................................

Page # ..........
Page Title ................... Stock photo # (if applicable) ..... ..... ..... .....
Body Copy ..................................................................
..............................................................................
..............................................................................
..............................................................................
..............................................................................
..............................................................................

Page # ..........
Page Title ................... Stock photo # (if applicable) ..... ..... ..... .....
Body Copy ..................................................................
..............................................................................
..............................................................................
..............................................................................
..............................................................................
..............................................................................

CWO-1/15/97　　　　　　　Page 4 of 6

FIG. 7E

Additional Copy

*Use this sheet if additional space is required for specifying copy for your Deluxe Custom Website.*

Page # ..........
Page Title ................... Stock photo # (if applicable) .....  .....  .....  .....
Body Copy ................................................................................
................................................................................
................................................................................
................................................................................
................................................................................
................................................................................

Page # ..........
Page Title ................... Stock photo # (if applicable) .....  .....  .....  .....
Body Copy ................................................................................
................................................................................
................................................................................
................................................................................
................................................................................
................................................................................

Page # ..........
Page Title ................... Stock photo # (if applicable) .....  .....  .....  .....
Body Copy ................................................................................
................................................................................
................................................................................
................................................................................
................................................................................
................................................................................

Page # ..........
Page Title ................... Stock photo # (if applicable) .....  .....  .....  .....
Body Copy ................................................................................
................................................................................
................................................................................
................................................................................
................................................................................
................................................................................

Page # ..........
Page Title ................... Stock photo # (if applicable) .....  .....  .....  .....
Body Copy ................................................................................
................................................................................
................................................................................
................................................................................
................................................................................
................................................................................

CWO-1/15/97          Page 5 of 6

FIG. 7F

Terms and Conditions

*Please review these terms and conditions prior to signing the customer acceptance area on the front of this order form.*

<u>Order Placement</u>

All orders must be either mailed or sent electronically to Net Propulsion for fulfillment. Production schedules quoted do not take into account the time it takes in transit for the website content to get to Net Propulsion. A completed copy of the Net Propulsion order form must accompany all orders. Similarly, all required content (customer supplied logos, copy, photos, etc.) must be sent in at time of order placement. Do not ship orders with incomplete content, as it will result in the delay of production of the final website.

<u>Shipping Charges</u>

All supplied content materials will be kept on file at Net Propulsion for approximately 6 months. Materials will not be returned to the dealer or their client unless requested at time of website purchase. Shipping and handling charges for returning content will be added to invoices. Overnight shipping is available upon request.

<u>Ownership of the Work Product and Background Technology</u>

Subject to full payment of the fees and expenses due hereunder, Net Propulsion hereby assigns to the Customer its entire right, title and interest in the content created specifically by Net Propulsion pursuant to the program (hereinafter all such content created by Net Propulsion as described in this program, shall be collectively referred to as the "Work Product"). Customer agrees that Net Propulsion shall retain any and all rights Net Propulsion may have in the Background Technology. "Background Technology" means all programs, systems, data and materials, in whatever form that is used by Net Propulsion to create the Work Product, that are owned either by Net Propulsion or licensed to Net Propulsion.

<u>Changes or Cancellations</u>

Due to the speed at which orders are produced, changes or cancellations are not always possible. If a change must be made or the Customer must cancel their order, Net Propulsion will do everything we can to accommodate their request.

<u>Warranties and Representations</u>

Net Propulsion warrants and represents that the Work Product will substantially conform to and operate in accordance with the functional and operational specifications expressly set forth in the complete order form. It Net Propulsion is notified by the Dealer or Customer that the Work Product does not substantially conform to such specifications, then Net Propulsion shall make every reasonable effort to repair the Work Product so that it substantially conforms to and operates in accordance with such specifications. The Customer understands that the general reliability of the Internet and of connections to and from the Internet may be controlled by factors beyond the control of Net Propulsion. Because of this, it is impossible for Net Propulsion to guarantee that Net Propulsion's provision of the services will be uninterrupted, that the Customer or public will be able to properly access and use the services or the Work Product, or that such services will be provided without error.

FIG. 7G

THE WARRANTIES AND REPRESENTATIONS SET FORTH IN THIS ARTICLE ARE THE ONLY WARRANTIES GRANTED BY NET PROPULSION WITH RESPECT TO THE SERVICES OR WORK PRODUCT FURNISHED HEREUNDER. NET PROPULSION DISCLAIMS ALL OTHER WARRANTIES, EXPRESS OR IMPLIED, INCLUDING, WITHOUT LIMITATION, ANY IMPLIED WARRANTIES OR MERCHANTABILITY OR FITNESS FOR A PARTICULAR PURPOSE, AND ANY ORAL OR WRITTEN REPRESENTATIONS, PROPOSALS OR STATEMENTS MADE PRIOR TO THIS AGREEMENT.

Limitation of Liability

IN NO EVENT SHALL NET PROPULSION BE LIABLE TO CLIENT FOR INCIDENTAL, CONSEQUENTIAL, SPECIAL OR INDIRECT DAMAGES EVEN IF NET PROPULSION HAS BEEN ADVISED OF THE POSSIBILITY OF SUCH DAMAGES. Net Propulsion shall not be liable for any claim or demand made against he Dealer or Customer by any third party. Net Propulsion's entire liability to the Customer, whether based in contract or tort, will be limited to the total of those fees paid by Customer and received by Net Propulsion as described on this completed order form.

Net Propulsion, 400 Fourth Street South, Suite 300, Minneapolis, MN 55415 • 1 (800) NET-9299 • Phone: (612) 376-7543 • www.netpropulsion.com CWO-1/15/97          Page 6 of 6

FIG. 7H

Personalized Website Order Form

Choose the characteristics of your website. Required fields are in *red italics*

| | |
|---|---|
| TemplateID Industry: | Advertising/Marketing ▼ |
| *Template:* | 025 - Advertising/Marketing ▼ |
| *Creative Elements:* | 004 ▼  View Samples |
| *Typestyle Family:* | 01 - Classic ▼  View Samples |
| Background Texture: | 01 - Rose ▼  View Samples |
| Color Family: | 01 - Corporate ▼  View Samples |
| Custom Color (CMYK or Pantone): | |
| Custom Color (CMYK or Pantone): | |
| Custom Color (CMYK or Pantone): | |
| Custom Color (CMYK or Pantone): | |
| Website Enhancement: | 00000 - No Enhancement ▼ |
| Website Enhancement: | 00000 - No Enhancement ▼ |
| Website Enhancement: | 00000 - No Enhancement ▼ |

When ordering options/e space below to describe h to be created. (E.g., for a label all your photos in s captions).

FIG. 8A

| Website Enhancement: | 00000 – No Enhancement ▼ |
| Website Enhancement: | 00000 – No Enhancement ▼ |

Please select the medium which the content will be submitted on:  ⊙ Internet Upload*
○ D Do you want your artwork/disk returned?   ⊙ No   ○ Yes

* 10% Discount (must comply with requirements)

Hosting Information

⊙ Hosting Plan C. Annual plan with first month free.

○ Customer Waiver. For when customer is a) hosting website themselves or b) hosting by a third party vendor.

Service Provider: [         ]   Contact Name: [         ]
Phone Number: [         ]   Email Address: [         ]
Has an account been established?   Account Number: [         ]

○ Yes ⊙ No
URL: [         ]

*Note: When Hosting Waiver is selected, your website will be furnished, for your service prov disk.*

○ Independent Domain Name. This fee allows usage rights for 2 years.

Enter Domain name choices in order of preference (example: *yourcompany*.com).

1) [         ]
2) [         ]
3) [         ]

⊙ Common Domain Name. (e.g. www.net9000.com/*yourcompany*)

Select from the following list of common domain names and request your company identifie choice):

[ www.net9000.com ▼ ]

Enter name choice: (e.g. www.net9000.com/ [         ])
(*Com Identifier*)

FIG. 8B

| Maintenance Information |
|---|
| Select your maintenance plan from the list below. |
| ○ No Maintenance Plan. One time changes can be made for an additional charge. |
| ⊙ Maintenance Plan E. Annual plan includes monthly updates of copy as shown on Template or up to 10 new photos. |
| ○ Maintenance Plan F. Annual plan includes quarterly updates of copy as shown on Template or up to 10 new photos. |

[ Next ]   [ Clear Form ]

FIG. 8C

| Please verify your content, which is as follows: |
|---|
| Images |
| You will be sending your logo. |
| You will not be supplying graphic images. |
| You will not be sending photos. |
| Keywords |
| You have chosen the following words as keywords for describing your site: |
|    key,words |
| Links |
| You have chosen the following to other websites: |

| Link Name | Description | URL |
|---|---|---|
| Adweek Online | events culture trends newswire and more | http://www.adweek.com |
| Clio Awards | honoring advertising excellence world wide | http://www.clioawards.com |
| Advertising Law | from Lewis Rose at Arent Fox | http://www.webcom.com |

FIG. 8D

| Copy |
|---|
| Carefully proofread your copy below. |
| Company Name (as it will appear on the website): Don's Ad Agency |
| Page 1 <br> Page Title: Page 1 Button Label: Page 1 <br> Stock Photos: 18, 25 <br> Body Copy (or instructions): <br> This is the content of page 1. |
| Page 2 <br> Page Title: Page 2 Button Label: Page 2 <br> Stock Photos: 57 <br> Body Copy (or instructions): <br> This is the content of page 2. |
| Page 3 <br> Page Title: Page 3 Button Label: Page 3 <br> Stock Photos: <br> Body Copy (or instructions): <br> This is the content of page 3. |
| Page 4 <br> Page Title: Page 4 Button Label: Page 4 <br> Stock Photos: <br> Body Copy (or instructions): <br> This is the content of page 4. |
| Page 5 <br> Page Title: Page 5 Button Label: Page 5 <br> Stock Photos: <br> Body Copy (or instructions): <br> This is the content of page 5. |
| [ Yes, I want this. ]   [ No, I need to change something. ] |

FIG. 8E

| Upload Files via Internet |
|---|
| Enter the location of the file or click "Browse" to find it. |
|   |
| [ Send File ]   [ Done ] |

FIG. 8F

| Receipt | | |
|---|---|---|
| Your Website | | |
| Item Description | Item Number | Retail Price |
| Personalized Website | | $799.95 |
| Template: | 025 | |
| Creative Elements: | 004 | |
| Typestyle Family: | 01 | |
| Background Texture: | 01 | |
| Color Family: | 01 | |
| You are submitting your content on disk (must comply with requirements). 10% off | | -$80.00 |
| Hosting Plan | | |
| Hosting plan C: Annual plan for Templated Personalized Websites (first month free). | | $349.95 |
| Your URL (address) will be the following: http://www.net9000.com/dfhgfdgf | | |
| Maintenance plan E: Annual plan includes monthly updates of copy as shown on Template or up to 10 new photos. | | $299.95 |
| Total | | |
| Sales Tax (6.5%): | | 89.04 |
| Grand Total: | | $1139.45 |

FIG. 8G

Report: Order #140 Details  Back to the New Order Summaries Report

| Order # | Date Ordered | Dealer | Customer Name | Product | Wholesale Price | Status |
|---|---|---|---|---|---|---|
| 140 | 08/14/1997 | Insty-Prints | Gary L. Weinrib | Brochure or Flyer | 224.94 | New |

The following types of components need to be completed for this site. Click on the one you wish to work on now.

- Text Content
- Customer-Supplied Images

| Hosting and Maintenance | |
|---|---|
| Independent Domain Name: | No |
| Hosting Begin Date: | None |
| Hosting End Date: | None |

Back to the New Order Summaries Report

FIG. 8H

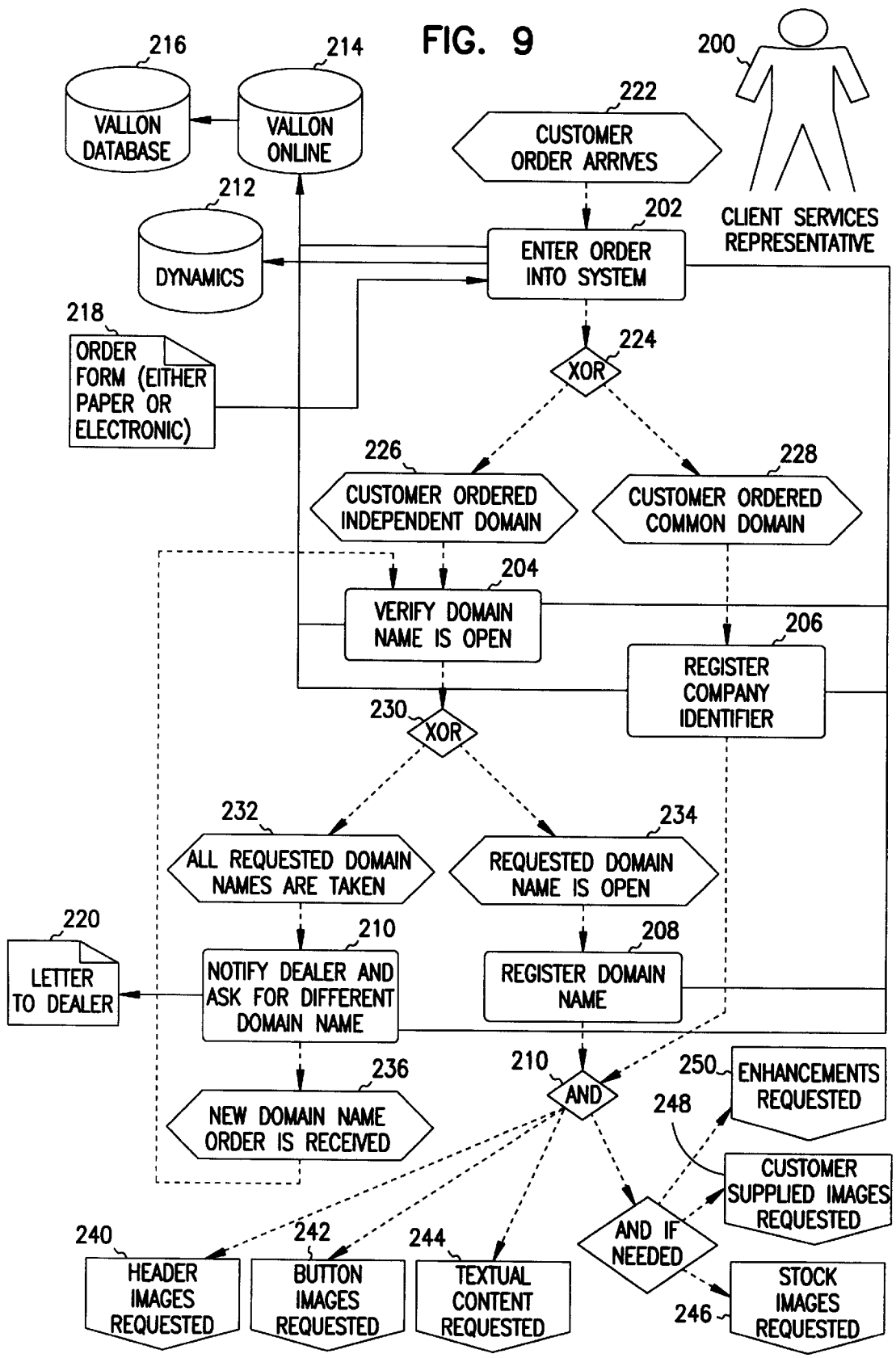

COMPUTERIZED WORK FLOW SYSTEM

FIELD OF THE INVENTION

The present invention relates generally to work flow processes and the generation of Internet world-wide-web ("web") sites, and more particularly to computerized work flow systems and computerized web site generation.

BACKGROUND OF THE INVENTION

The Internet has become increasingly popular with computer users. A common usage of the Internet is browsing the Internet's world-wide-web. The world-wide-web is a manner by which hyper linked content in a common format known as hypertext-markup-language (HTML) may be easily viewed by any computer user having access to the web, regardless of the type of the user's computer, as long as the computer has running thereon an HTML-compatible browser computer program. Such browser computer programs include Netscape Navigator and Microsoft Internet Explorer, available for computers running the Microsoft Windows operating system, as well as the Apple MacintoshOS operating system.

Content on the world-wide-web is organized into separate files, or "pages," where each page is accessible by a Universal Resource Locator (URL) address preceded by an "http:" moniker to specify a hypertext transport protocol. For example, the URL address "www.vallon.com" specifies one particular page, specifically the home page of Vallon, Inc. Each page may include links to other pages, such that all of the pages within the world-wide-web are linked into a vast "web" of interconnected content. Generally speaking, all the pages having the identical prefatory URL address are said to constitute the web site at that address.

As companies, universities and individuals have set up their own web sites, the world-wide-web has become an invaluable resource for finding information. However, the creation of web pages is potentially an arduous task. A programmer proficient in HTML is necessary to construct the individual pages. A graphics artist is necessary to develop the art work to appear on those pages. A writer is necessary to write the text appearing with the art work. For a very complicated web site, the development thereof may require the coordination of the efforts of many different individuals.

A limited solution is provided by web site creation computer programs such as Microsoft FrontPage. Such computer programs permit a user to select among stock art work for web pages, type in the text to appear with the art work on the web pages, and determine the layout of each web page and the linking of the web pages. However, even such web site creation computer programs are too complex for many users to easily create a web site. Moreover, such web sites do not by themselves facilitate the publication of the web site onto the world-wide-web such that the site is viewable to the public in general.

Computer consultants thus have begun to sell their services to create web sites for their clients—many such consultants themselves using web site creation computer programs like Microsoft FrontPage to create these web sites. However, utilizing consultants is an expensive alternative that typically only large companies can afford. The average consumer or small business wishing to create and publish a web site, for example, may find it too expensive to retain a consultant to develop the web site.

One reason why computer consultants are an expensive alternative to the creation and publication of web sites is that their services are very customized to their individual customers. A given consultant or consulting team may start from scratch to collectively develop the site. The consulting team may include writers, programmers and artists that interact closely as a cohesive unit to together produce a web site. Frequently, the writer may find herself waiting for the programmer before she can continue her work, while the programmer is waiting for the artist before he can perform his task, etc. The work flow of web site development as currently found in the prior art, therefore, is an inefficient and expensive process.

SUMMARY OF THE INVENTION

The above-identified shortcomings as well as other problems are addressed by the present invention, which will be understood by reading and studying the following specification. The invention describes a computerized work flow system and computerized web site generation. In one embodiment of the invention, a computerized system includes a work flow server that instantiates a process having a plurality of activities, and tracks completion of the plurality of activities as each activity is independently performed. In another embodiment of the invention, the work flow server is specifically a web application server that receives Internet world-wide-web site orders over the Internet. The web application server tracks the performance of the orders such that each activity within a work flow of activities is assignable for independent completion by different individuals.

Thus, the work flow system permits the tracking of the completion of different activities that make up a process, where the activities may be independently performed. With specific respect to a web application server, this means that the creation and publication of a web site is divided into different activities or tasks that may be performed concurrently by different individuals, who work separately from one another. This allows web sites to be generated efficiently; each individual is responsible only for his or her own task, and is desirably presented by the computerized system with all the information that needs to be known in order to perform that task. Thus, each individual can perform the task separately, without interacting with the other individuals.

In this manner, a large number of web sites may be able to be created easily, since the piecemeal completion of each is tracked by the server. An artist may be responsible for the artwork for all the web sites, for example, while a writer may be responsible for the textual content of all the web sites. If the artist is not completing his or her work on time, another artist may be added to ensure that the work is performed timely. The addition of personnel as needed is permitted by an inventive work flow system that tracks the completion of a process as divided into a number of independently and separately performable tasks. This compares favorably to a prior art work flow system in which the generation of each web site results from the performance of a unique process, such that the addition and/or change of personnel is difficult to accomplish.

In different embodiments of the invention, computerized systems and methods of varying scope are described. Still other and further embodiments, aspects and advantages of the invention will become apparent by reference to the drawings and by reading the following detailed description.

BRIEF DESCRIPTION OF THE DRAWINGS

FIGS. 5A, 5B, and 5C are an order form for the placement of a printed piece on the web according to one embodiment of the invention;

FIGS. 6A, 6B, 6C, 6D, 6F, 6G are an order form for a personalized web site according to one embodiment of the invention;

FIGS. 7A, 7B, 7C, 7D, 7E, 7F, 7G, and 7H are an order form for a completely custom web site according to one embodiment of the invention;

FIGS. 8A, 8B, 8C, 8D, 8E, 8F, and 8G are screen shots of an online form according to one embodiment of the invention;

FIG. 8H is a screen showing exemplary task tracking by a web application server according to one embodiment of the invention;

FIGS. 9, 10, 11, 12, 13, 14, 15, 16A, 16B, 16C, 17A, 17B, 18A, 18B, 19A, 19B, 19C, 20A, 20B, 20C, and 20D are diagrams showing an exemplary method according to one embodiment of the invention;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

The detailed description is divided into six sections. In the first section, a description of the system architecture in conjunction with which embodiments of the invention may be implemented is provided, including a description of the hardware and software aspects of the system, as well as a description of a typical computer in which such hardware and software may be implemented. In the second section, an overview of an embodiment of the invention is presented, including detailed screen shots, as well as diagrams of input forms utilized in this embodiment. In the third section, a more detailed description is provided of exemplary methods an embodiment of the invention, including detailed flow charts of the embodiment sufficient to enable one of ordinary skill in the art to make and use the invention.

In the fourth section, a description of generalized work flow diagrams according to one embodiment of the invention is presented, from which the embodiments of the previous sections can be instantiated. This description includes specific description as to how the embodiments of the previous section relate to and are instantiated from the generalized work flow diagrams. In the fifth section, a listing of code to implement one specific embodiment of the invention is given. Finally, in the sixth section, a conclusion is presented.

System Architecture

In this section of the detailed description, a description of the system architecture in conjunction with which embodiments of the invention may be implemented is provided. This description includes a description of the hardware and software aspects of the system, as well as a description of a typical computer in which such hardware and software may be implemented. The description of this section is provided in conjunction with FIGS. 1A, 1B, 2, and 3.

Figure 1A:
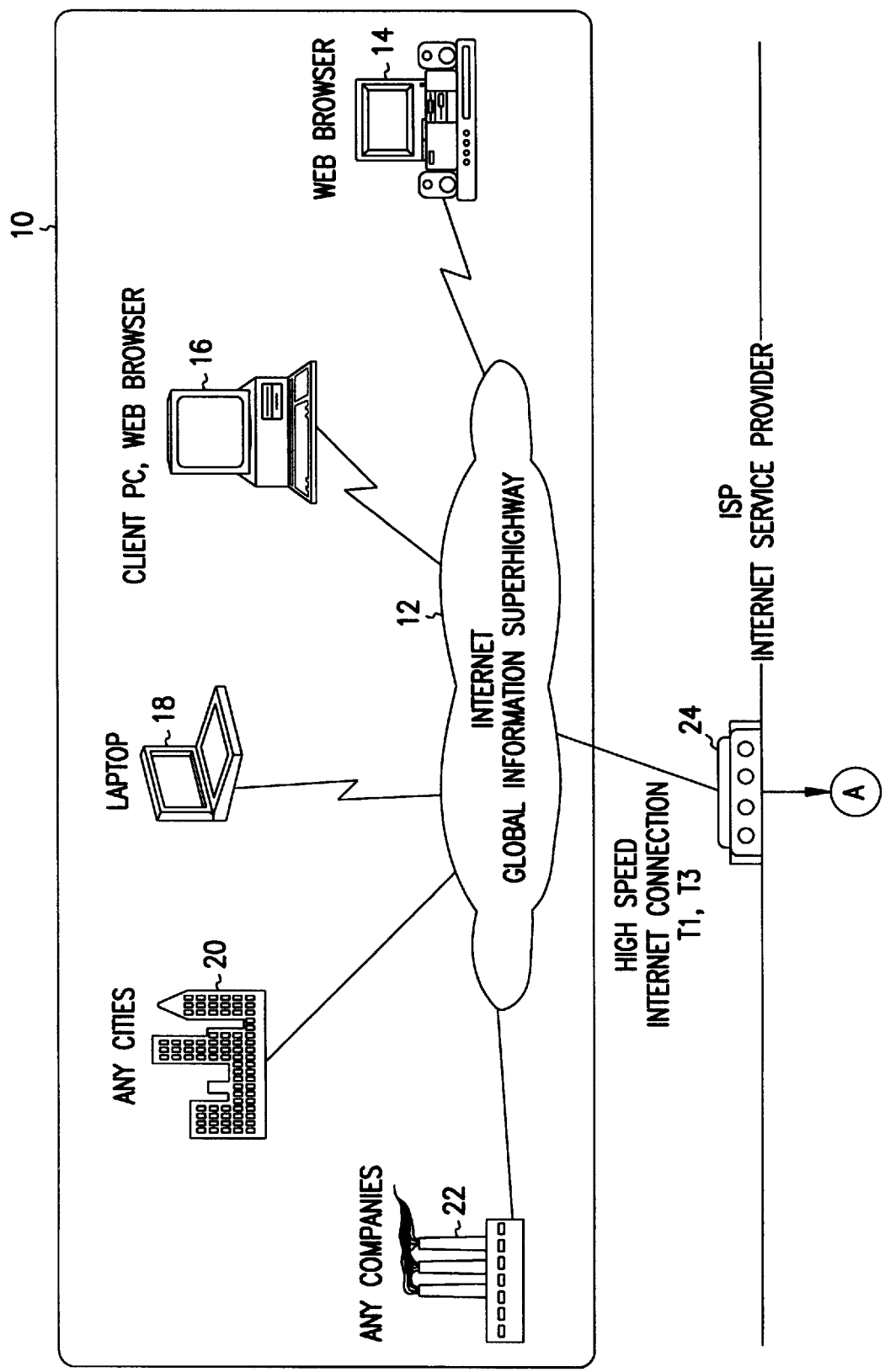
FIGS. 1A and 1B is a diagram of a system architecture in conjunction with which embodiments of the invention may be implemented.
Figure 1B:
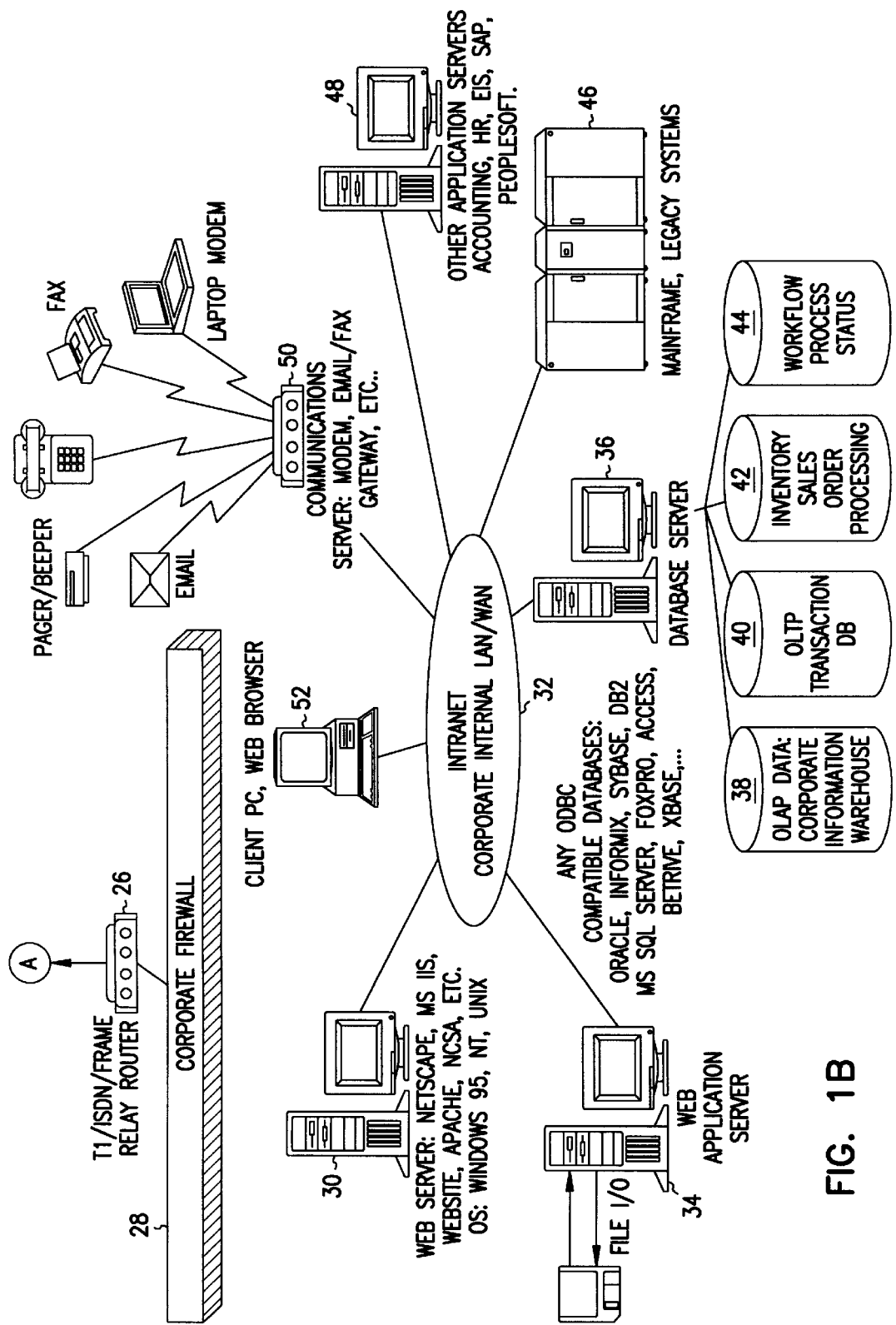

Referring first to FIGS. 1A and 1B a diagram of a system architecture in conjunction with which embodiments of the invention may be implemented is shown. The diagram of FIGS. 1A and 1B and the conjoining description providing an understanding of the hardware aspects of the system architecture. Embodiments of the invention provide a computerized manner by which Internet world-wide-web pages may be easily published, permitting fast and low-cost web site creation. The system architecture in conjunction with which embodiments may be implemented is itself centered on the Internet world-wide-web (hereinafter "web"). Thus, the invention permits the entry of information from any computerized point within element 10 that has access to Internet 12.

Such computerized points include a web browser running on a stand-alone machine 14 in a residential environment connected to Internet 12 via a modem, a client personal computer (PC) 16 running in an office environment connected to Internet 12 typically in a direct-connect manner such as a T1 line, a laptop 18 that may be connected remotely from virtually anywhere, also through a modem (either wired or wireless). In fact, as those of ordinary skill within the art will appreciate, nearly any city—as represented by element 20—and nearly any company—as represented by element 22—may be connected to Internet 12. Thus, the architecture in conjunction with which embodiments of the invention may be implemented allows for entry of information regarding web pages to be published from virtually anywhere (i.e., any computerized point), which is an advantage of the invention. That is, the invention is not limited to any particular computerized point—such as a particular type of computer, node, web browser, etc.—from which access can be made to Internet 12.

Information received from any point within element 10 is transferred through a high-speed Internet connection 24, such as a T1 or T3 line, as known within the art, and provided and/or maintained by an Internet Service Provider (ISP) organization, and then through a corresponding router 26 until it reaches firewall 28. As those of ordinary skill within the art understand, firewall 28 functions as a security mechanism to ensure that only permitted information passes through from Internet 12. Without firewall 28, the system architecture of the invention is vulnerable to security mishaps, as may occur as a result of illegal hacking and other activities. The construction and maintenance of such firewalls is known within the art.

Each point within element 10 ultimately communicates through Internet 12 with web server 30. The invention is not particularly limited to a type of web server 30. Typical examples include those running software available from Netscape, Microsoft, Apache, NCSA, and others. Web server 30 is also not limited to running on a particular operating system (OS); common operating systems including Microsoft Windows 95, Microsoft Windows NT, and UNIX. Web server 30 is itself coupled to network 32, which may be an intranet, a corporate internal local area network (LAN), a corporate wide area network (WAN), or any other type of network; the invention is not so limited. Thus, web server 30 is the connection point for network 32 to communicate with each point within element 10 via Internet 12.

The inventive software described herein runs on web application server 34, which is coupled to network 32. That is, web application server 34 actually runs the software that provides for web site creation according to embodiments of the invention. The software provided by web application server 34 is a middleware application allowing for ODBC database connectivity as well as logical operations. Desirably, the software runs on different platforms and connects to any ODBC-compliant database. This provides for portability and flexibility, which is an advantage of the invention. Preferably, the software runs on operating systems including Sun Solaris, Linux, IBM AIX, Microsoft Windows NT, and Microsoft Windows 95.

Web application server 34 interacts with database server 36, which is also coupled to network 32, in order to provide for web site creation according to embodiments of the invention. Database server 36 stores the information generated and otherwise managed by application server 34, and preferably runs an ODBC-compatible database, as known within the art. Such databases include those available from Oracle, Informix, Sybase and DB2. Server 36 thus itself may be any type of corresponding database server, such as a Microsoft SQL server, a Microsoft FoxPro server, a Microsoft Access server, a Betrive server, an xBase server, etc.; the invention is not so limited.

Database server 36 desirably maintains four tables for access by web application server 34: OLAP data table 38, as known the art, which acts as a corporate information warehouse, OLTP transaction data table 40, table 42 that includes inventory, sales and order processing information, and table 44, which includes work flow and process status information. The construction and maintenance of ODBC-compliant databases is known within the art.

Web server 34 may also interact with other computers and servers coupled to network 32. For example, web application server 34 may access systems 46, including main frame and/or legacy systems that may exist as coupled to network 32. Web application server 34 may also access other servers 48 coupled to network 32, which may include accounting, human resources, EIS, SAP, PeopleSoft, and other servers. Server 34 may also access communication servers 50, which act as an additional manner by which points connected to network 32 can communicate with points outside of network 32, besides the Internet mode provided by web server 30. Servers 50 may include a modem server, an electronic mail and/or fax gateway server, etc.; the invention is not so limited.

Inasmuch as servers 50 permits connection with points outside network 32, such points may be able to provide for the creation of web pages in conjunction with server 34 no different than points within element 10. Finally, network 32 may coupled to one or more client computers 52, which desirably run web browser software, such that each of these client computers 52 is able to communicate with web application server 34. Thus, each of client computers 52 is also able to input information into server 34 such that each may be able to provide for the creation of web pages according to the embodiments of the invention no different than points within element 10.

The advantage provided by integrating the software according to embodiments of the invention as part of web application server 34 is that it permits rapid web site creation. The creation of web sites may be desirably accomplished by any point within element 10, by any client computer 52, and by any point connected to communications server 50. Web application server 34 is connected to network 32 such that it may take advantage of information stored in systems 46, and may interface with other application servers 48 also coupled to network 32. Finally, web application server 34 stores and retrieves information on tables 38, 40, 42 and 44 in an ODBC-compliant manner, such that the server is flexible in that it may desirably use any ODBC-compliant database server. This flexibility and integration ultimately achieves increased organization in the web site creation process, increased quality control, and increased speed and efficiency by virtue of integration with other corporate servers.

Figure 2:
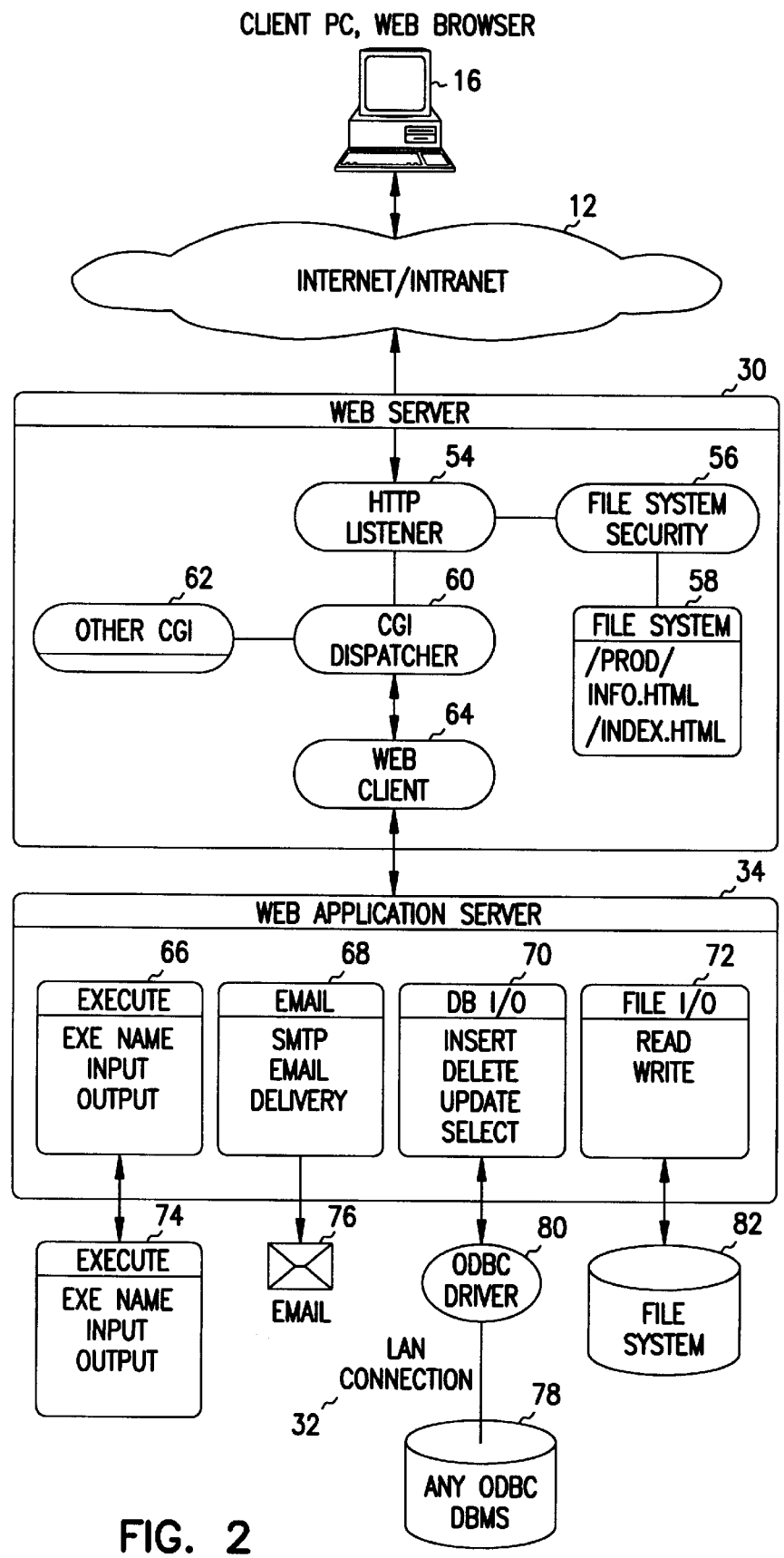
FIG. 2 is a diagram of the system architecture relative to a connection between a web application server and a client computer in detail according to one embodiment of the invention.

Referring next to FIG. 2, a diagram of the system architecture relative to a connection between a web application server and a client computer in detail according to one embodiment of the invention is shown. The diagram of FIG. 2 and the conjoining description providing an understanding of the software aspects of the system architecture. Client computer 16 communicates with web server 30 through Internet 12, as has been described in conjunction with FIGS. 1A and 1B. Web server 30 then itself communicates with web application server 34, as has also been described in conjunction with FIG. 1B.

Web server 30 includes HTTP listener 54, coupled to file system security component 56, which itself is coupled to file system 58 of web server 30. HTTP listener 54 is also coupled to CGI dispatcher 60, to dispatch communication received from client computer 16 to other CGI server clients 62 coupled to dispatcher 60 (and ultimately to their respective servers), as well as to web application client 64, also coupled to dispatcher 60. Thus, when web server 30 receives communications directed to web server 34, it passes such information through web application client 64, which is coupled to web application server 34 (via a network not shown in FIG. 2). HTTP listener 54, CGI dispatcher 60, CGI clients such as CGI server clients 62 and web application 64, file system security 56, and file system 58 are known within the art.

The software architecture of web application server 34 includes four components: execute component 66, email component 68, database input/output (I/O) component 70, and file I/O component 72. Execute component 66 executes executable files represented as element 74, and is able to receive input from and direct output to such files. Email component 68, desirably through the SMTP standard known within the art, receives and sends electronic mail (email) represented as element 76. Note that this email is sent over Internet 12 to computer clients such as computer client 16, or over the network to clients or other points connected in a different manner to web application server 34.

Database I/O component 70 is able to perform operations on database tables stored in tables represented as element 78—such as insert, delete, update and select operations—by accessing an appropriate ODBC driver 80, which connects to the tables over network 32. Finally, file I/O component 72 is able to perform file operations on files stored in file system 82, such as read and write operations. The components of web application server 34 thus form the software architecture in accordance with which embodiments of the invention are implemented, to provide for web creation.

Figure 3:
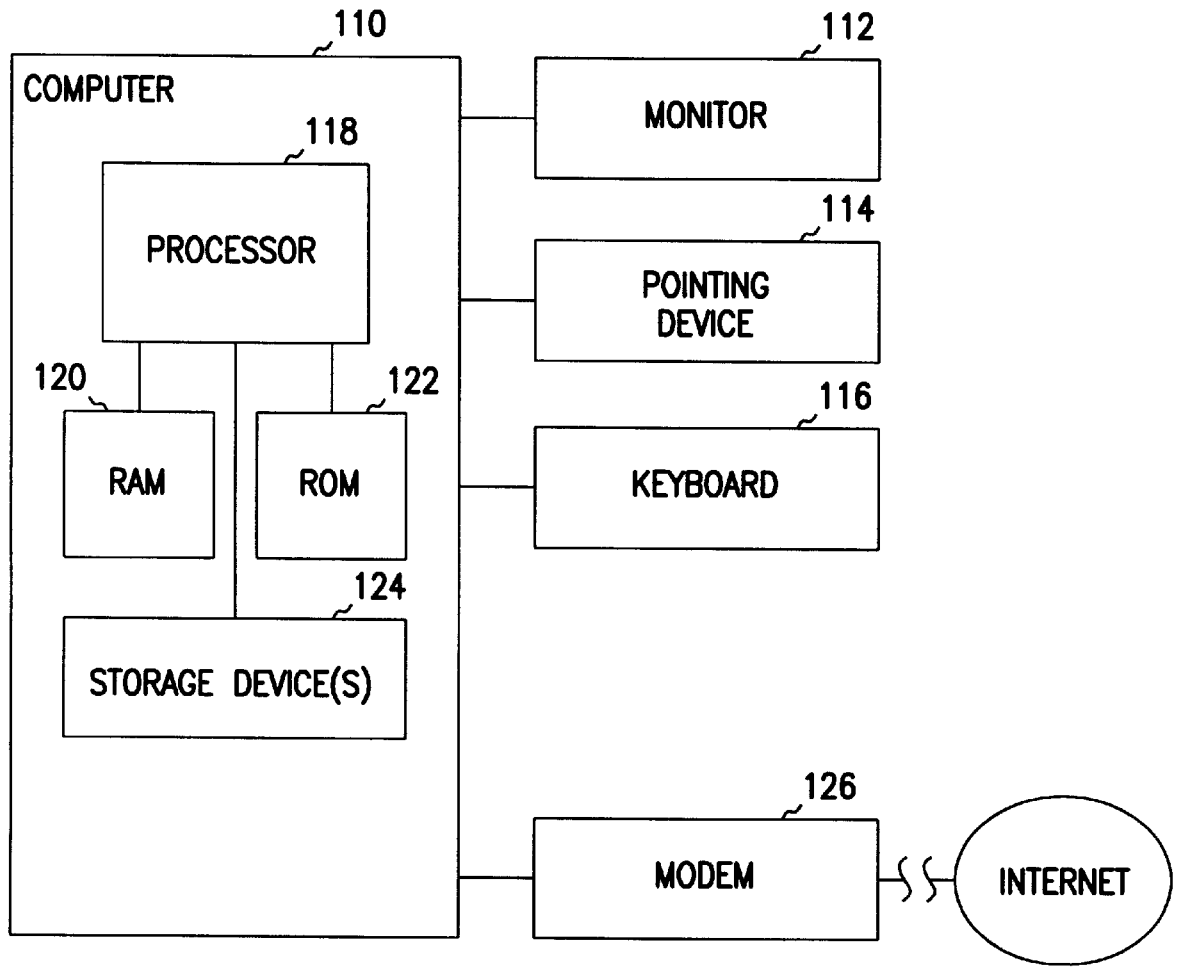
FIG. 3 is a diagram of a typical computer in conjunction with which embodiments of the invention may be implemented.

Referring finally to FIG. 3, a diagram of a typical computer in conjunction with which embodiments of the invention may be implemented is shown. Computer 110 of FIG. 3 represents a computer that may act as a client computer or a server computer in the system architecture; however, the invention is not particularly limited to any type of client or server computer. That is, the description provided herein regarding computer 110 is a description of a typical computer in conjunction with which embodiments of the invention may be practiced.

Computer 110 is operatively coupled to monitor 112, pointing device 114, and keyboard 116. Computer 110 includes processor 118 (preferably, an Intel Pentium processor), random-access memory (RAM) 120 (preferably, at least thirty-two megabytes), read-only memory (ROM) 122, and one or more storage devices 124, such as a hard disk drive, a floppy disk drive (into which a floppy disk can be inserted), an optical disk drive, and a tape cartridge drive. The memory 120 and 122, and the storage devices 124 (e.g., hard drives, floppy disks, etc.), are types of computer-readable media. The invention is not particularly limited to any type of computer 110. Computer 110 desirably is a PC-compatible computer running a version of the Microsoft Windows operating system. The construction and operation of such computers are well known within the art.

Computer 110 may also be communicatively connected to the Internet, any particular manner by which the invention is not limited to, and which is shown in FIG. 3 as modem 126. Internet connectivity is well known within the art. In one embodiment, the computer includes modem 126 and corresponding communication drivers to connect to the Internet via what is known in the art as a "dial-up connection." In another embodiment, the computer includes an Ethernet or similar hardware card to connect to a local-area network (LAN) that itself is connected to the Internet via what is know in the art as a "direct connection" (e.g., T1 line, etc.).

Monitor 112 permits the display of information, including computer, video and other information, for viewing by a user of the computer. The invention is not limited to any particular monitor 112. Such monitors include cathode ray tube (CRT) displays, as well as flat panel displays such as liquid crystal displays (LCD's). Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard.

A description of the system architecture in conjunction with which embodiments of the invention may be implemented has been provided. Specifically, the hardware aspects of the architecture have been described in conjunction with FIGS. 1A and 1B, whereas the software aspects of the architecture have been described in conjunction with FIG. 2. A description of a typical computer in conjunction with which embodiments of the system architecture may be implemented has been described in conjunction with FIG. 3.

Overview of an Embodiment of the Invention

In this section, an overview of an embodiment of the invention is presented, including detailed screen shots, as well as diagrams of input forms that may be utilized in this embodiment. Referring first to FIGS. 4A, 4B, 4C, 4D, a computerized method according to one embodiment of the invention is shown. In step 200, a web site order is placed by a customer at a dealer. The organization has a web application server running software that tracks the computerized process by which the web site is created. This software tracks each step of the process, such that the organization personnel in charge of performing a given step must signal its completion with the software prior to the software permitting the next step to be performed.

The web site order in step 200 may be taken in two manners. First, it may be entered on a paper form, such as those as FIGS. 5A, 5B, and 5C for the placement of a printed piece on the web, as FIGS. 6A, 6B, 6C, 6D, 6E, 6F, and FIG. 6G for a personalized web site, and as FIG. 7(a), FIGS. 7A, 7B, 7C, 7D, 7E, 7F, 7G, and 7H for a completely custom web site. The placement of a printed piece on the web refers to a web site having only one page, as the term page is known within the art. The personalized web site refers to a web site having a home page, as the term home page is known within the art, and four pages to which the home page is dynamically linked. The completely custom web site refers to a web site having a home page, and more than four dynamically linked pages, as directed by the customer.

Second, the web site order may be entered online through online forms as provided over the Internet by the web server application, such as those of FIG. 8(a), FIG. 8(b) FIG. 8(c), FIG. 8(d), FIG. 8(e), FIG. 8(f) and FIG. 8(g), which are screen shots of such an online form. The online order form eliminates double data entry, thus reducing production time. Data is directly stored in a database (such as has been described in the previous section of the detailed description) for future processing. There is no thus need to manually retype a paper-based order form into the system.

The online order form includes fields into which the customer may enter template information from a catalog. The samples are available online and are accessible from the form. The form also allows the customer to add any additional enhancements, as well as choosing the type of maintenance plan they would like to have. The URL address for the web site is also chosen from this form. After the completion of this form the customer may be prompted to enter more specific information including the content for each page, which images are to be placed on the pages, and any links they would like placed on their pages. The form also allows the customer to choose any custom graphics they would like to send via the Internet.

The form is desirably "smart" such that it allows automatic data validation, field size validation, etc., as known within the art, thus allowing quick correction of mistakes. The web application server also performs automatic spell check for content entries from the online form, using a third party external program commonly available and known within the art. As has been stated, the online order form provides for Internet file uploading of customer supplied documents, graphics, etc. Users can directly upload files from their browser to the web server. Thus, there is no need to send other files through traditional mail. Finally, the order form desirably supports a secure socket layer (SSL), as known within the art, for secure processing of financial transactions.

Whether the form is paper-based or online, the form is template driven in one embodiment. Thus, a customer is able to choose a template predesigned for a specific template or industry—such as accounting, advertising, real estate, travel agency, etc.—and then add information to the selected template to customize it to the customer's own business. Specific design options included in one embodiment of the invention include creative elements (such as specific designs for buttons, body text bullets, headers, etc.), background texture, accent colors, and type style (chosen from one of a number of families). The template-driven nature aids in computerizing the process as accomplished and tracked by the web application server software, but still provides customers with a wide variety of choices to ensure that their web sites are unique.

Still referring to FIGS. 4A, 4B, 4C, and 4D, once a web site order is placed in step 200, a customer service representative of the organization enters the information into an online order form provided by the web application server in step 202, if the information has not been already so entered. The customer service representative is able to enter the information into the online order form at any computer having web access, since the web application server itself is connected to the web (likewise, the customer is able to enter the information into the online order form at any computer having web access.

In step 204, a client services representative verifies that a requested Universal Resource Locator (address) desired by the customer is available (i.e., not already used). The URL is what is commonly known as the "web address" of a web site. For example, the URL "www.vallon.com," when typed into a browser as "http://www.vallon.com" (the "http:" signifying the transport protocol to be used) calls up the web site identified by this URL address. Desirably, the validation is instant and in real-time, and performed by the web application server, to automatically verify whether a desired domain name is available.

The customer desirably can choose between a free common domain name, owned by the organization providing the web site creation service, or to order an independent domain name. If the customer orders an independent domain name, the domain name is registered in the customer's name in step 206 with InterNIC, the central Internet domain name service, and thus owned by the customer. The software running on the web application server generates an email message sent to InterNIC to allow for the actual registration of the domain name. Conversely, if the customer chooses a common domain name, the web site's URL address is the common domain name followed by the "company identifier," which is given by the customer (e.g., "www.vallon.com/mycompany). In either case, in step 206 the domain name is entered by the web application server in a database for record keeping.

Steps 200 through 206 of the computerized method are sequentially performed. Steps 208*a*, 208*b*, 208*c*, 208*d*, 208*e* and 208*f*, however, may be performed in any order; the web application server keeps track of which steps 208 in the process have been performed, and once all steps have been performed, proceeds to step 210. Steps 208*a* through 208*f* require human interaction. Each step 208*a* through 208*f* relates to a specific component of the web site specified by the customer. Thus, each of these components can be developed separately from one another or simultaneously. Once each task of 208*a* through 208*f* has been accomplished, the appropriate personnel signals to the web application server that it has been done. The tracking of these tasks by the web application server is exemplarily shown by reference to the screen shot of FIG. 8(*h*).

Still referring to FIGS. 4A, 4B, 4C, and 4D, step 208*a* is the creation of the button images of the web site by the button images maker. Step 208*b* is the creation of the header graphics by the header graphics maker. The button and header images are chosen during the initial order-taking process and are grouped together as creative elements. These components are template images, which are then edited by a graphic artist to fit the context of the site. The header is customized with the company name in a customer-selected font. Step 208*c* is the creation of textual content by the textual content maker. The text content for the page is taken from its original form (either a text file or an entry in the order form) and edited as requested, and then saved in a standard format that will later be added to the web site.

Step 208*d* is the preparation of stock photos—if ordered by the customer—by the stock photo handler. Such stock photos are edited by a graphic artist for use on the web site. Step 208*e* is the creation of site enhancements—if ordered—by the site enhancement maker. This is accomplished by a programmer to best fit with the specific web site; common site enhancements include guest books, counters, bulletin-board discussions or conferencing capabilities, classified ad or auction capabilities, order-taking or online subscription form capabilities, transaction capabilities, chat rooms, etc., as known within the art. Finally, step 208*f* is the processing of customer-supplied images—if so supplied by the customer—by the customer-supplied image handler. Customer-supplied images are specifically prepared for use by a graphic artist.

In step 210, once the web application server signals that each of steps 208*a* through 208*f* has been accomplished, the site assembler (i.e., site layout artist) verifies the quality of the components. If the components do not meet predetermined quality control standards, they are sent back to the specific step 208 to fix any identified problems. Upon successful verification, the web site is then assembled in step 212 using a software program such as Microsoft FrontPage, and saved as a series of HTML documents.

Figure 4A:
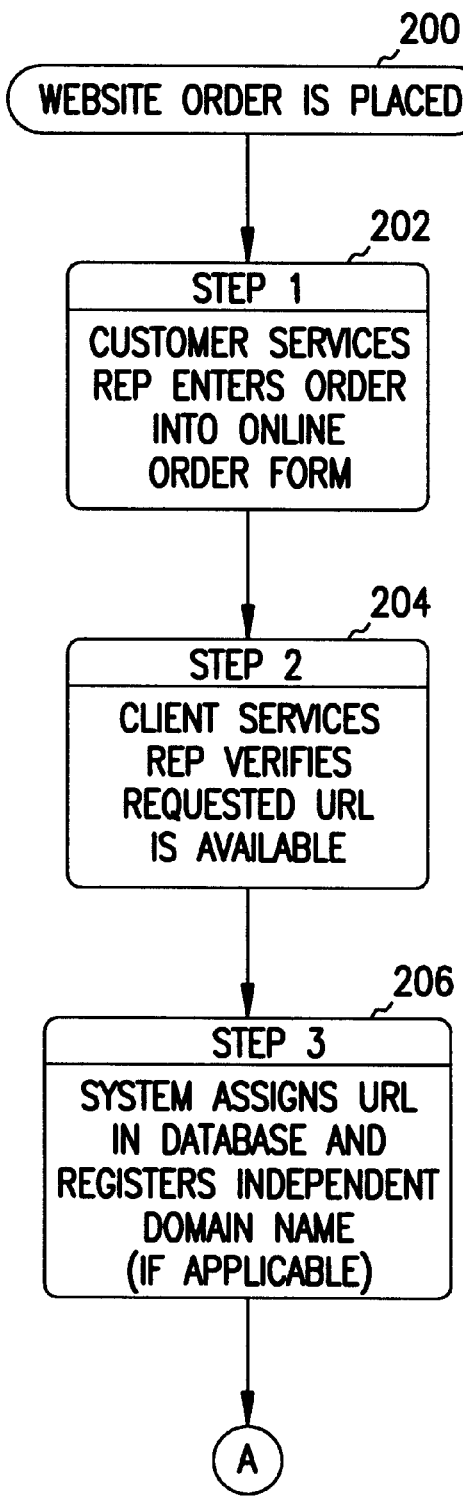
FIGS. 4A, 4B, 4C, and 4D are flowcharts of a computerized method according to one embodiment of the invention.
Figure 4B:
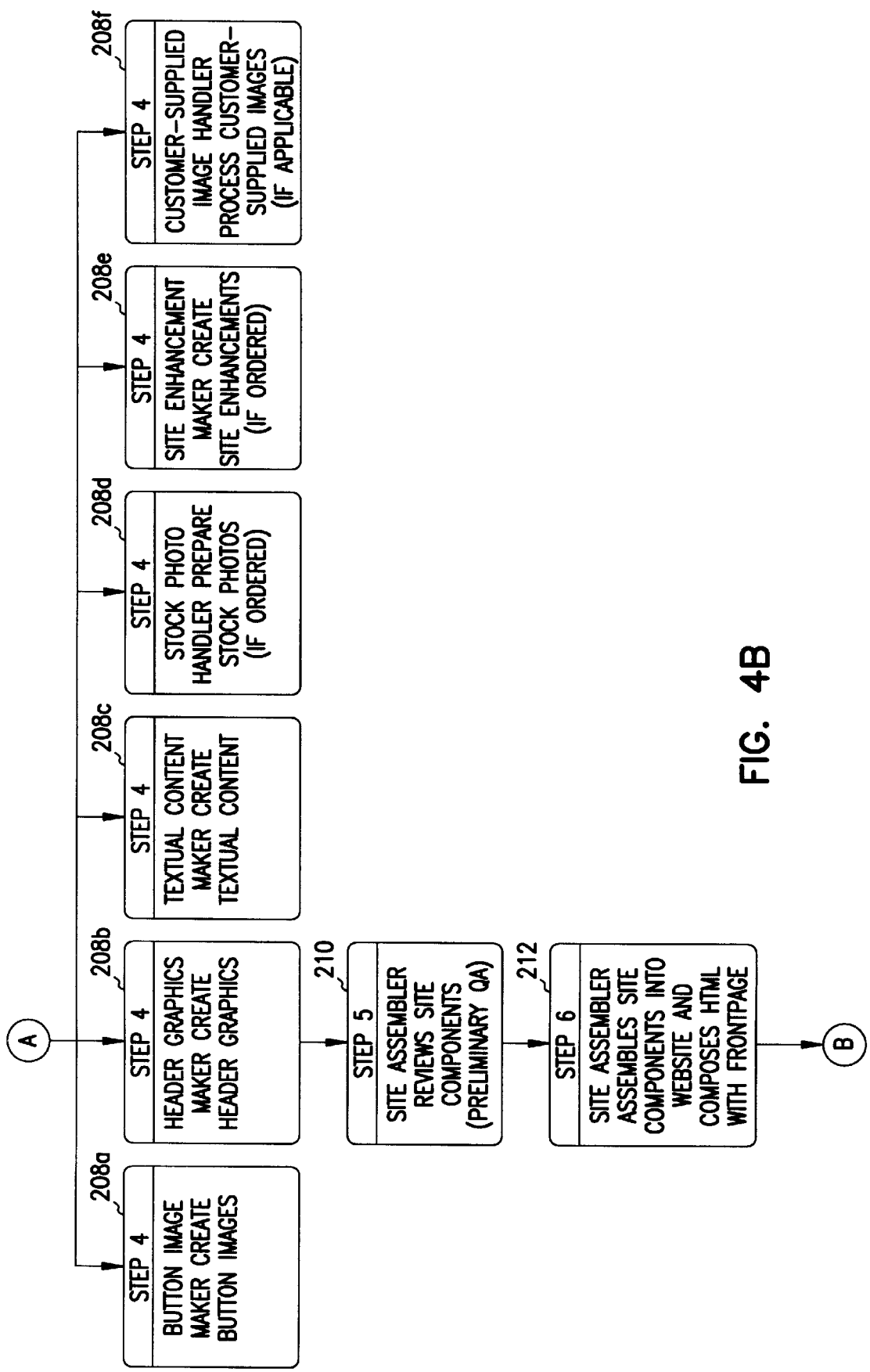
Figure 4C:
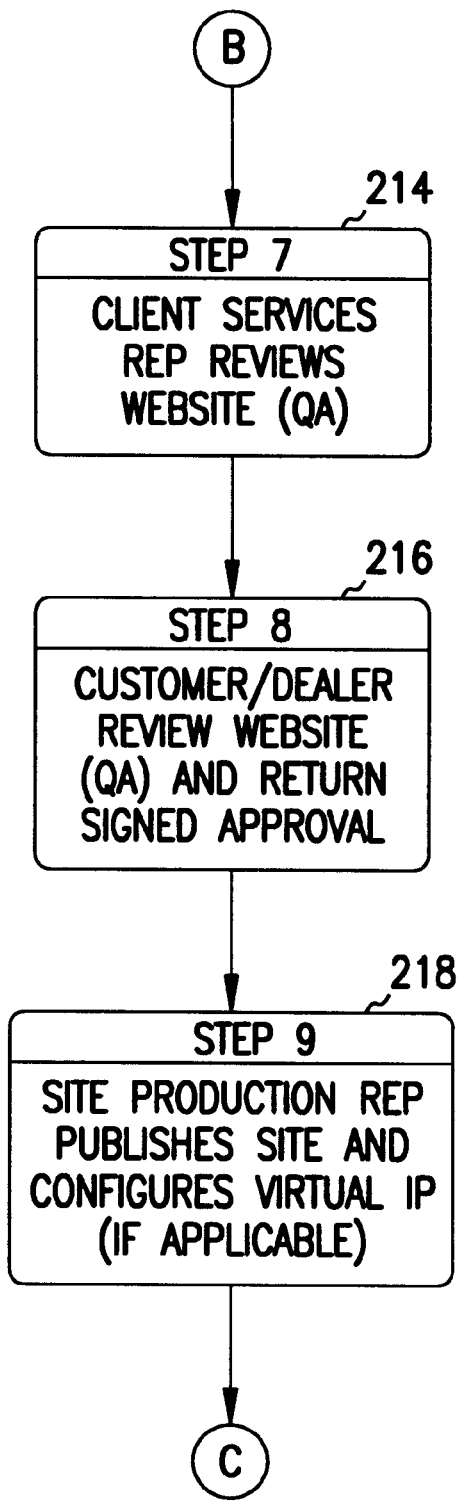
Figure 4D:
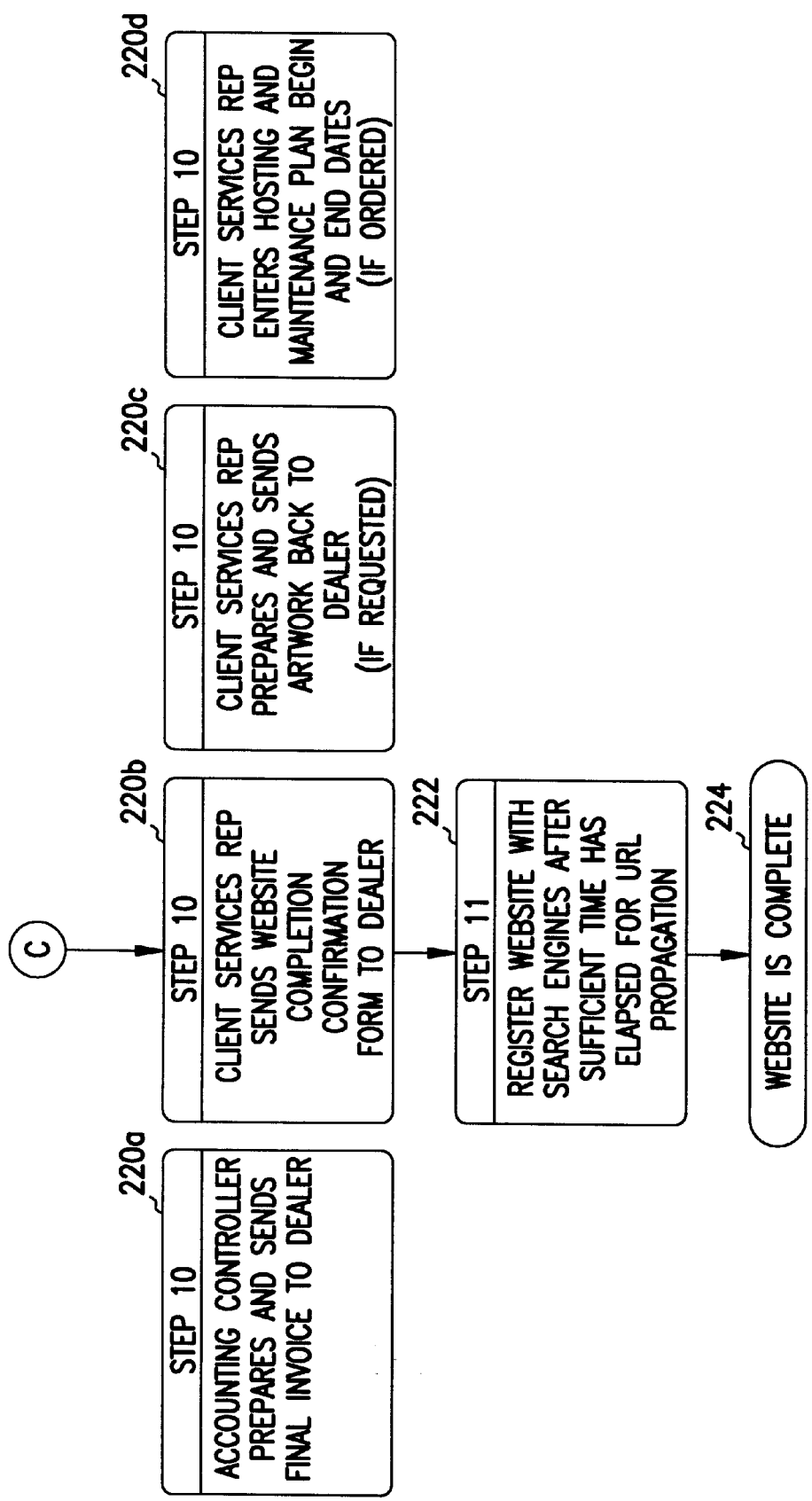

In step 214 of FIG. 4C, a client service representative verifies the quality of the overall site. If the site is deemed to be unacceptable, it is sent back to the site layout artist (i.e., control reverts back to step 212), to repair the identified problems. If the site is acceptable, in step 216 both the customer and dealer review the site and provided signed approval. In step 218, a technical services team member moves the site to a production web server; the software running on the application web server automatically configures the Domain Name Server (DNS) if the customer has requested an independent domain name. The site is now viewable over the Internet.

Steps 220*a*, 220*b*, 220*c* and 220*d* are post-production steps than can be performed simultaneously or separate, to achieve quick completion of the project. The web application server manages the entire process of FIGS. 4A, 4B, 4C, 4D, and thus tracks whether each step 220*a* through 220*d* has been performed. Step 222 is not performed until each step 220*a* through 220*d* has been first performed. Thus, once each task of 220*a* through 220*d* has been accomplished, the appropriate personnel signals to the web application server that it has been done.

In step 220*a*, the accounting controller prepares and sends a final invoice to the dealer. In step 220*b*, the client services representative sends a confirmation form to the dealer to let the dealer know that the site is completed and viewable publicly on the Internet. If the dealer has requested that any artwork is to be returned, the representative sends this as well in step 220*c*. Finally, the client services representative enters any hosting or maintenance plan information that has been requested, including the start and expiration dates for the plan(s). Hosting plans refer to the hosting of the web site at the organization's server for a given period of time. Maintenance plans refer to the maintenance (updating) of the web site as directed by the customer, desirably on a monthly basis, to ensure that the web site conveys current information, such plans also provided for a given period of time.

In step 222, the URL address of the web site is automatically registered by the software running on the web application server with major search engines, such as Lycos, Yahoo, Alta Vista, Excite, etc., as known within the art, after a predetermined amount of time. This aids in publicizing the created web site. The computerized process according to the embodiment of the invention described ends at step 224.

An overview of an embodiment of the invention has been presented. The overview has been presented in conjoining description with a flowchart of a computerized process. Where applicable, detailed screen shots, and diagrams of input forms have been referenced.

Exemplary Methods

In this section of the detailed description, a description is provided of exemplary methods an embodiment of the invention, including detailed flow charts of the embodiment sufficient to enable one of ordinary skill in the art to make and use the invention. The description is provided in conjunction with diagrams (i.e., flowcharts) shown in FIGS. 9–20. The general manner of interpreting these diagrams is as follows. In each diagram, the information objects used in each function (task) as input or output are displayed on the left side. Information objects can be records stored in a database, computer files, or printed material; the invention is not so limited. The arrows at the end of each solid horizontal line connecting the information object to its function(s) describe whether the information object is the input or output of the particular function.

The role assigned to perform each function is shown on the right side of each diagram in the form of a stick figure. Each user of the computerized system is assigned to one or more of these roles for work distribution. Functions are connected to a role by a solid line without arrows. In the center of each diagram are the functions and connecting conditionals. The shaded rectangles represent the functions themselves. Since functions are only performed if certain conditions are met, there is at least one conditional between functions. The control flow, which describes the order the functions are performed, is depicted as broken vertical lines connecting the functions and conditionals. At the beginning and end of each diagram are the conditionals that connect one diagram with the next. These connections are shown as white text on a black shape for easier navigation.

Referring specifically to FIG. 9, customer services representative 200 is responsible for performing functions 202, 204, 206, 208 and 210. Function 202 utilizes information objects 212 and 214 as output, the latter object also utilizing information object 216 as an output. Function 202 utilizes information object 218 as an input. Function 210 utilizes information object 220 as an output.

What a customer order arrives in step 222, in function 202 it is entered into the software running on the web application system, as represented by object 214, which stores it in object 216, which is a database. The order is also entered in an accounting database, represented by object 212. This object 212 may be running on a different server than object 214. The order form itself is represented as object 218. It is noted that in the case where object 218 is electronic, the order is entered directly by the customer or the dealer (not shown in FIG. 9); otherwise, custom services representative 200 enters the information.

At conditional 224, control proceeds to either step 226 or step 228 depending on whether the custom ordered an independent domain name, or a separate directory that is part of the common domain owned by the organization maintaining the web application server software. In the former case, the software automatically verifies whether the domain name is available at function 204. Note that the function 204 indicates to object 214 that this verification was performed. From function 204, control proceeds to conditional 230, which itself proceeds to either step 232 or step 234 depending on whether the requested domain name is already taken, or if it is open. If the domain name is taken, at function 210 a letter is sent to the dealer with which the customer placed the order (represented by object 220), the dealer then responding in step 236 with a new domain name, and control proceeding back to function 204. Once verification at function 204 yields an open domain name, control proceeds from step 234 to function 208, and the domain name is registered with InterNIC.

If at conditional 224 the customer ordered a separate directory that is part of the common domain owned by the organization, control proceeds to step 228 and then to function 206. At function 206, the software as represented by object 214 registers in the database as represented by object 216 the company identifier (i.e., the separate directory within the common domain). From both function 206 and function 208, control proceeds to and conditional 210, which executes tasks 240, 242 and 244, and as necessary (depending on whether the customer so ordered), tasks 246, 248 and/or 250. Tasks 240, 242, 244, 246, 248 and 250 refer to the diagrams of FIG. 10, FIG. 11, FIG. 12, FIG. 13, FIG. 14 and FIG. 15, respectively.

These tasks refer to the creation of the components of the customer-ordered web site, including header images, button images, textual content, stock images, customer-supplied images, and web sit enhancements. The component development team receives the tasks for the necessary components once the URL address has been assigned (i.e., the common domain with company identifier has been registered at function 206, or an independent domain has been registered at function 208).

Figure 10:
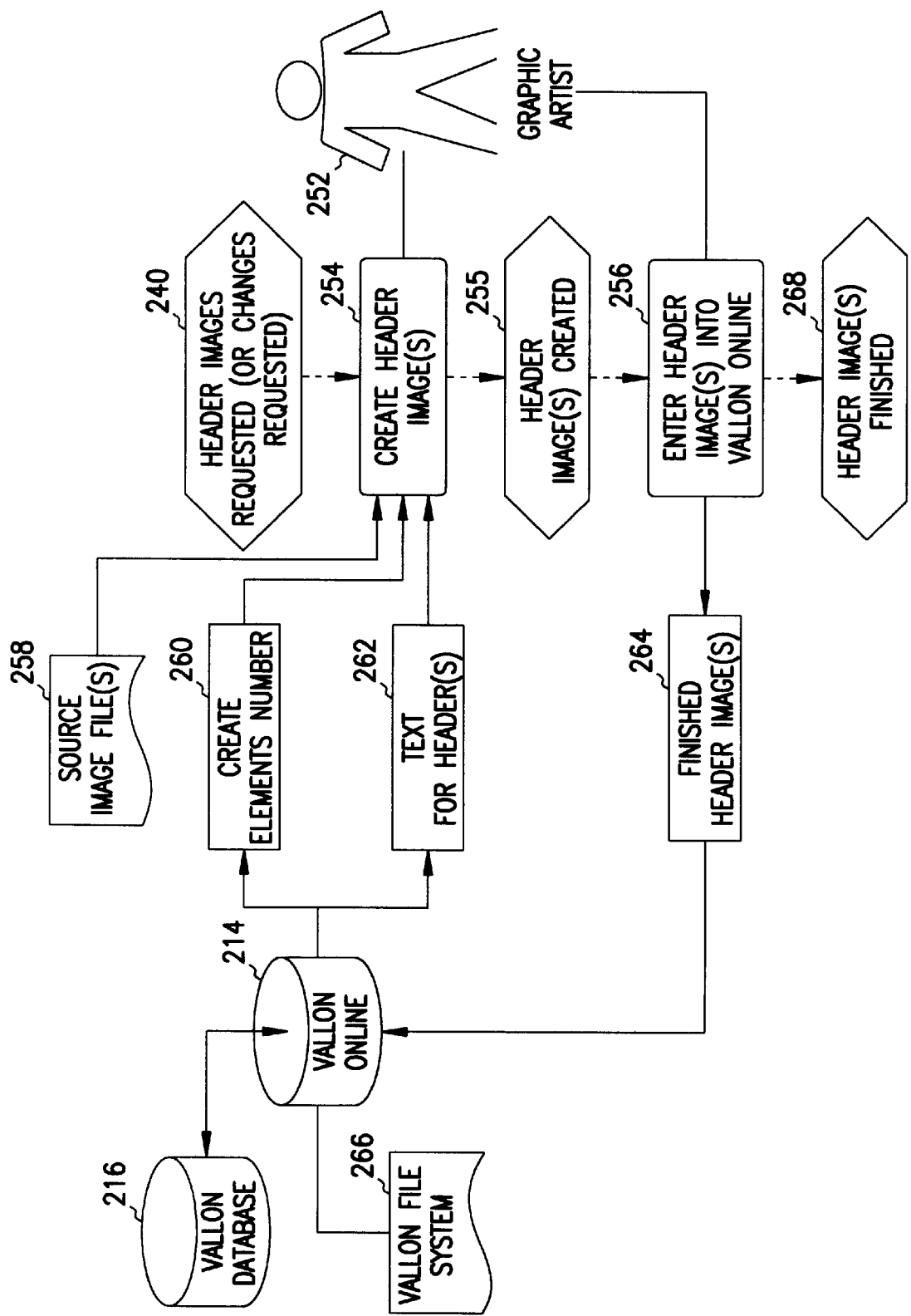

Referring next to FIG. 10, graphic artist 252 is responsible for performing functions 254 and 256. Function 254 utilizes information objects 258, 260 and 262 as input, the latter two objects originating as information stored by information object 214. Function 256 utilizes information object 264 as an output, which is also stored by object 214. Object 214 utilizes object 216 as both an input and an output, and object 266 as an output.

When task 240 is requested, this signifies that header images are needed for a web site, and the software running on the web server application, as represented by object 214, notifies graphic artist 252 of the order by an entry in a work list for the artist. Artist 252 looks up the creative element number for the chosen header (represented by object 260) and the requested header text (represented by object 262) from the order information displayed by object 214, and retrieves the appropriate generic source image files (represented by object 258), which are prepared in advance. With the generic source image files and the requested text, artist 252 in function 254 creates the header images using an image manipulation application program, such as Adobe Photoshop, although the invention is not so limited.

Once the header images are created in step 255, in function 256 artist 252 uploads the completed image file (represented by object 264) to the software (represented by object 214). When all header image files have been completed and uploaded, the header image order for this web site is automatically removed by the software from the artist's work list, and the task is signaled as completed in element 268.

Figure 11:
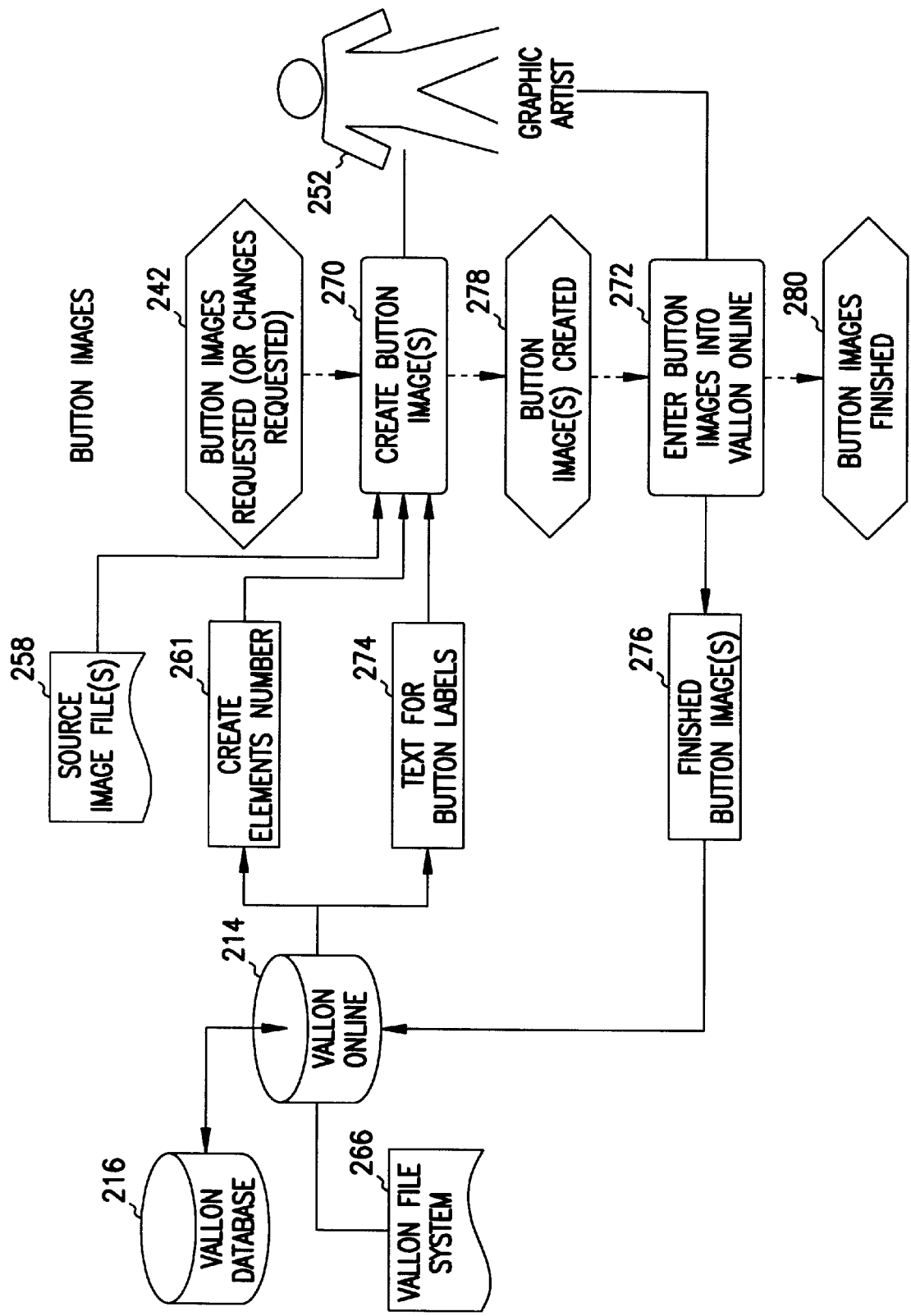

Referring to FIG. 11, graphic artist 252 is responsible for performing functions 270 and 272. Function 270 utilizes objects 258, 261 and 274 as input, the latter two objects originating as information stored by information object 214. Function 272 utilizes information object 276 as an output, which is also stored by object 214. Object 214 utilizes object 216 as both an input and an output, and object 266 as an output.

When task 242 is requested, this signifies that button images are needed for a web site, and the software running on the web server application, as represented by object 214, notifies artist 252 of the order by an entry in a work list for the artist. Artist 252 looks up the creative element number for the chosen buttons (represented by object 261) and the requested text for the button labels (represented by object 274) from the order information displayed by object 214, and retrieves the appropriate generic source image files (represented by object 258), which are prepared in advance. With the generic source image files and the requested text, artist 252 in function 270 creates the button images using an image manipulation application program such as Adobe Photoshop, although the invention is not so limited.

Once the button images are created in step 278, in function 272 artist 252 uploads the completed image file (represented by object 276) to the software (represented by object 214). When all button image files have been completed and uploaded, the button image order for this web site is automatically removed by the software from the artist's work list, and the task is signaled as completed in element 280.

Figure 12:
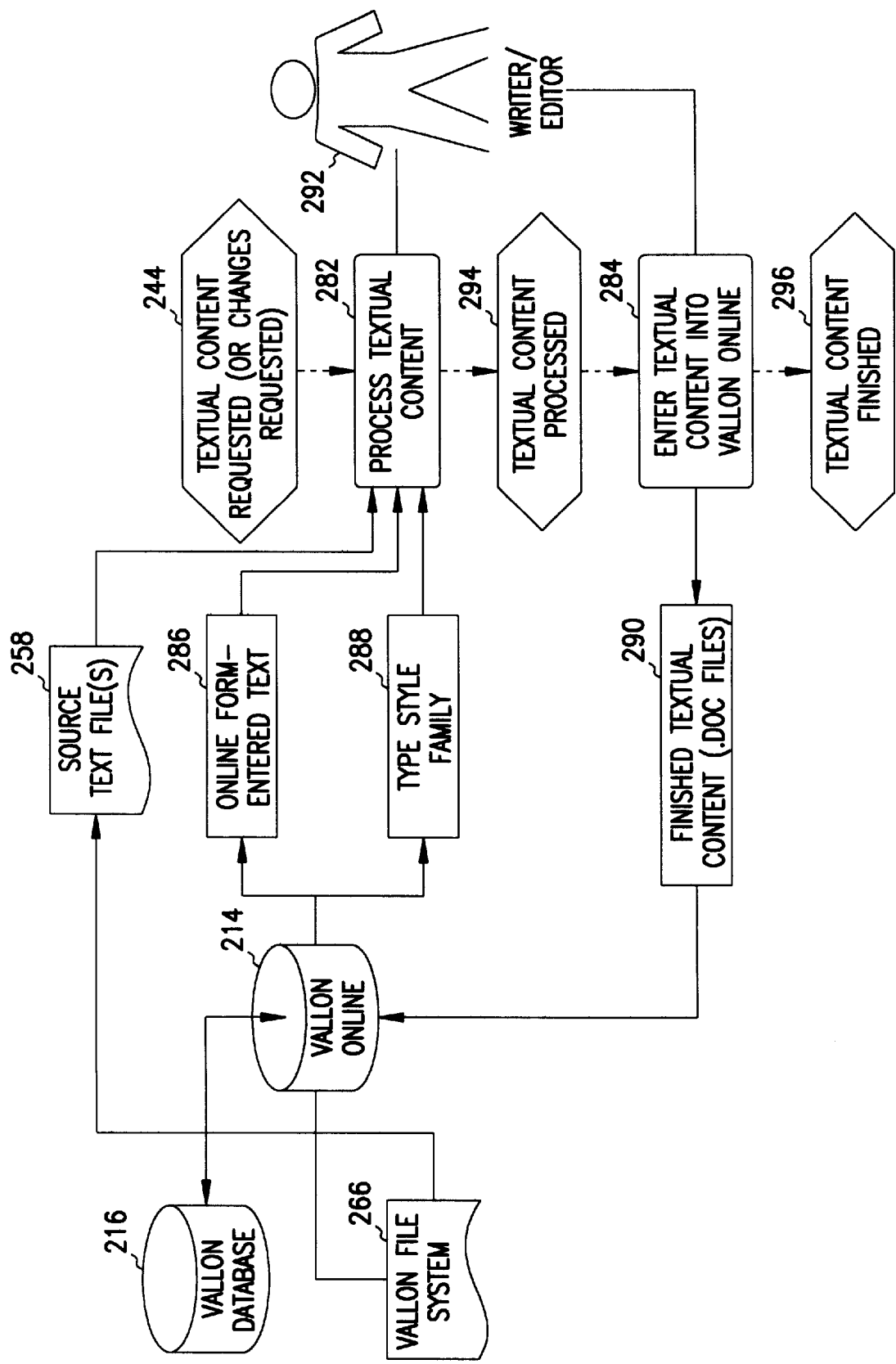

Referring to FIG. 12, creative writer 292 is responsible for performing functions 282 and 284. Function 282 utilizes objects 258, 286 and 288 as input, the latter two objects originating as information stored by information object 214. Function 284 utilizes information object 290 as an output, which is also stored by object 214. Object 214 utilizes object 216 as both an input and an output, and object 266 as an output.

When task 244 is requested, this signifies that text content is needed for a web site, and the software running on the web server application, as represented by object 214, notifies writer 292 of the order by an entry in a work list for the writer. Writer 292 looks up information regarding the ordered text content, including the actual text (represented by object 286), and the type style family in which the text is to appear (represented by object 288), from the order information displayed by object 214, and retrieves the appropriate generic source text files (represented by object 258), which are prepared in advance. With this information, writer 292 in function 282 writes or reworks the text content using a word processing application program such as Microsoft Word, although the invention is not so limited.

Once the textual content has been processed in step 294, in function 284 writer 292 uploads the completed textual content file (represented by object 290) to the software (represented by object 214). When all textual content files have been completed and uploaded, the textual content order for this web site is automatically removed by the software from the writer's work list, and the task is signaled as completed in element 296.

Figure 13:
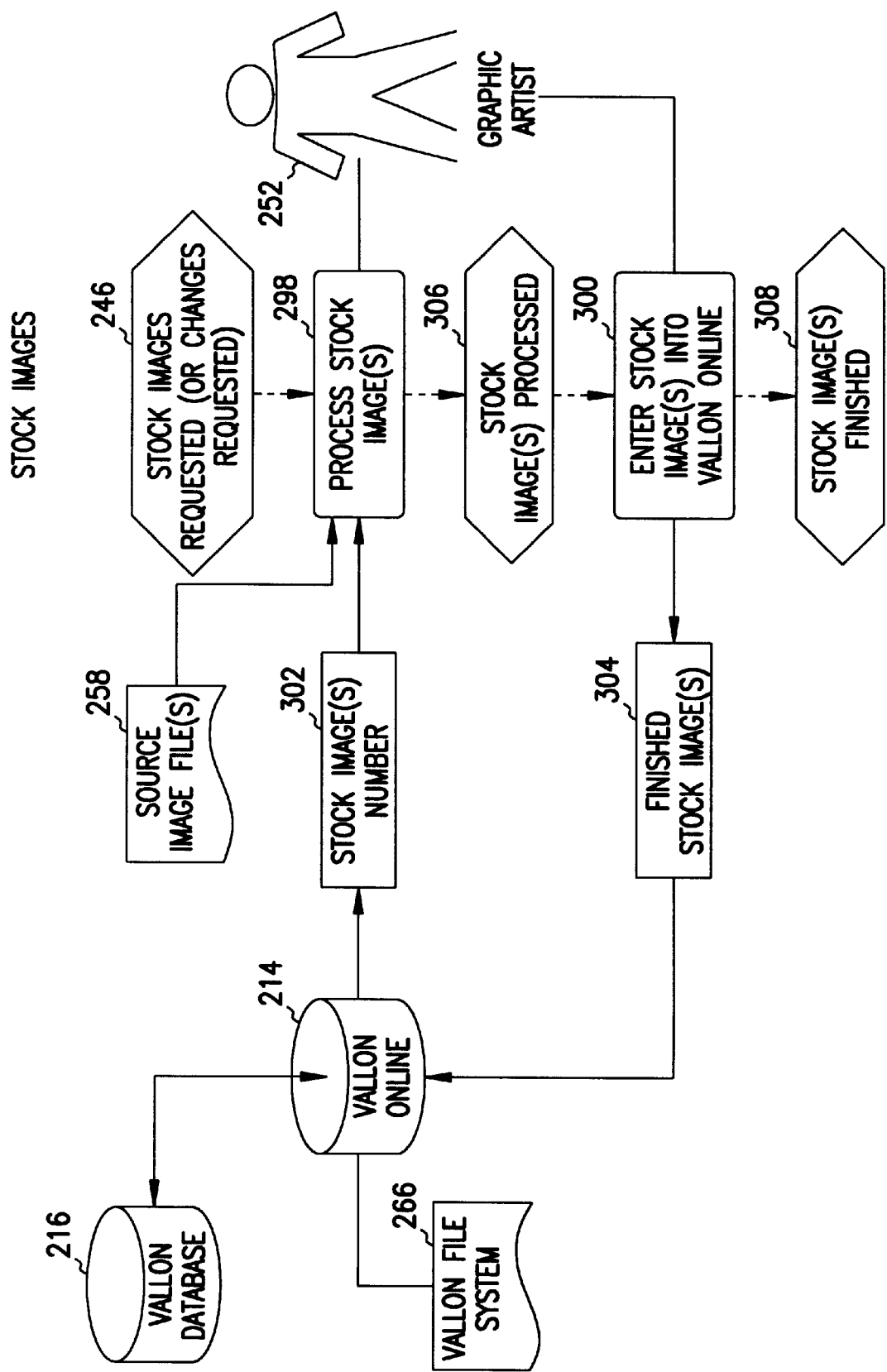

Referring to FIG. 13, graphic artist 252 is responsible for performing functions 298 and 300. Function 298 utilizes objects 258 and 302 as input, the latter object originating as information stored by object 214. Function 300 utilizes information object 304 as an output, which is also stored by object 214. Object 214 utilizes object 216 as both an input and an output, and object 266 as an output.

When task 246 is requested, this signifies that stock photographs are needed for a web site, and the software running on the web server application, as represented by object 214, notifies artist 252 of the order by an appropriate entry in a work list for the artist. Artist 252 looks up the stock image numbers for the chosen photos (represented by object 302) from the order information displayed by object 214, and retrieves the appropriate generic source image files (represented by object 258), which are prepared in advance. With the generic source image files, artist 252 in function 298 processes the requested stock images, using an image manipulation application program such as Adobe Photoshop, although the invention is not so limited.

Once the stock images are processed in step 306, in function 300 artist 252 uploads the finished stock image file (represented by object 304) to the software (represented by object 214). When all stock image files have been completed and uploaded, the stock images order for this web site is automatically removed by the software from the artist's work list, and the task is signaled as completed in element 308.

Figure 14:
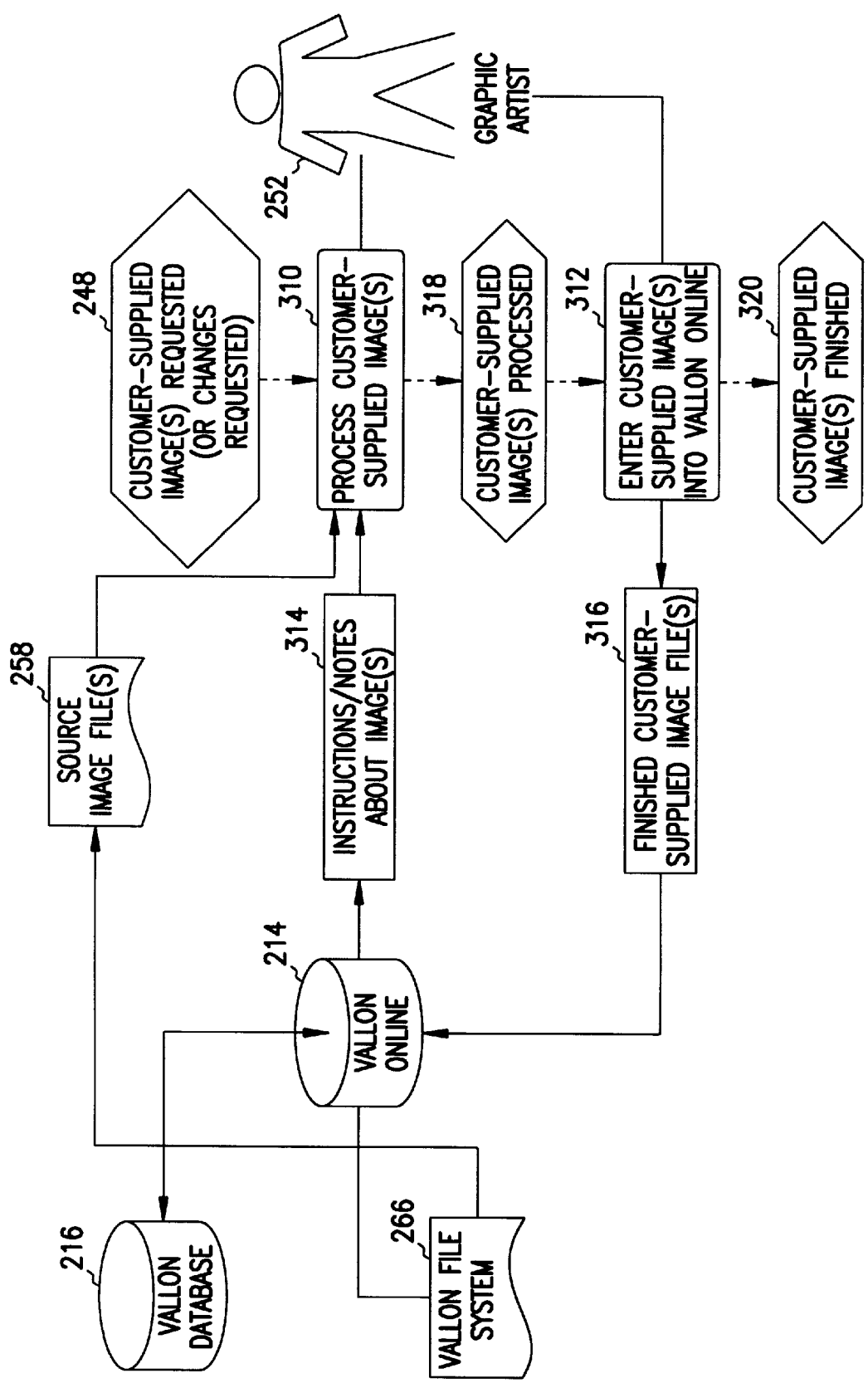

Referring to FIG. 14, graphic artist 252 is responsible for performing functions 310 and 312. Function 310 utilizes objects 258 and 314 as inputs, the latter object originating as information stored by object 214. Function 312 utilizes object 316 as an output, which is also stored by object 214. Object 214 utilizes object 216 as both an input and an output, and object 266 as an output.

When task 248 is requested, this signifies that customer-supplied images have been supplied for a web site, and the software running on the web server application, as represented by object 214, notifies artist 252 of the order by an entry in a work list for the artist. Artist 252 looks up instructions and notes (represented by object 314) about the source image files (represented by object 258) from the order information displayed by object 214, and retrieves the appropriate image files (represented by object 258), which are customer-supplied. With the customer-supplied image files and the instructions and notes as to how to process them, artist 252 in function 310 processes the images using an image manipulation application program such as Adobe Photoshop, although the invention is not so limited.

Once the images have been processed in step 318, in function 312 artist 252 uploads the completed image file (represented by object 316) to the software (represented by object 214). When all customer-supplied image files have been completed and uploaded, the customer-supplied images order for this web site is automatically removed by the software from the artist's work list, and the task is signaled as completed in element 320.

Figure 15:
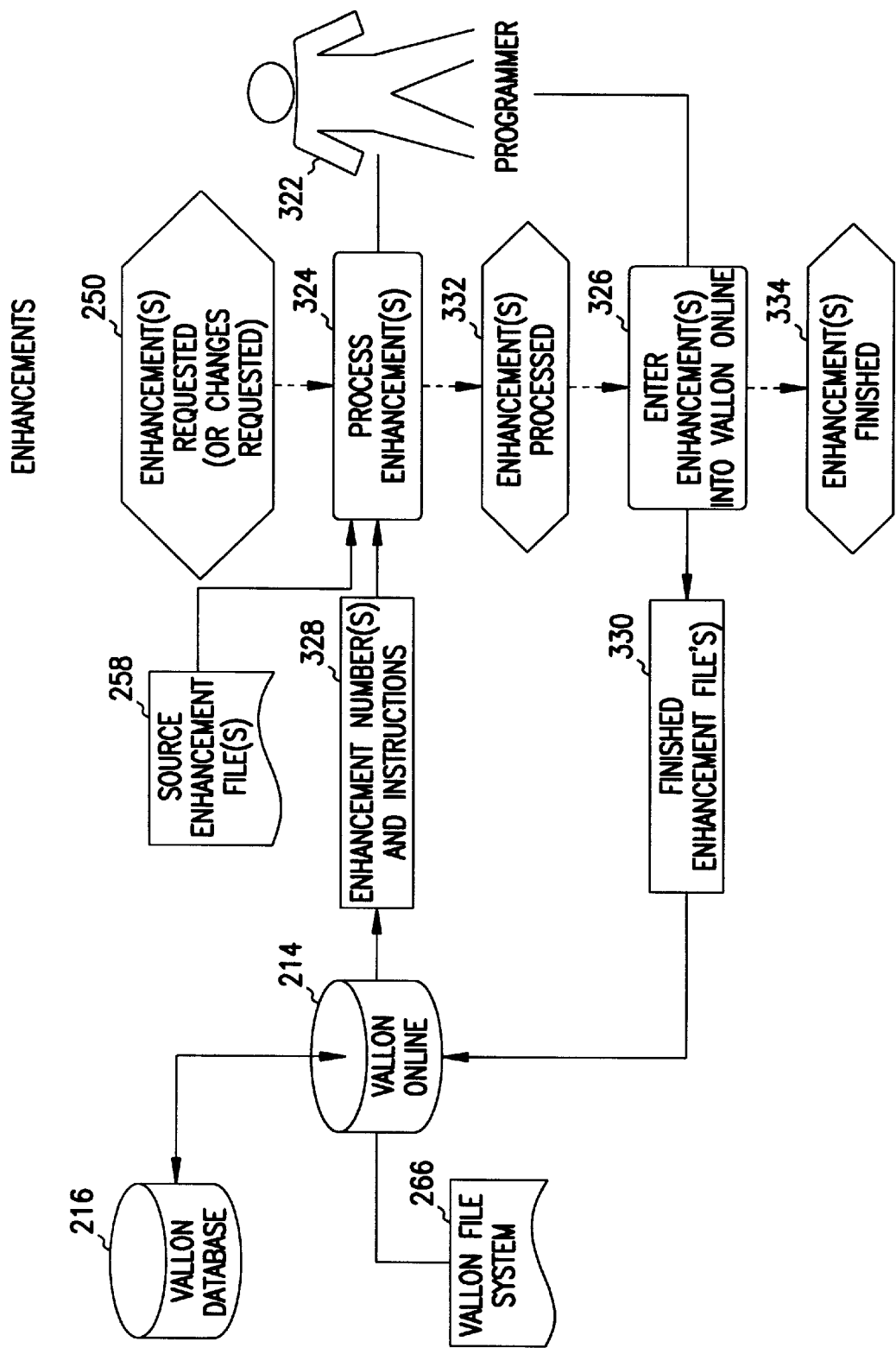

Referring to FIG. 15, programmer 322 is responsible for performing functions 326 and 326. Function 324 utilizes objects 258 and 328 as inputs, the latter object originating as information stored by object 214. Function 326 utilizes information object 330 as an output, which is also stored by object 214. Object 214 utilizes object 216 as both an input and an output, and object 266 as an output.

When task 250 is requested, this signifies that enhancements, as have been described, have been requested for a web site, and the software running on the web server application, as represented by object 214, notifies programmer 322 of the order by an entry in a work list for the programmer. Programmer 322 looks up the enhancement numbers for the requested enhancements (represented by object 328) from the order information displayed by object 214, and retrieves the appropriate source enhancement files (represented by object 258). With the source enhancement files and the requested enhancements, programmer 322 in function 324 programs the enhancements in a language such as CGI, Java, or Perl, as known within the art, although the invention is not so particularly limited.

Once the enhancements have been programmed and processed in step 332, in function 326 programmer 322 uploads the finished enhancement files (represented by object 330) to the software (represented by object 214). When all enhancement files have been completed and uploaded, the enhancement order for this web site is automatically removed by the software from the programmer's work list, and the task is signaled as completed in element 334.

The tasks as described in conjunction with FIGS. 10–15 represent an advantage of the invention. Multiple web sites ordered by multiple customers are able to be tracked by the software running on the web application server, and work on them by the writers, graphic artists, and programmers can be accomplished concurrently. Each of the groups of writers, artists and programmers has specialized knowledge regarding the tasks they are assigned to perform, and thus these tasks can be performed efficiently. Furthermore, the performance of any one task is not dependent on the performance of any other of the tasks. Thus, a programmer can process the enhancements of a web page without having to confer or coordinate with the artist or the writer. This means that web sites can be created rapidly, in a structured manner, such that many web sites can be processed as tracked by the web application server software.

Figure 16A:
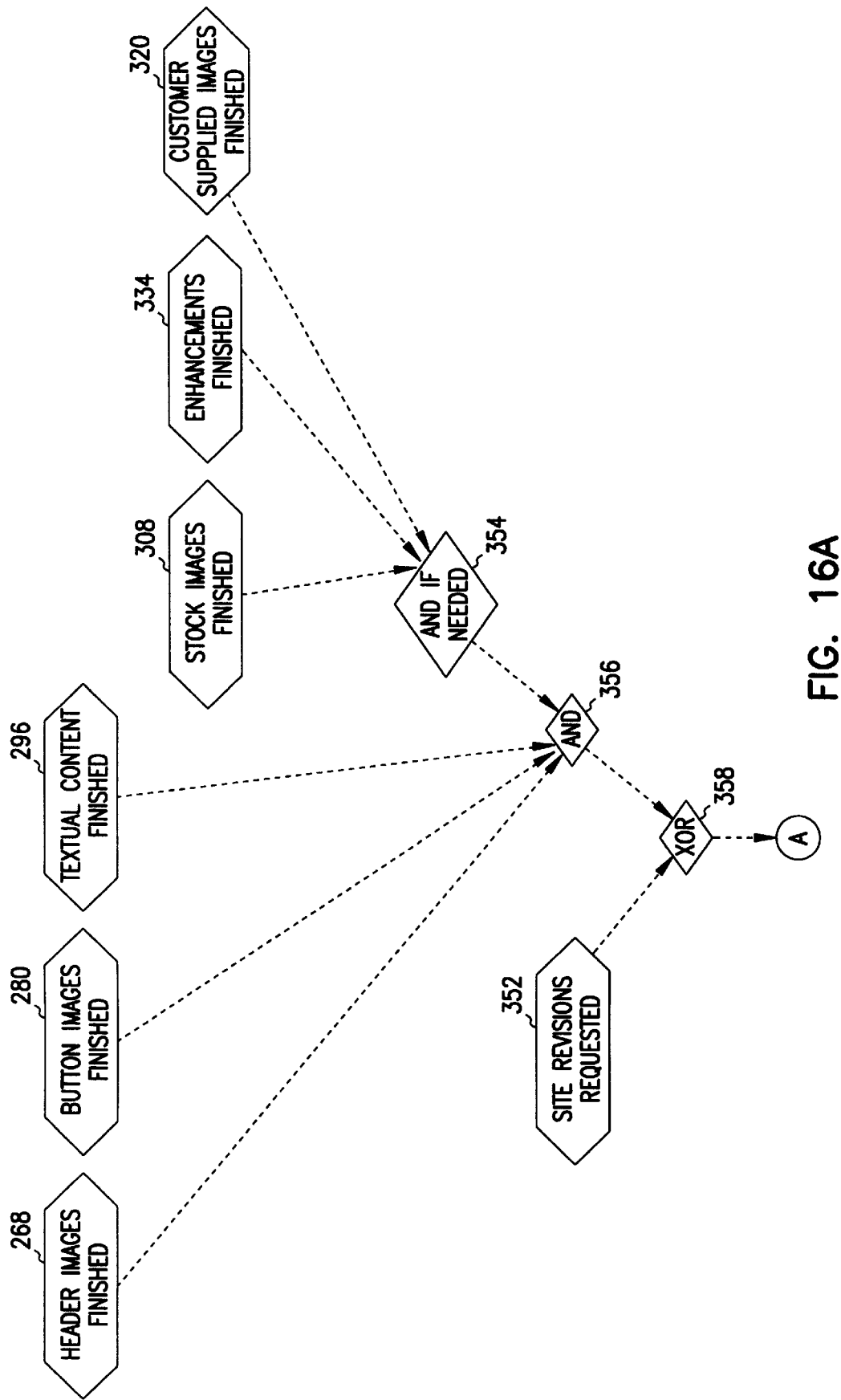
Figure 16B:
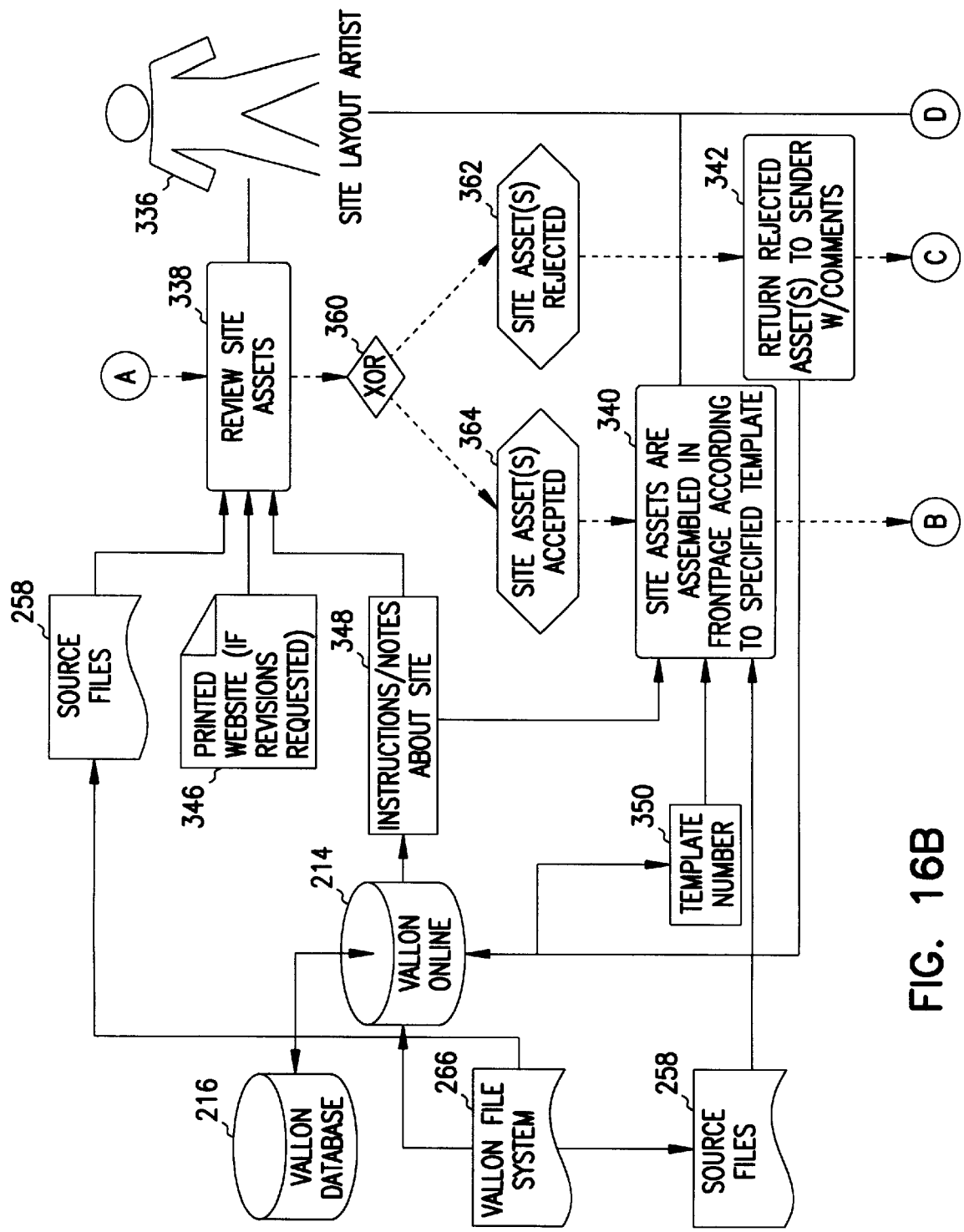
Figure 16C:
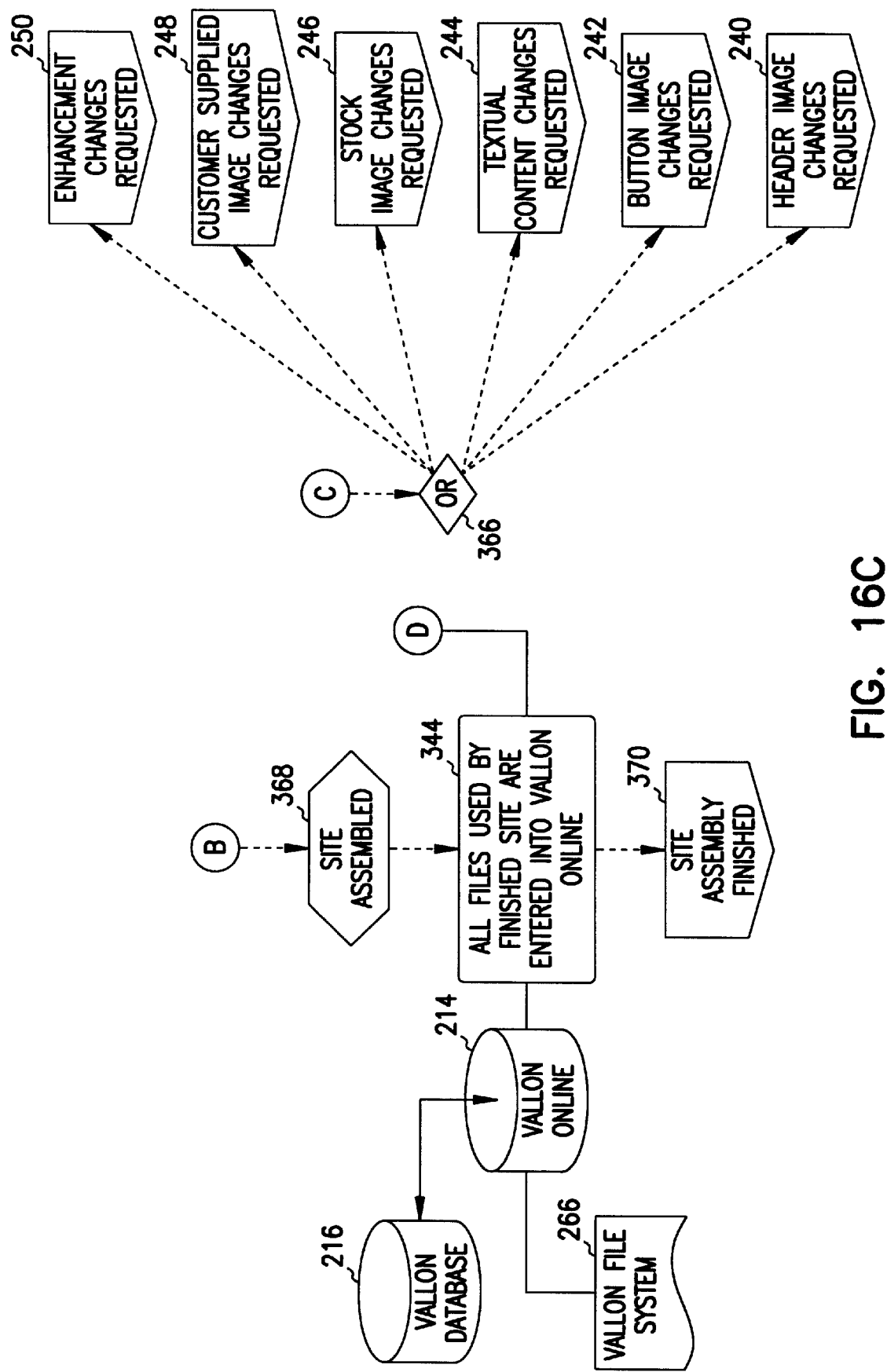

Once the header images, button images, textual content, stock images, customer-supplied images, and enhancements, as requested, have been completed, control proceeds to the method of FIGS. 16, 16B, and 16C. Referring now to FIGS. 16A, 16B, and 16C site layout artist 336 is responsible for performing functions 338, 340, 342 and 344. Function 338 utilizes information objects 258, 348 and 348 as inputs, such that object 258 is output by object 266, and object 348 is output by object 214. Function 340 utilizes information objects 348, 350 and 258 as inputs. Function 342 utilizes information objects 214 and 350 as outputs. Function 344 utilizes information object 214 as an output. Information object 214 itself utilizes objects 216 and 266 as both an input and an output. Object 258 is an output of object 266.

After all the web site components have been completed, as represented by elements 268, 280, 296, 308, 320 and 334, as originating in FIGS. 10, 11, 12, 13, 14 and 15, respectively, or if site revisions are requested by the customer, dealer or other party as represented by element 352, site layout artist 336 performs function 338, as suggested by conditionals 354, 356 and 358. To perform function 338, artist 336 downloads each of the components (represented by object 258) from the file system (represented by object 266), to which the components were previously saved as files by the artists, writers, and programmers performing their respective tasks. Artist 336 also obtains any instructions or notes that were specified by the customer or the dealer (represented by object 348), or any revisions requested on a printed version of the web site (represented by object 346). Artist 336 then reviews the web site as compared to the original order form.

At conditional 360, the site can either be rejected (step 362) or accepted (step 364) by artist 336. Thus, if any of the components are missing, incomplete, or not completed correctly, the component is returned to the creator thereof with comments what the problems are. This is accomplished in function 342. The software (represented by object 214) records that the component is unacceptable, and adds the component back to the creator's work list. The component developer thus is able to read the description of the problems, correct the component, and upload the corrections. Function 342, based on conditional 366, thus begins task 240, 242, 244, 246, 248 and/or 250 depending on the component or components that have been rejected. This forces execution of the appropriate task as has been described.

If the site is accepted, function 340 is performed. Site layout artist 336 in function 340 assembles all the components (represented by object 258) and assembles them into a web site (in an application program such as Microsoft FrontPage; the invention is not so particularly limited, however) according to a template specified by the customer (represented by object 350), as has been described, and also in accordance with any instructions or notes that have been provided about the site (represented by object 348). After the site is assembled (step 368), control proceeds to function 344.

Site layout artist 336 in function 344 places all the files in the web site in an appropriate directory on a proof web server (represented as object 266, as directed by object 214), where the site will be reviewed for quality assurance. Site layout artist 336 finally indicates to the software (represented as object 214) that the site has been assembled, the fact of which is recorded in a database (represented as object 216). Site assembly is then finished, as represented by element 370.

Figure 17A:
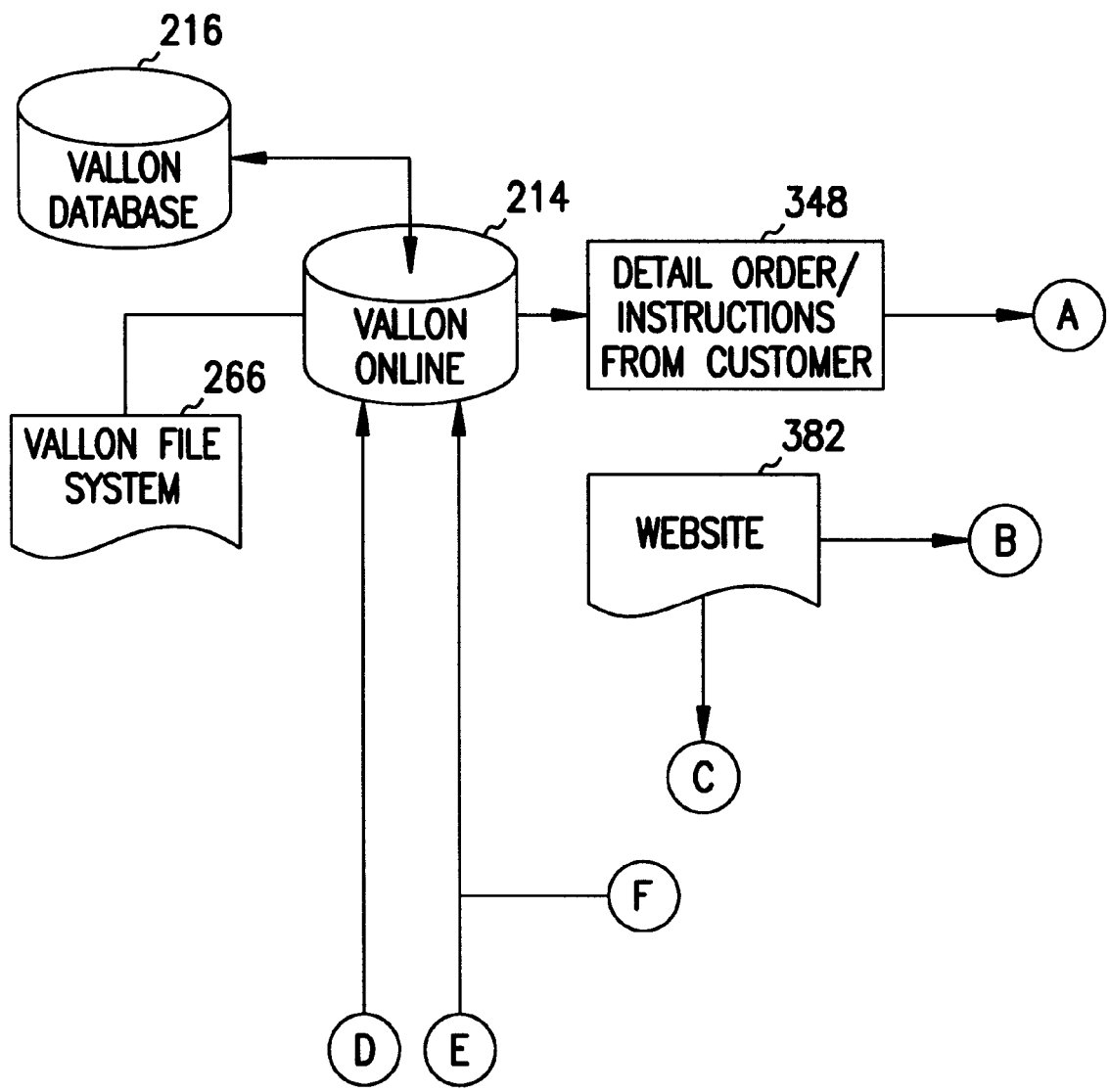
Figure 17B:
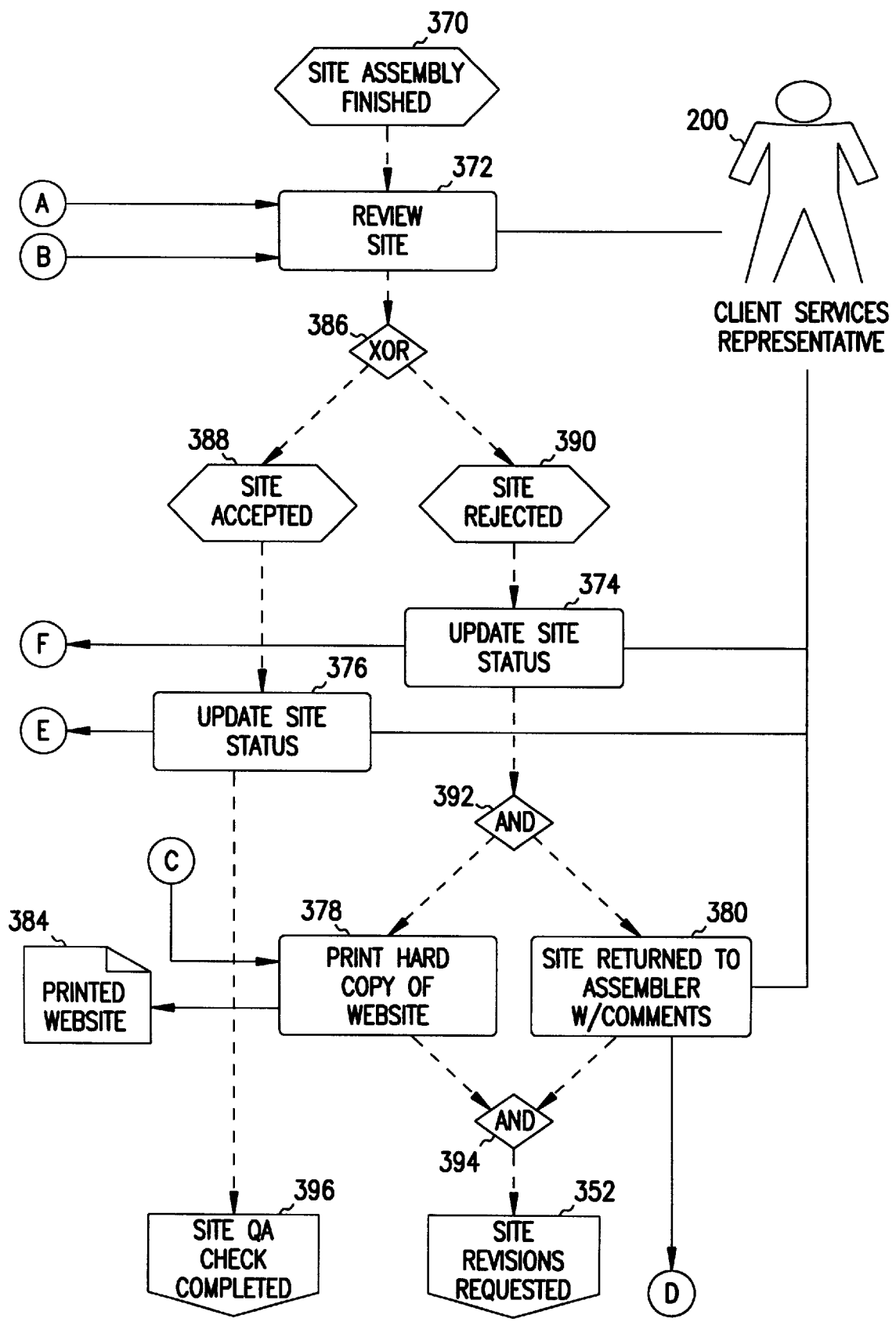

Once assembly has been finished, control proceeds to the method of FIGS. 17A and 17B. Referring now to FIGS. 17A and 17B, client services representative 200 is responsible for performing functions 372, 374, 376, 378 and 380. Function 372 utilizes information objects 348 and 382 as inputs. Functions 374 and 376 utilize object 214 as an output. Function 378 utilizes object 382 as an input, and object 384 as an output. Function 380 utilizes object 214 as an output. Information object 214 itself utilizes objects 216 and 266 as outputs.

After the site assembly has been finished, as represented by element 370, and as originating in FIG. 16C, function 372—quality assurance—is performed by representative 200. Representative 200 reviews the web site (represented as object 382) against the instructions and order received from the customer (represented as object 348). At conditional 386, the site can either be accepted (step 388) or rejected (step 390). If the site is accepted, control proceeds to function 376, where representative 200 updates the status of the site with the software (represented by object 214) as saved in a database (represented by object 216) to "dealer notification/approval in progress." The quality assurance check is thus complete, as represented by element 396.

If, however, the site is rejected, control proceeds first to function 374, where representative 200 updates the status of the site with the software (represented by object 214) as saved in a database (represented by object 216) to "editing and revisions in progress." Via conditional 392, both functions 378 and 380 are performed. In function 378, representative 200 prints a hard copy of the web site (the web site represented by object 382, the hard copy represented by object 384), and makes the necessary changes on the hard copy. In function 380, representative 200 then returns the hard copy pages to the site layout artist (i.e., artist 336 of FIG. 16B), via fax, in person, by e-mail (i.e., scanning in the marked-up pages), etc.

The site layout artist then reviews the requested changes and makes the changes him or herself, or returns the erroneous components with a description of the changes needed via the software (object 214) to the appropriate component developer as has been described in conjunction with FIGS. 16A, 16B, and 16C. That site revisions have been requested is represented by element 352, which returns control to the method of FIG. 16A.

Figure 18A:
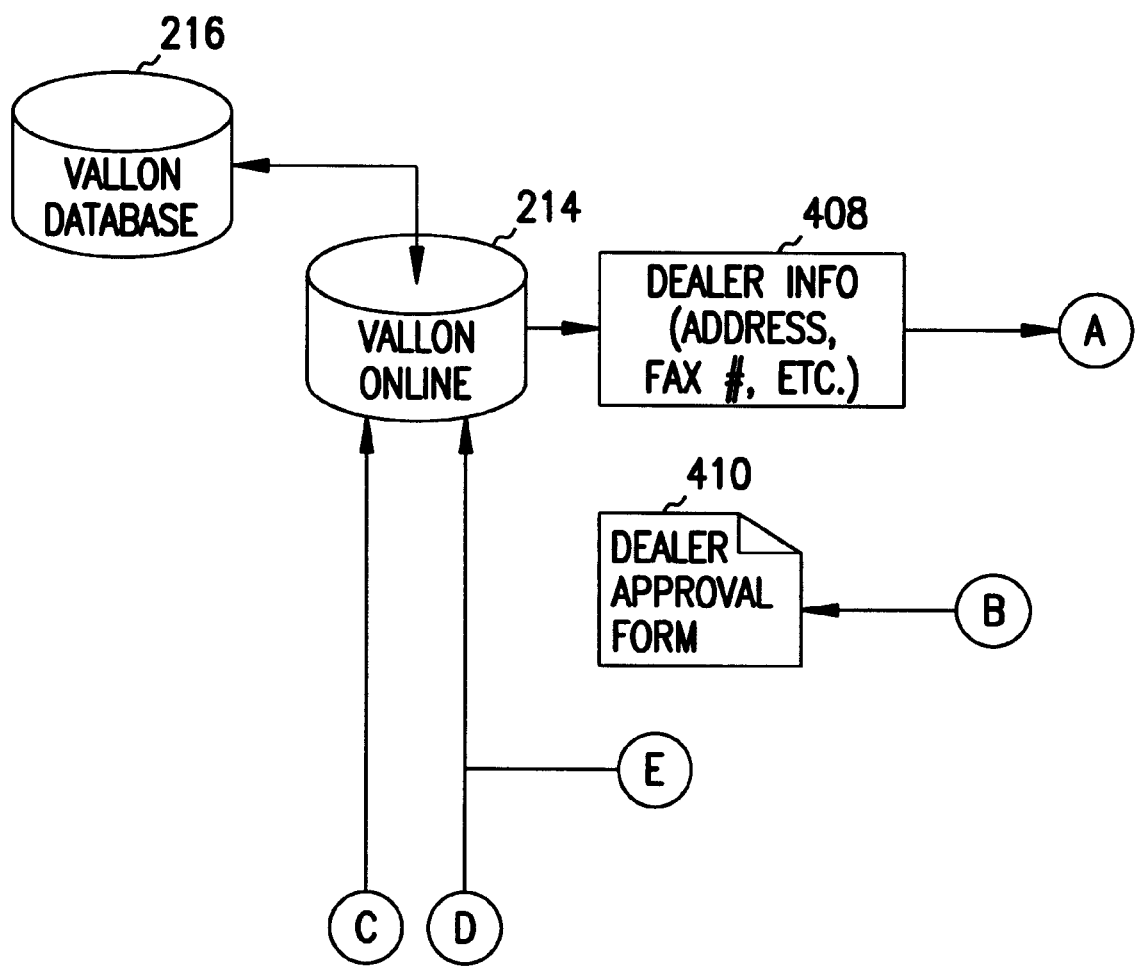
Figure 18B:
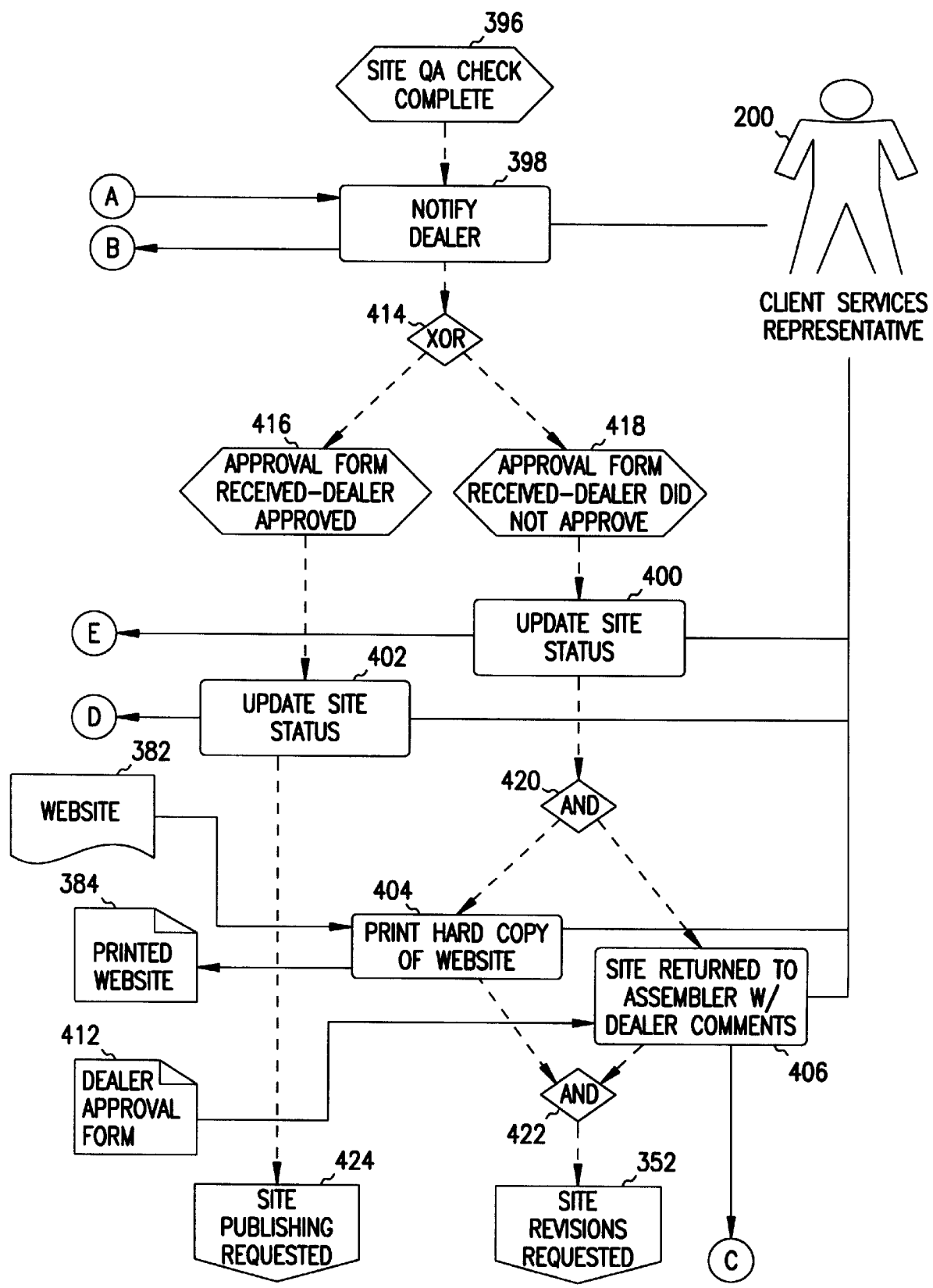

Once the method of FIG. 17 has been successfully completed, such that element 396 is reached, control proceeds to the method of FIGS. 18A and 18B. Referring now to FIG. 18B, representative 200 is responsible for performing functions 398, 400, 402, 404 and 406. Function 398 utilizes object 408 as input and object 410 as output. Functions 400 and 402 utilize object 214 as an output. Function 404 utilizes object 382 as an input and object 384 as an output. Function 406 utilizes object 412 as an input and object 214 as an output. Object 214 itself utilizes object 216 as an output.

After the quality assurance has been completed, as represented by element 398, and as originating in FIGS. 16A, 16B, and 16C function 398 is performed by representative 200. Representative 200 faxes or mails a dealer approval form (represented as object 410) to the dealer responsible for taking the customer's order, the dealer's address information represented as object 408. The dealer and the customer review the web site together over the Internet's world-wide-web (on the proofing server), and indicate their approval or disapproval to representative 200.

At conditional 414, the site can thus either be accepted by the dealer (step 416) or rejected by the dealer (step 420). If the site is accepted, control proceeds to function 402, where representative 200 updates the status of the site with the software (represented as object 214) as saved in a database (represented by object 216) to "dealer approved." Site publishing is then requested, as represented by element 424.

If, however, the site is rejected, control proceeds first to function 400, where representative 200 updates the status of the site with the software (represented as object 214) as saved in a database (represented by object 216) to "editing and revisions in progress." Via conditional 420, both functions 404 and 404 are performed. In function 404, representative 404 prints a hard copy of the web site (the web site represented by object 382, the hard copy represented by object 384), and makes the necessary changes on the hard copy. In function 406, representative 200 then returns the hard copy pages to the site layout artist (i.e., artist 336 of FIG. 16B) along with the dealer approval form indicating the necessary changes as well (represented by object 412), via fax, in person, by e-mail (i.e., scanning in the marked-up pages), etc.

The site layout artist then reviews the requested changes and makes the changes him or herself, or returns the erroneous components with a description of the changes needed via the software (object 214) to the appropriate component developer as has been described in conjunction with FIGS. 16B and 16C. That site revisions have been requested is represented by element 352, which returns control to the method of FIG. 16A.

Figure 19A:
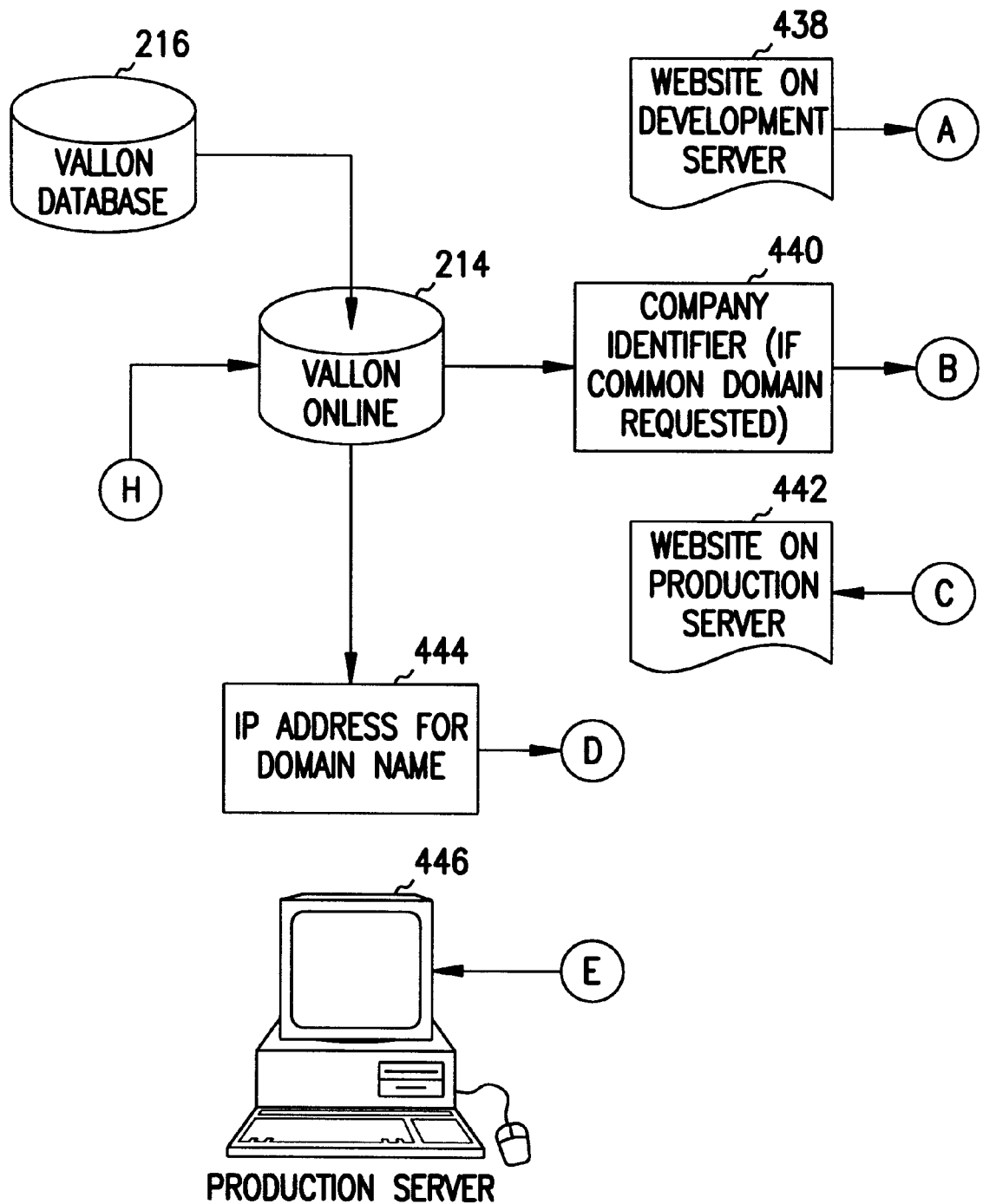
Figure 19B:
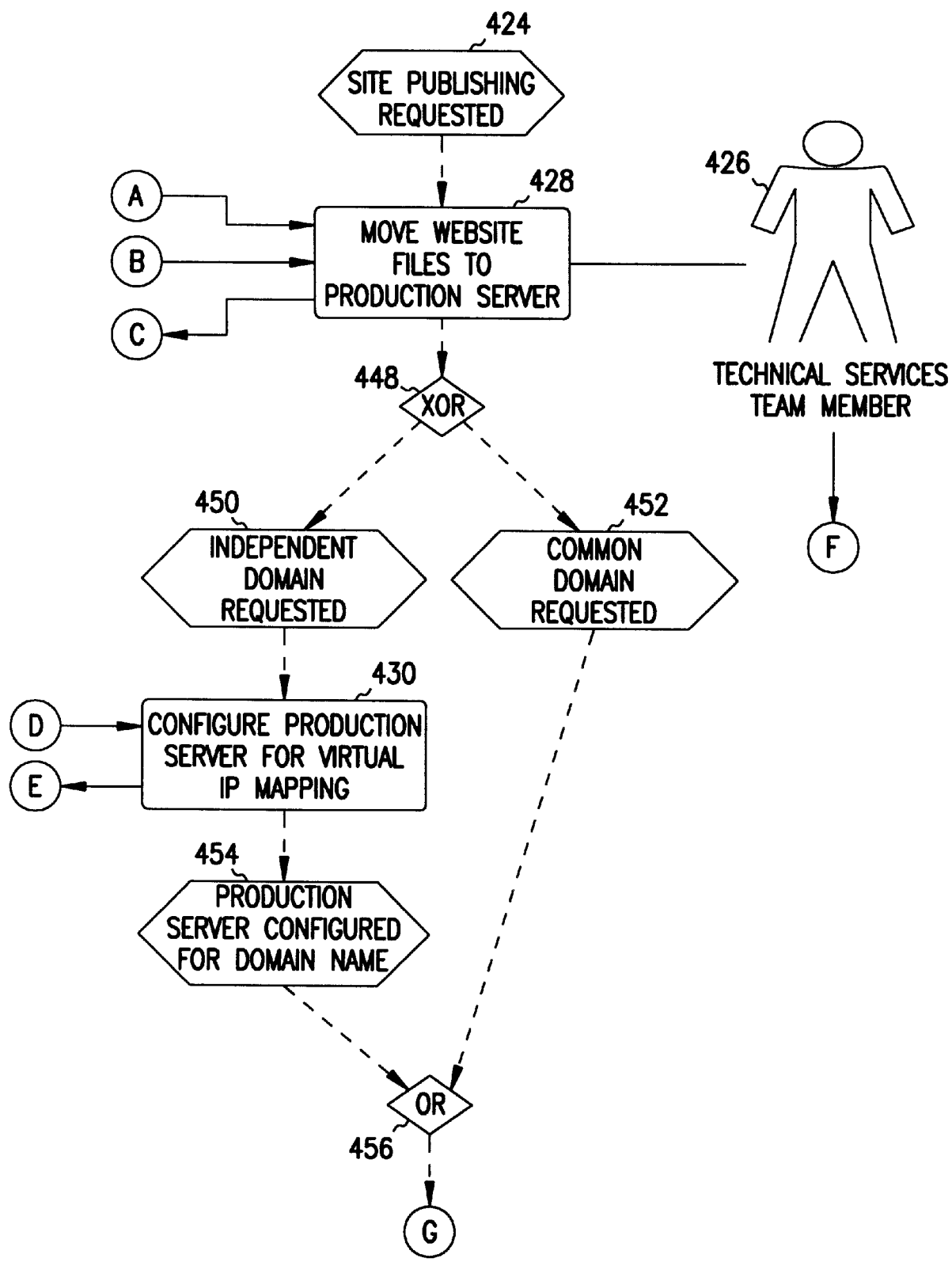
Figure 19C:
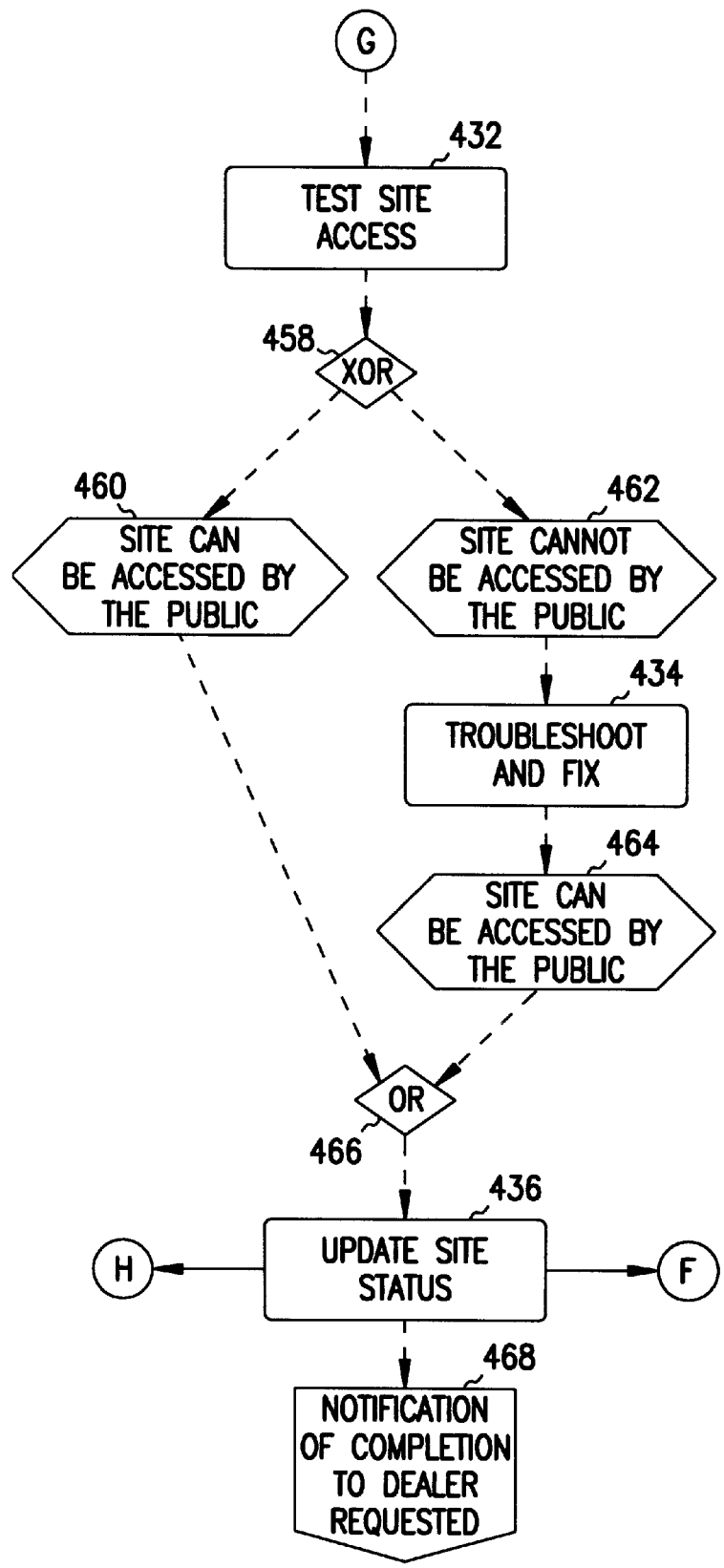

Once the method of FIGS. 18A and 18B has been successfully completed, such that element 424 is reached, control proceeds to the method of FIGS. 19A, 19B, and 19C. Referring now to FIGS. 19A, 19B, and 19C technical services team member is responsible for performing functions 428, 430, 432, 434 and 436. Function 428 utilizes information objects 438 and 440 as inputs, and object 442 as an output. Function 430 utilizes object 444 as an input. Object 440 is an output to object 214, which itself receives an output from object 216. Object 444 receives an output from object 214 as well.

Once site publication has been requested, as represented by element 424, and as originating in FIG. 18B, function 428 is performed by member 426. Member 426 moves the web site files from the proofing server (represented by object 438) to files on the production server (represented by object 442), in a directory as identified by a company identifier information (represented by object 440). At conditional 448, if an independent domain had been requested by the customer (step 450), control proceeds to function 430, otherwise if a common domain had been requested by the customer (step 452), control proceeds to function 432 through conditional 456.

In function 430, member 426 configures the production server 446 for virtual Internet Protocol (IP) mapping, using the IP address for the domain name returned by InterNIC (represented by object 444), as is known within the art. Once the production server has been configured (step 454), control proceeds to function 432 through conditional 456. In function 432, member 426 tests whether the web site can be accessed. In the case where a common domain was requested, the web site URL address is a predetermined address followed by a company identifier (e.g., "http://www.vallon.com/mycompany"); note that the company identifier is also the directory on the production server to which the web site files were moved in function 428. In the case where an independent domain was requested, the web site URL address is uniquely determined by the customer, and points to the directory on the production server to which the web site files were moved in function 428.

At conditional 432, the test of site access succeeds (step 460) or fails (step 462). In the case where it fails, member 426 troubleshoots and fixes the problem in function 434 until the site can be accessed properly (step 464). In either situation, control ultimately proceeds through conditional 466 to function 436. At function 436, member 426 updates a database (represented by object 216) through the web application server software (represented by object 214) such that the status of the web site is considered "published." The public can now access the site through the Internet's world wide web. Notification of the completion of the web site is then requested, as represented by element 468.

Once the method of FIGS. 19A, 19B, and 19C has been successfully completed, such that element 468 is reached, control proceeds to the method of FIGS. 20A, 20B, 20C, and 20D. Referring now to FIGS. 20A, 20B, 20C, and 20D representative 200 is responsible for performing functions 470 and 472, accounting controller 488 is responsible for performing functions 474 and 476, site layout artist 336 is responsible for performing functions 478 and 480, and client services representative 200 is responsible for performing functions 482, 484 and 486. Function 470 utilizes information object 492 as an output and information object 490 as an input, which is an output of object 214, which utilizes an output of object 216. Function 472 utilizes object 214 as an output. Function 474 utilizes object 214 as an input and objects 494 and 496 as outputs. Function 476 utilizes object 214 as an output. Function 478 utilizes object 214 as an input and object 498 as an output. Function 480 utilizes object 214 as an output. Function 482 utilizes object 500 as an output. Function 484 utilizes object 214 as an output, as does function 486.

Once notification of the completion of the web site to the dealer has been requested, as represented by element 468, and as originating in FIG. 19C, functions 470 and 472 are performed by representative 200, as indicated by and conditional 502. In function 470, the representative sends a web site completion confirmation form (represented by object 492) to the dealer via fax, e-mail, postal service, etc. This form notifies the dealer that the web site is publicly accessible, but that it may take up to seven days for the entire public to be able to access it due to network propagation, an Internet phenomenon known in the art. The form is mailed to the dealer by virtue of dealer information (represented by object 490), as stored in a database (represented by object 216) and as accessed by the web application server software (represented by object 214).

In function 472, the web site status is updated on the database (represented by object 216) through the software (represented by object 214) as "dealer notification of completion in progress." As indicated by and conditional 504, once functions 470 and 472 have been performed, dealer notification is completed (step 506), and at and conditional 506, functions 474 and 476 are performed by accounting controller 488. The accounting controller in function 474 prepares a final invoice (represented by object 496) for the web site and sends it to the dealer via postal service, fax, etc. Information regarding the dealer to prepare the information is received from the database (represented by object 216) through the software (represented by object 214). Billing information is stored in an accounting software and database (represented by object 494).

In function 476, the web site status is updated on the database (represented by object 216) through the software (represented by object 214) as "dealer billed." As indicated by and condition 510, once functions 474 and 476 have been performed, the final invoice has been prepared and sent (step 512), and at and condition 514, functions 478 and 480 are performed by site layout artist 336. The artist in function 478 registers the web site with major Internet search engines (represented by object 498) such as Yahoo, Infoseek, Excite, Lycos, Alta Vista, etc., as known within the art. Desirably, the web application server software (represented by object 214) provides a form to automate the process.

In function 480, the web site status is updated on the database (represented by object 216) through the software (represented by object 214) as "web site registered." As indicated by and conditional 516, once functions 478 and 480 have been performed, the registration process is complete (step 518), and at and conditional 520, functions 482, 484 and 486 are performed by representative 200. In function 482, the representative returns any artwork to the dealer (represented by object 500) that has been provided by the customer, if requested. In function 486, the representative sets the hosting and maintenance plans' beginning and expiration dates, if the customer has so ordered such plans. When the hosting or the maintenance plan expires, the software (represented by object 214) automatically sends an email to the customer reminding the customer to renew the plans. An email renewal notice is also sent to the customer when the independent domain name (if so ordered) is near its expiration date.

Figure 20A:
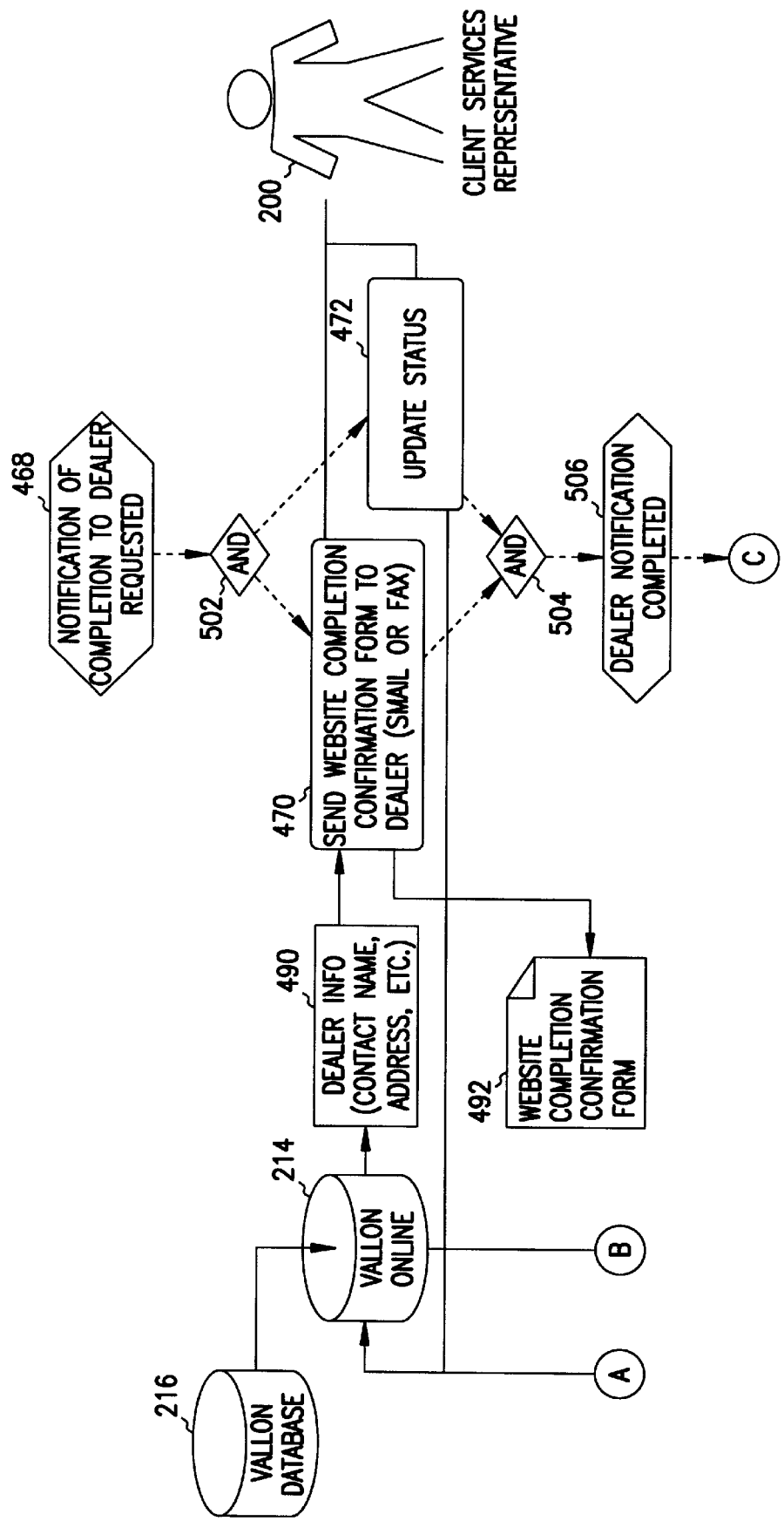
Figure 20B:
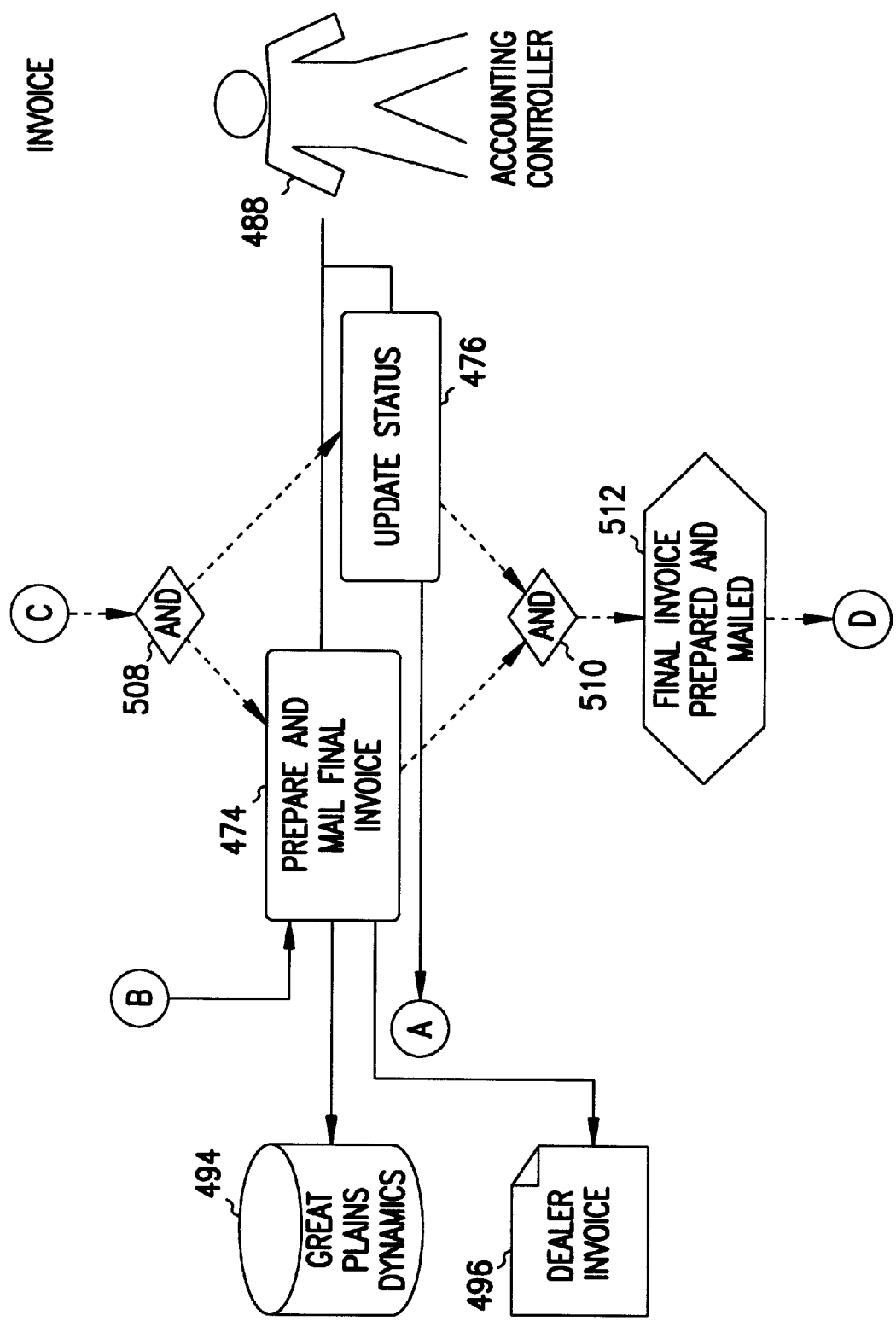
Figure 20C:
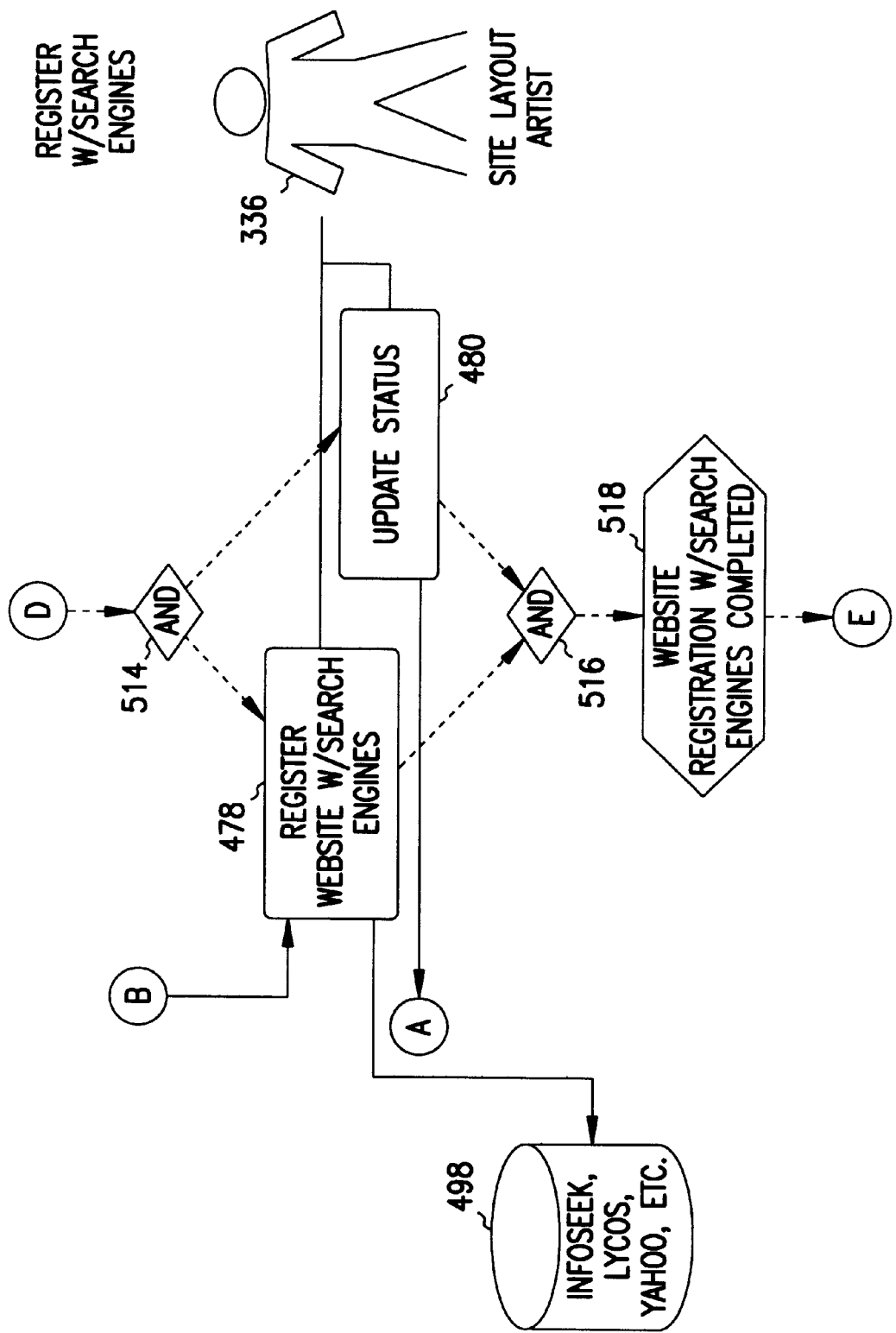
Figure 20D:
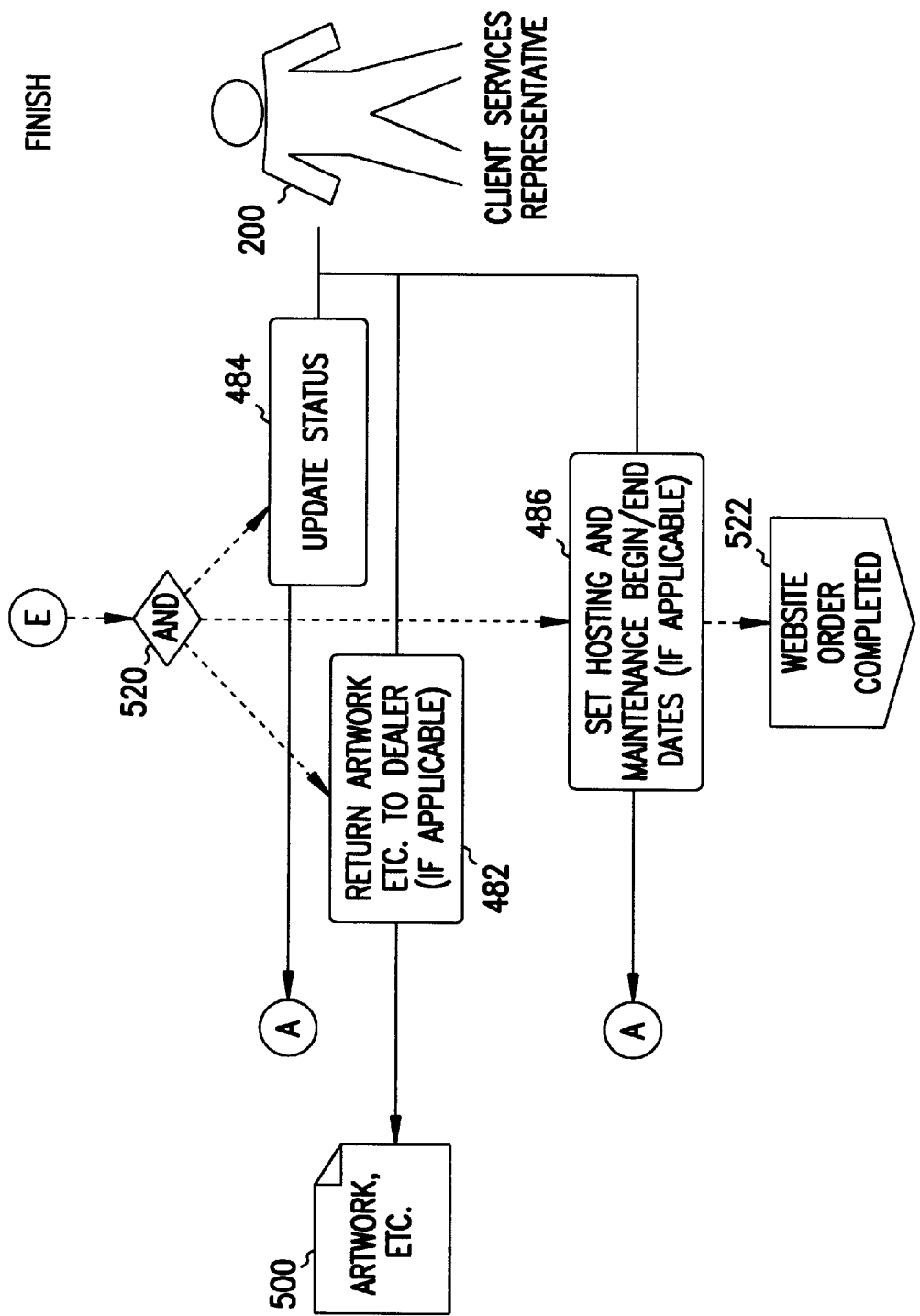

In function 484, the web site status is updated on the database (represented by object 216) through the software (represented by object 214) as "web site completed." The methods of FIGS. 9–20 ends at element 522 of FIG. 20D.

It is noted that the customer may cancel the web site order at any stage by notifying the organization responsible for creating the web site through the dealer. If this happens, the client services representative immediately updates the status of the web site to "cancelled" and sends an email message to the site layout artist, notifying that the web site has been cancelled. If any component developers are working on the web site, the site layout artist notifies them of the site cancellation via an email message.

During the process of web site development, the client services representative has overall control of the work flow by changing the web site status arbitrarily as needed. The site layout artist is responsible for the development of the web site at the technical level. Organization managers have the ability to perform any of the tasks involved with web site creation by filling in for others.

A description of exemplary methods according to an embodiment of the invention has been provided. The description has been provided in conjunction with detailed flow charts of the embodiment. These flow charts are sufficient to enable one of ordinary skill in the art to make and use the invention.

Generalized Work Flow

In this section of the detailed description, a description of generalized work flow diagrams according to one embodiment of the invention is presented, from which the embodiments of the previous sections can be instantiated. This description includes specific description as to how the embodiments of the previous sections relate to and are instantiated from the generalized work flow diagrams. The description is provided in conjunction with FIGS. 21–36.

Referring first to FIGS. 21A, 21B, 22A, and 22B, diagrams of a generalized work flow according to one embodiment of the invention are shown. Several terms are defined desirably as follows: a process is a series of activities in a given work flow, and tracked by a computerized work flow system; each activity is a task, performed by a user. A user may be responsible for either an entire process of activities, or a subset of activities within a process; those activities the user is responsible for are the user's role. Information objects act as the input and/or output of an activity. Transitional conditions govern when a given process is to be activated (instantiated).

The work flow provided in conjunction with FIGS. 21A, 21B, 22A, and 22B provides a generalized work flow that is amenable to governing a suitable set of processes. As has been described in the previous sections of the detailed description, one such suitable set of processes is computerized web site generation. The methods provided in these previous sections are instantiated as specifically deriving from the generalized work flow of FIGS. 21A, 21B, 22A, and 22B as will be described. However, the invention is not so limited to the instantiation of a computerized web site generation set of processes; any suitable set of processes is amenable to the generalized work flow. The generalized work flow provides a systematic manner by which any such set of processes can be executed in an orderly manner, such that it is tracked in accordance with a computerized work flow system (such as that as has been described as web application server software in the specific instantiation of a computerized web site generation).

Figure 21A:
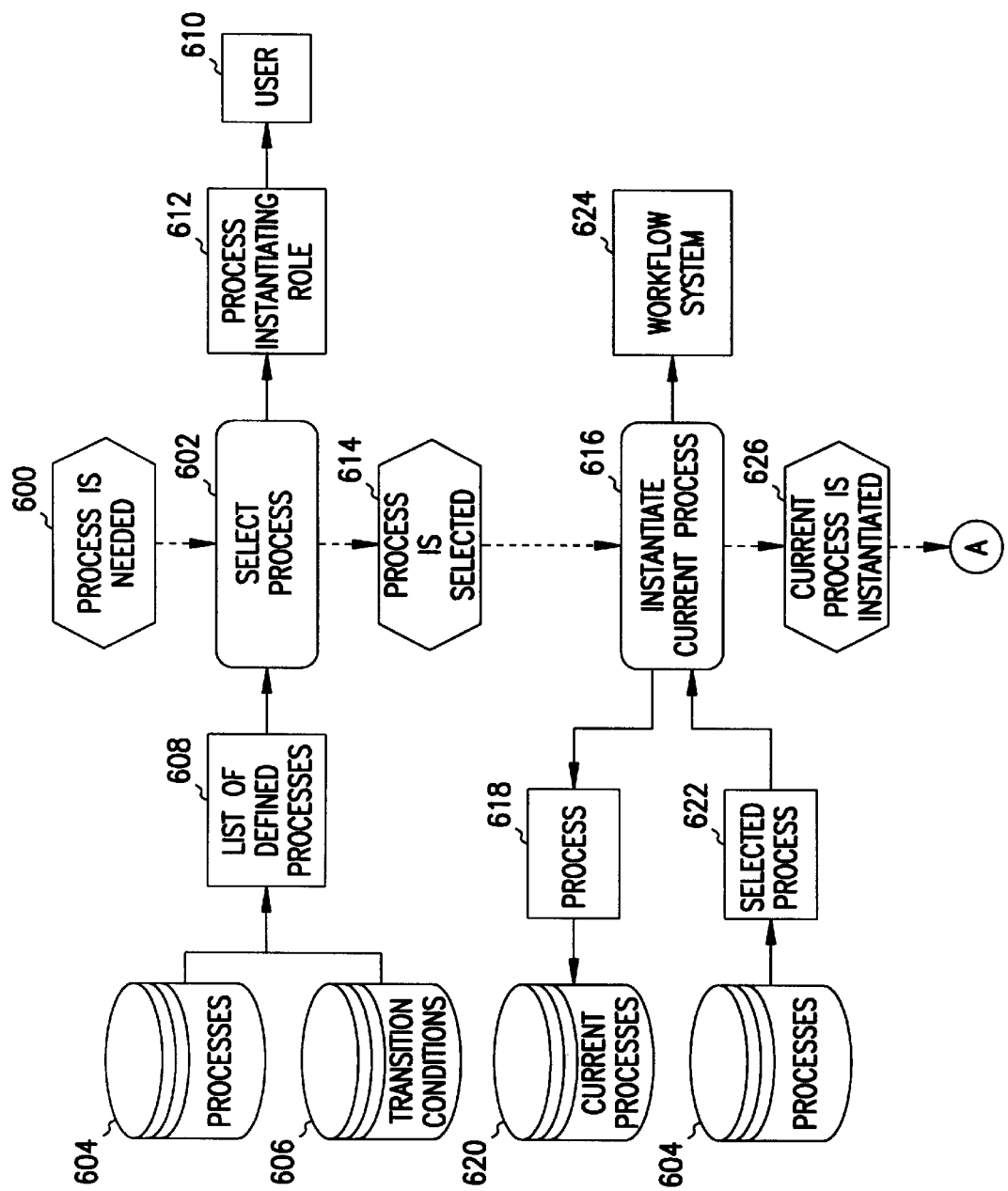
FIGS. 21A, 21B, 22A, and 22B are diagrams showing a generalized work flow according to one embodiment of the invention; and, FIGS. 23, 24A, 24B, 25, 26, 27A, 27B, 27C, 28, 29A, 29B, 29C, 30A, 30B, 31, 32, 33, 34, 35, and 36 showing diagrams of the instantiation of the generalized work flow of FIGS. 21A, 21B, 22A, and 22B in specific relation to computerized web site generation.
Figure 21B:
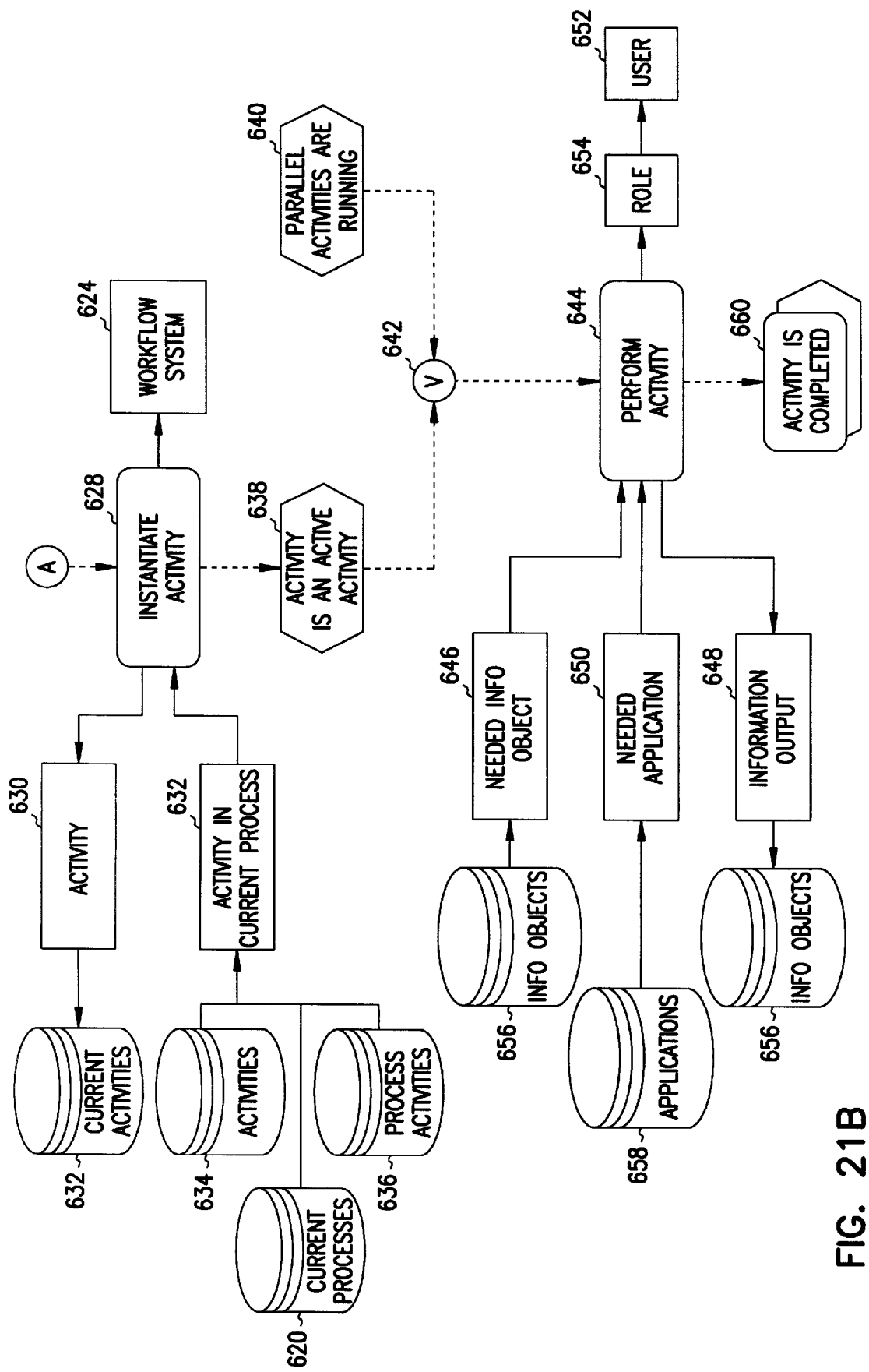

Referring now to FIGS. 21A and 21B, in step 600 a particular process is requested (needed). This process is then selected in step 602. Selection of a process includes retrieving from the set of all processes (as represented by information object 604) those processes which meets the transitional conditions (as represented by information object 606), such that the process is selected from a list of these defined processes (as represented by information object 608). Transitional conditions govern which processes may be defined such that they may be selected in step 602. A process may instantiate a role for user 610, as represented by step 612. This means that user 610 is responsible for the performance of the entire process; however, user 610 may delegate responsibility for specific activities (tasks) within the process as needed.

Once a process has been selected (step 614), a current instantiation of this process is performed in step 616. Those of ordinary skill within the art will appreciate that this instantiation is akin to the instantiation of a specific computerized object from a given computerized class, as such terms are known in object-oriented programming (OOP). The instantiation of a current process from the selected process (as represented by information object 622) involves the process (as represented by information object 618) being placed in a database or list of current processes (as represented by information object 620); this is a list of processes that are currently being performed, or which need to be performed (as opposed to inactive processes which are not currently being performed, nor need to be performed). The current process is then introduced into work flow system 624 for tracking the performance thereof. Preferably, work flow system 624 is a computerized system such as that as has been described as web server application software in the previous sections of the detailed description.

Once a current process has been instantiated (step 626), an activity within that process is also instantiated in step 628. As has been described, each process is defined as a series of activities. These activities may be performed concurrently, or the performance of any one activity or activities may be dependent on the preperformance of any other one activity or activities. The instantiated activity (as represented by information object 630) is placed in a database or list of current activities (as represented by information object 632); this is a list of activities that are currently being performed, or which need to be performed (as opposed to inactive processes which are not currently being performed, nor need to be performed).

The instantiated activity is instantiated from an activity within the current process, as represented by information object 632. This activity is selected from a database or list of all activities across all processes (as represented by information object 634), such that the current instantiated process of all current processes (as represented by object 620) is a list or database of process activities (as represented by information object 636) that is a subset of all the activities. The instantiated activity is introduced into work flow system 624 for tracking the performance thereof.

Thus, the instantiated activity is an active activity (step 638), and as has been described, may run in parallel with other active activities being run (step 640). All such activities, as represented by conditional 642, are individually performed, as represented in step 644. Each such active activity may require input (as represented by information object 646), may produce output (as represented by information object 648), and may require one or more computer application programs in order to be performed (as represented by information object 650). The performance of any given activity is given to user 652 as role 654; this user 652 may be the same as user 610, or user 652 may be a user under the management of user 610. There is a set of all information objects 656 that may serve as input or output for any given active activity, as well as a set of all applications 658 that may be used to perform any given active activity.

Figure 22A:
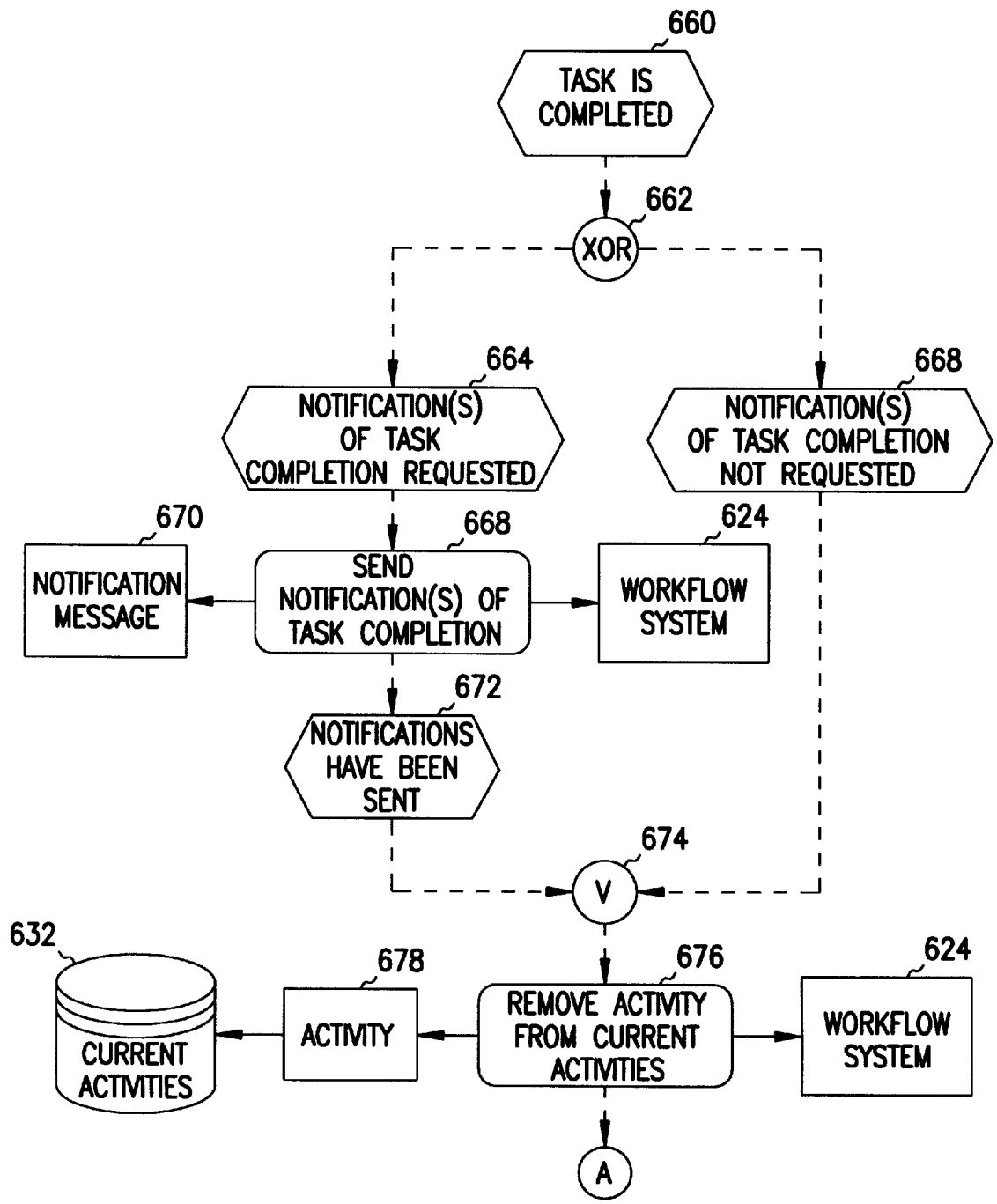
Figure 22B:
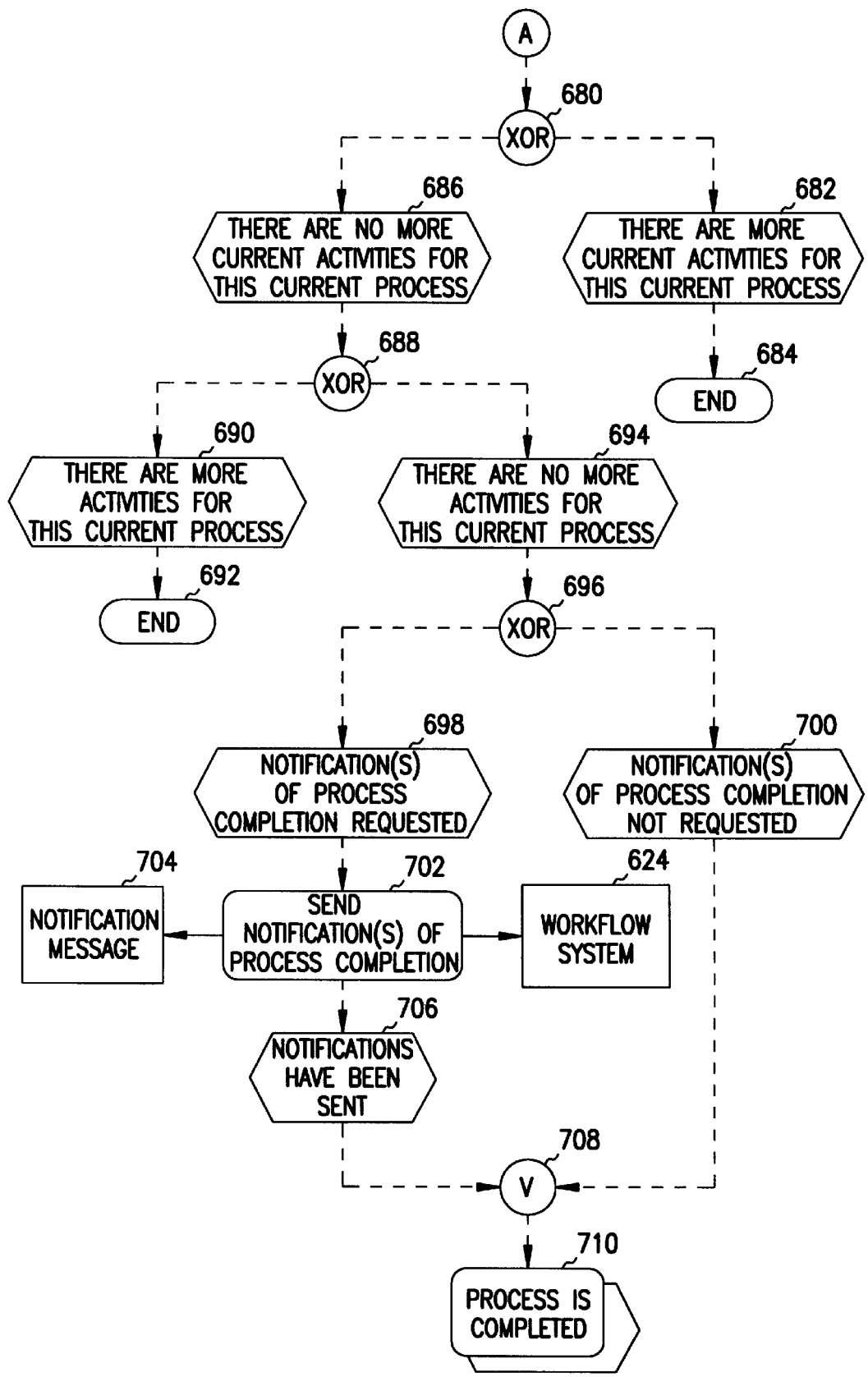

Once user 652 has performed the provided role 654 (i.e., the provided activity), as represented by step 660, control proceeds from FIGS. 21A and 21B to FIGS. 22A and 22B. Referring now to FIGS. 22A and 22B once an activity has been completed (step 660), control proceeds from or conditional 662 to either step 664 or step 666, depending on whether the activity (task), or its process (or a user) includes a requirement that notification of completion of the task be given (step 664) or not be given (step 666). If notification is requested, this is accomplished in step 668. Work flow system 624 sends a notification message (represented by information object 670) to a managing user of the process (such as user 610 of FIG. 21). This message may be an email, a fax, etc.

Once a notification message has been sent (step 672), or notification was not requested (step 666), control proceeds from conditional 674 to step 676. In step 676, the activity that has been just performed (as represented by information object 678) is removed from the database or list of all activities (as represented by object 632). The removal of this activity is performed automatically by work flow system 624.

If there are more current activities in the current process from which the activity represented by object 678 has been just removed, then control proceeds from or conditional 680 to step 682, which signifies that these other current activities are still being performed. Thus, the current instantiation of the method of FIGS. 22A and 22B, with respect to the activity represented by object 678, ends at step 684. As the other current activities are completed, the method of FIGS. 22A and 22B is performed again and again, until there are no more current activities in the current process.

Thus, when there are no more current activities in the current process, control proceeds from or conditional 680 to step 684. From or conditional 686, if there are more activities for the current process that still need to be performed, then control proceeds to step 690. These activities are activities that need to be performed for the current process to be considered completed, but are activities that may not yet be running because an event or conditional governing their being run has not yet been generated or met. Therefore, the current instantiation of the method of FIGS. 22A and 22B ends at step 692.

At some point, all activities within the process become current activities and are completed, such that at some point control proceeds from control 688 to step 694—that is, at some point there are no more current activities for the current process, and no more activities waiting to be run for the current process, either. Once this occurs, control proceeds from or condition 696 to step 698 or step 700 depending on whether the process requires or requests, or the user having the process as his or her role requests, that notification of completion of the process be accomplished (step 698), or not be accomplished (step 700).

If notification of the completion of the process is requested, then in step 702 work flow system 624 sends a notification message (as represented by information object 704) to a managing user of the process (such as user 610 of FIG. 21A). This message may be an email, a fax, etc. Once a notification message has been sent (step 695), or notification was not requested (step 700), control proceeds from conditional 708 to step 710. In step 710, the process that has just been completed is removed from the database or list of all activities (as represented by object 632). The removal of this activity is performed automatically by the work flow system. The method of FIGS. 22A and 22B thus ends at step 710.

As has been described, the generalized work flow of FIGS. 21A, 21B, 22A, and 22B provides a systematic manner by which a set of processes may be performed, and individual activities within these processes may be tracked by a work flow system. This tracking is an advantage of the invention, because it enables sets of processes to be instantiated over and over, such that their performance is achieved in the most efficient manner possible. The computerized web site generation of the previous sections of the detailed description is one such set of processes; the manner by which it is specifically instantiated from the generalized work flow of FIGS. 21A, 21B, 22A, and 22B is now described, in conjunction with FIGS. 23–36, which are diagrams showing the instantiation of the generalized work flow of FIGS. 21A, 21B, 22A, and 22B in specific relation to computerized web site generation.

The description of FIGS. 23–36 is provided in enough detail that one of ordinary skill within the art having understood the previous sections of the detailed description is enabled to make and use the embodiments of the invention of the previous sections as an instantiation of the generalized work flow of FIGS. 21A, 21B, 22A, and 22B. It is noted that as described, the methods of FIG. 23–36 proceed sequentially—i.e., the method of FIGS. 24A and 24B is executed upon the completion of FIG. 23, etc.—unless otherwise noted in the description thereof (such as methods being run concurrently, methods being redirected to methods of other figures, etc.). Furthermore, it is noted that as described, when one (first) of the processes of FIGS. 23–36 calls another (second) of the processes, when the second process is finished, execution returns to where the first process had called the second process. That is, execution of the calling process stops and the called process is executed. Note, however, the invention is not so limited; the called process could also be executed concurrently with the calling process; this is just not the case with respect to the processes of FIGS. 23–36.

Figure 23:
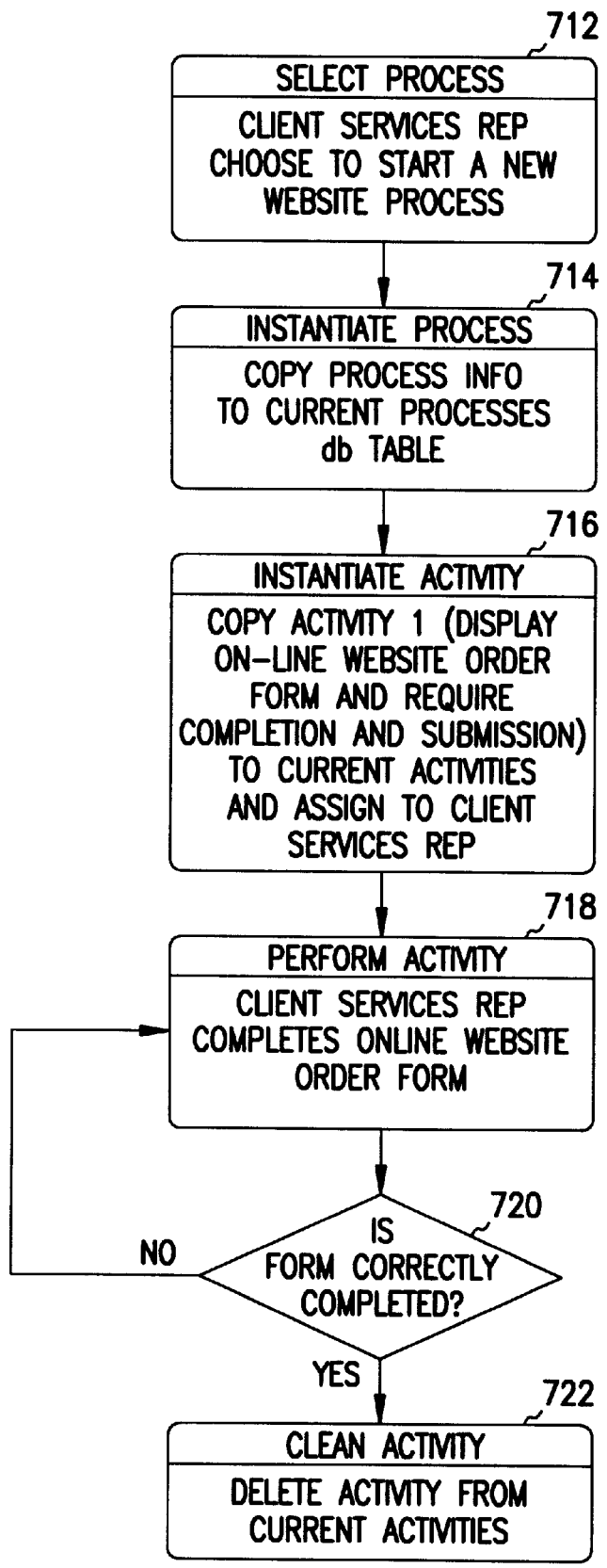
Figure 24A:
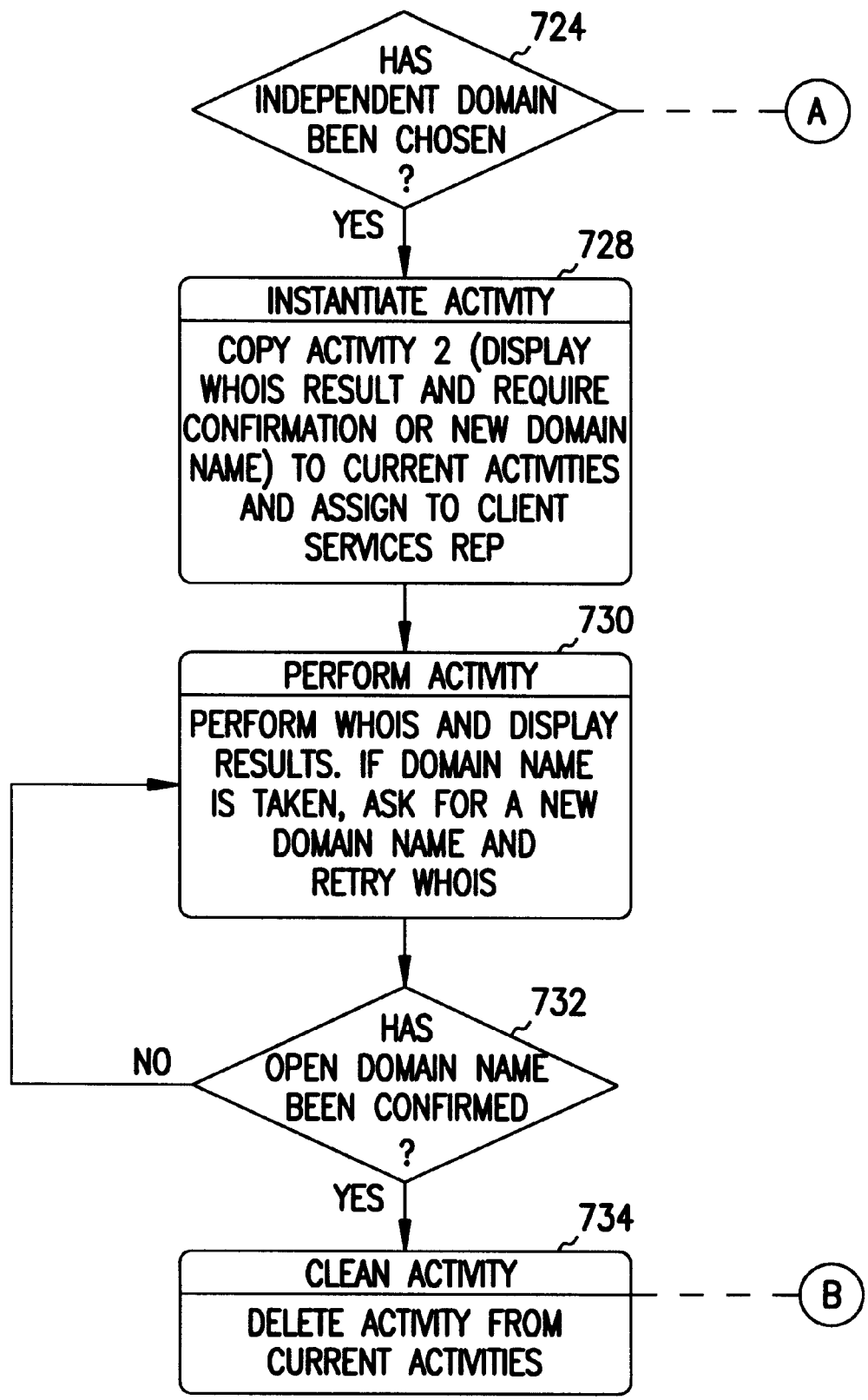
Figure 24B:
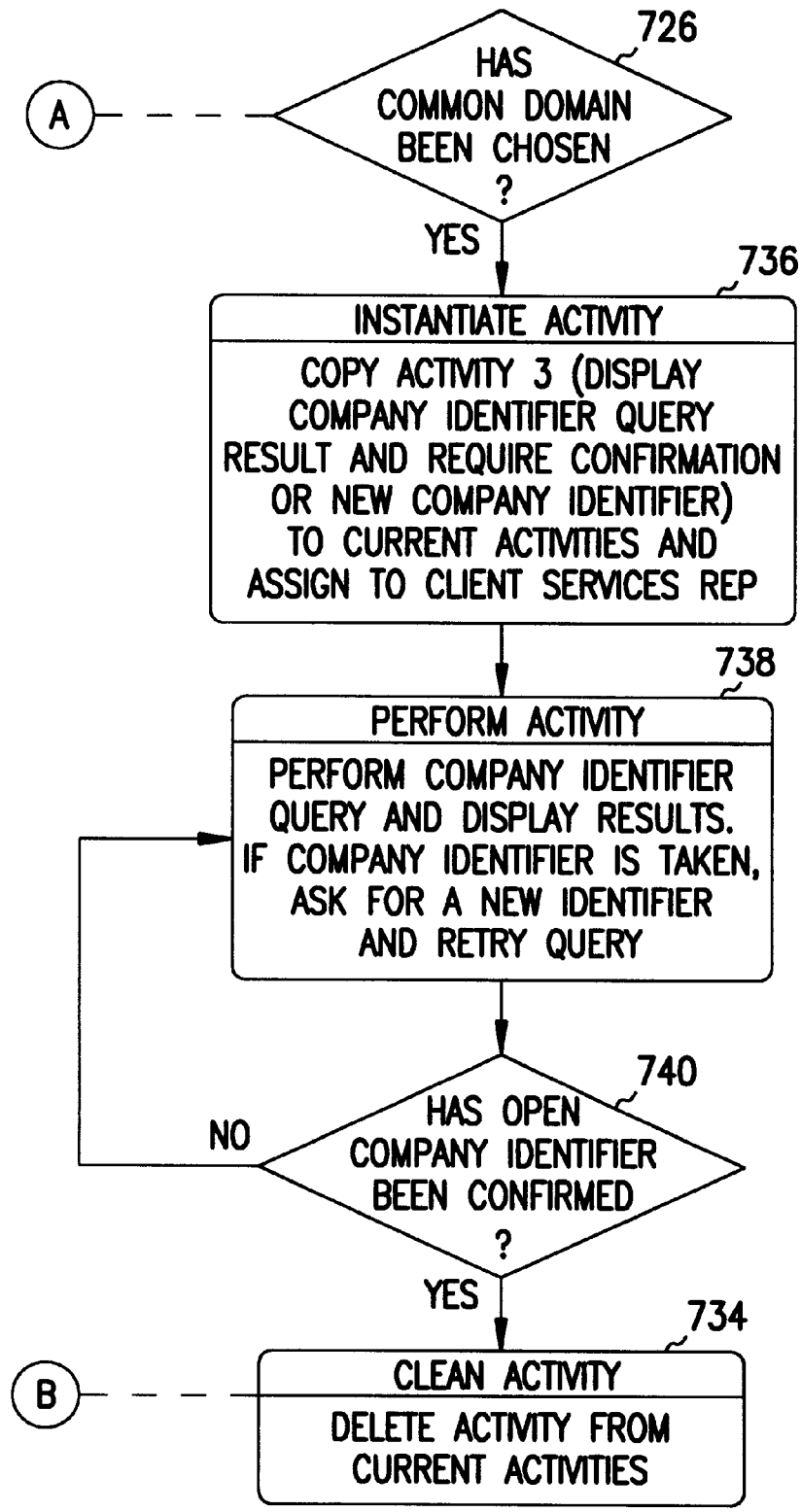

Referring first to FIG. 23, a diagram of the instantiation of a first process in conjunction with which a web site is generated, and specifically the activity by which the site is ordered, is shown. In step 712, a process is selected; a client services representative chooses to start a new web set creation process. In step 714, the process is instantiated; a copy of the process is stored in a current processes database table. In step 716, an activity within the process is instantiated (copied to a current activities database table, etc.); specifically, a first activity—that an online web site order form is displayed, and completion and submission thereof is requested—is instantiated. In step 718, the first activity is completed; the client services representative completes the online order form. If the process is not completed correctly, in step 720 control reverts back to step 718. Otherwise, this activity in step 722 is deleted from the current activities database table.

Referring next to FIGS. 24A and 24B, a diagram of the continuing performance of the process of FIG. 23, specifically the activity by which a URL address is chosen, is shown. Either the method starting with step 724 or the method starting with step 726 is run, depending on whether an independent domain has been chosen by the customer (step 724), or a common domain has been chosen (step 726). If the former, in step 728 a second activity—that the independent domain name chosen is confirmed that it is available, or another domain name is asked for (through InterNIC)—is instantiated (copied to the current activities database table, etc.). In step 730, the second activity is completed; specifically, InterNIC returns whether the domain name is available. If the name is not available, in step 732 control reverts back to step 730. Otherwise, the name is available, and this activity in step 734 is deleted from the current activities table.

If the method starting with step 736 is conversely run, in step 736 a third activity—that the company identifier is displayed and confirmation thereof is requested—is instantiated (copied to the current activities database table, etc.). In step 738, the third activity is completed; if confirmation of the name (company identifier) has not been given, then in step 740 control reverts back to 740. Once the name has been confirmed, this activity also is deleted from the current activities table in step 734.

Figure 25:
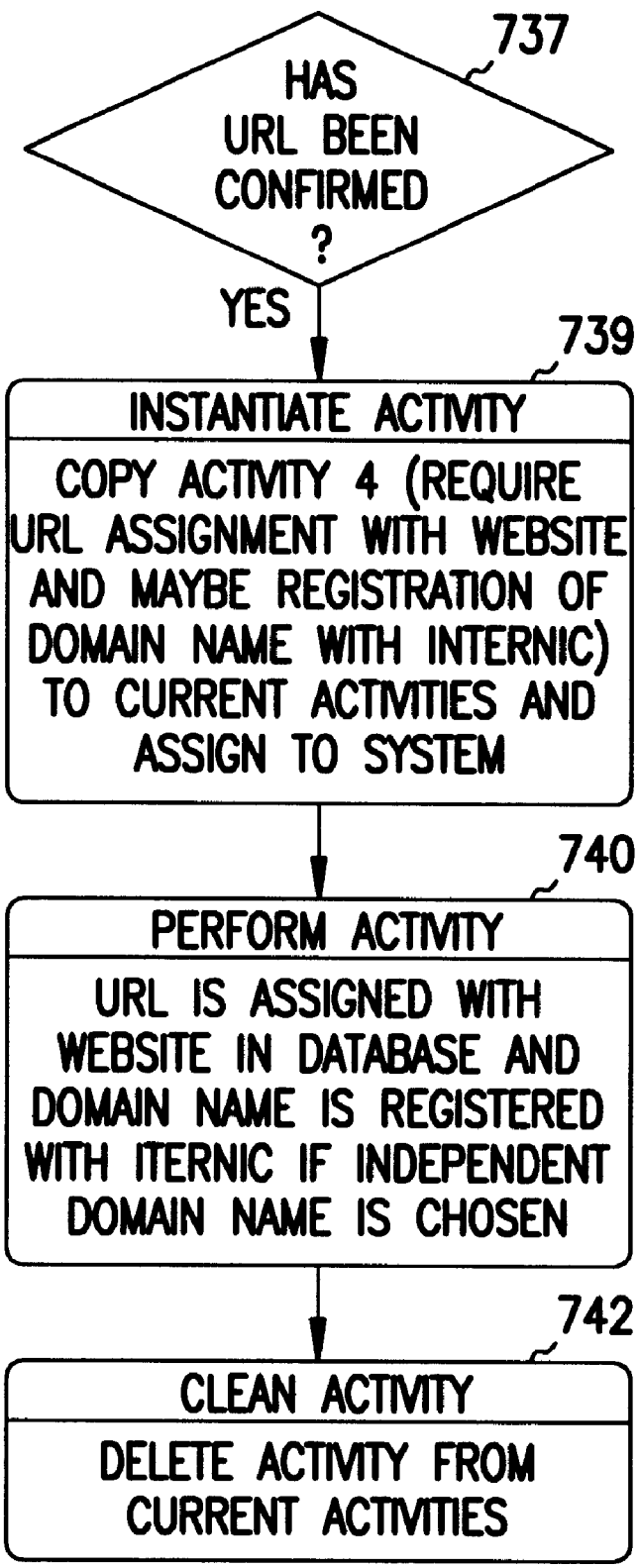

Referring next to FIG. 25, a diagram of the continuing performance of the process of FIG. 23, specifically the activity by which a URL address is assigned, is shown. Once the URL has been confirmed in step 737 (i.e., resulting from the activity in step 730 or 738 of FIGS. 24A and 24B), control proceeds to step 739. In step 739 a fourth activity—that the URL for the web site is assigned, and the domain name is registered with InterNIC if it is an independent domain—is instantiated (copied to the current activities database table, etc.). In step 740, the activity is performed. In step 742, the activity is deleted from the activities database table, after having been performed.

Figure 26:
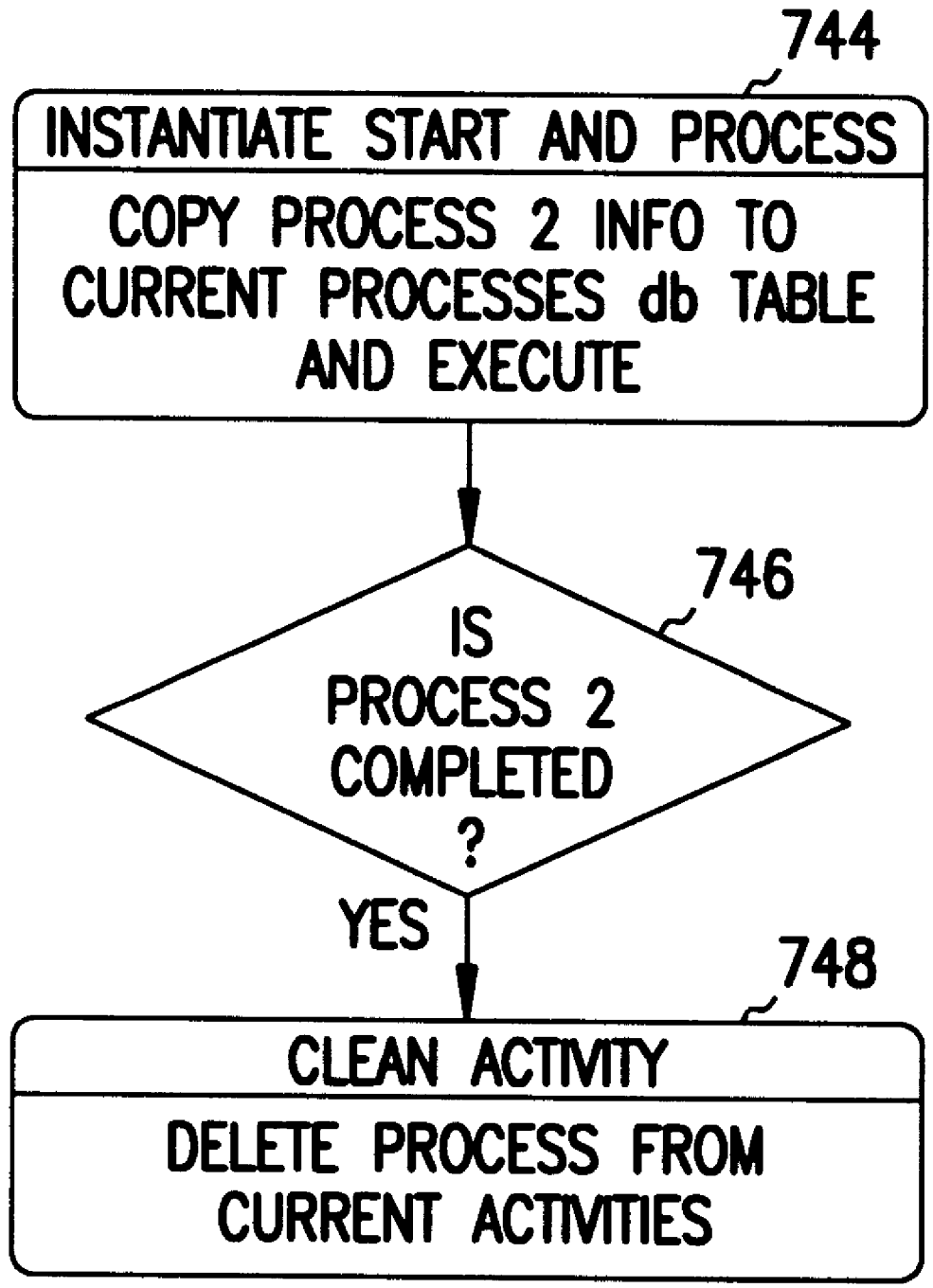
Figure 27A:
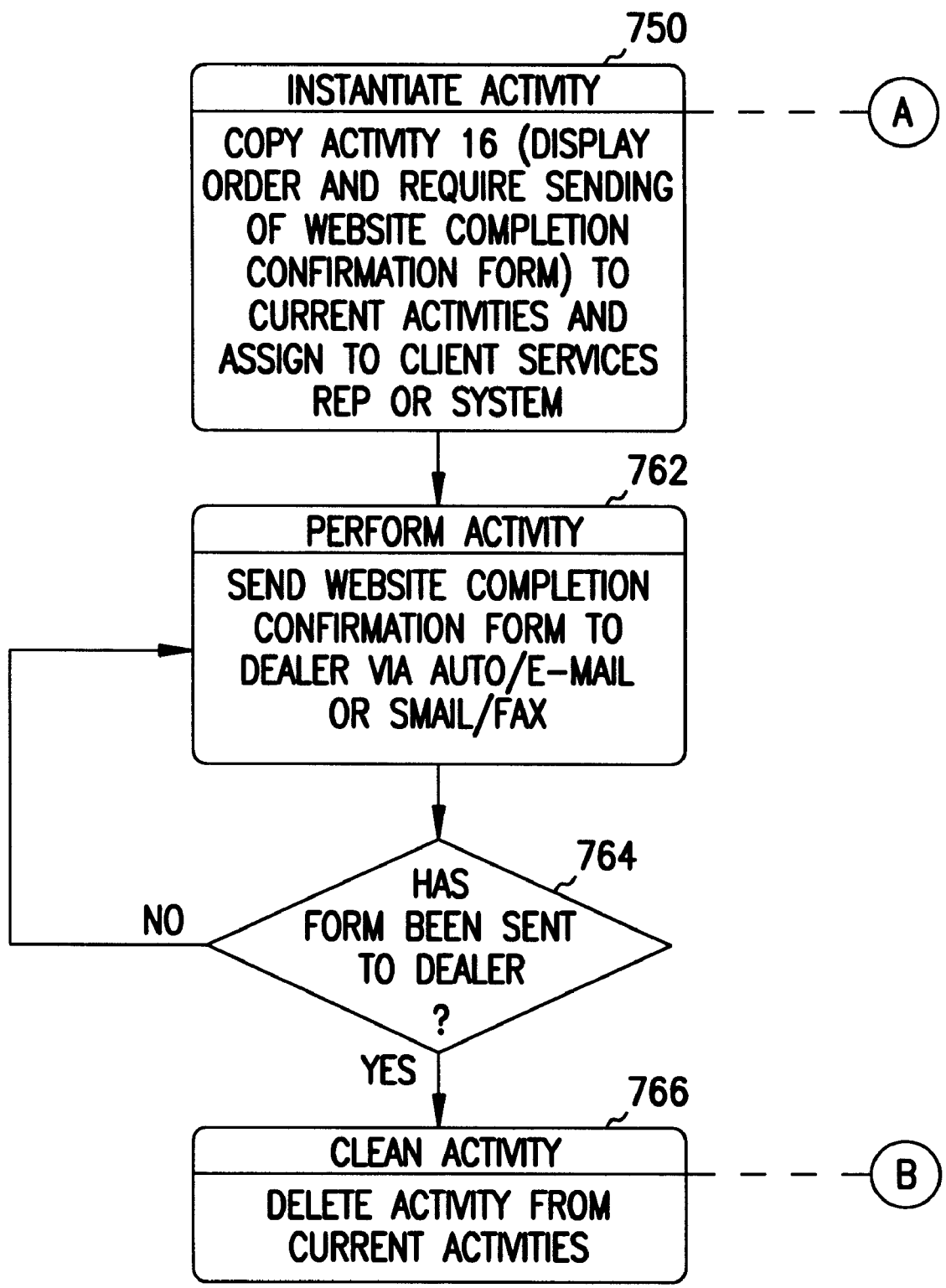
Figure 27B:
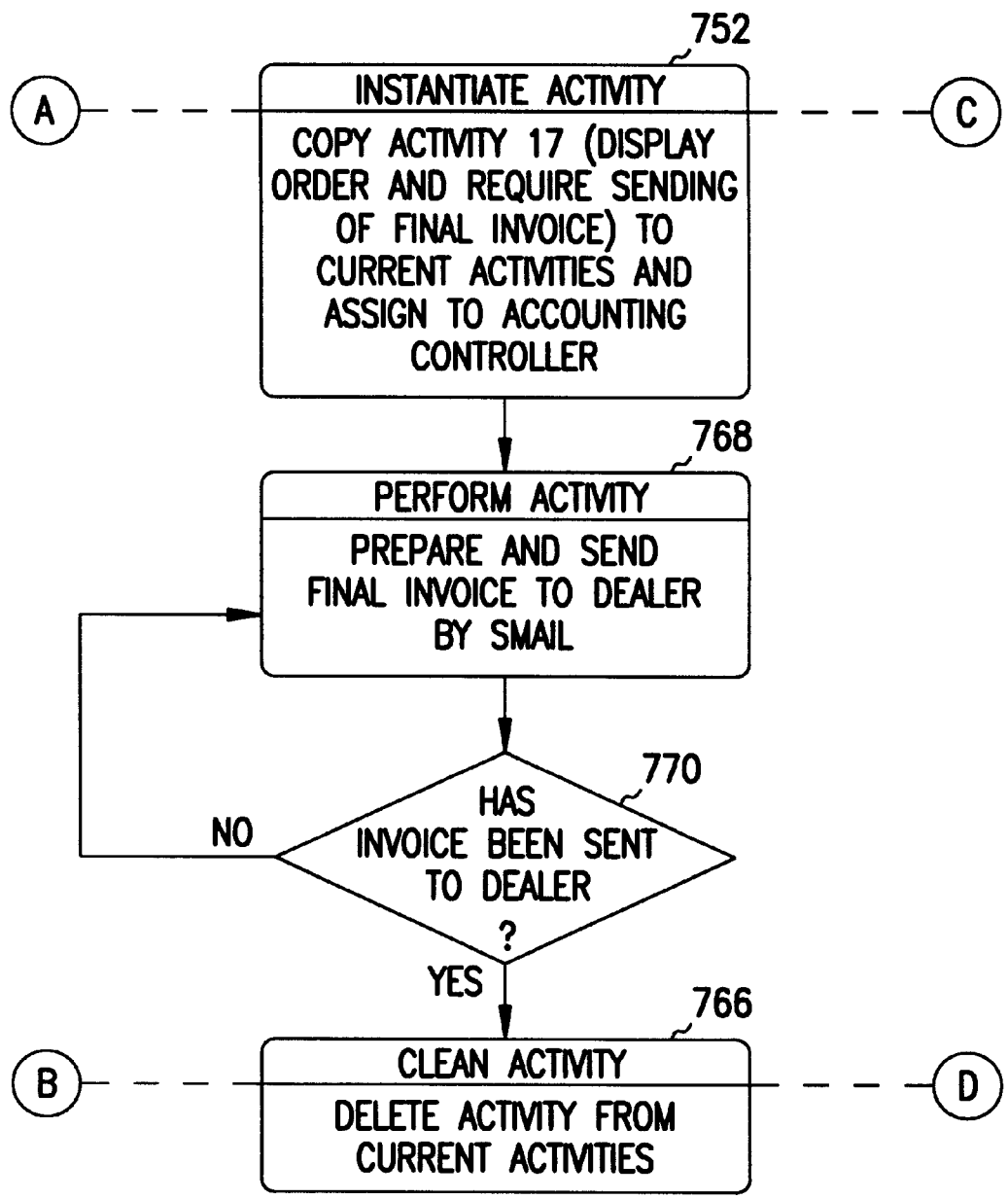
Figure 27C:
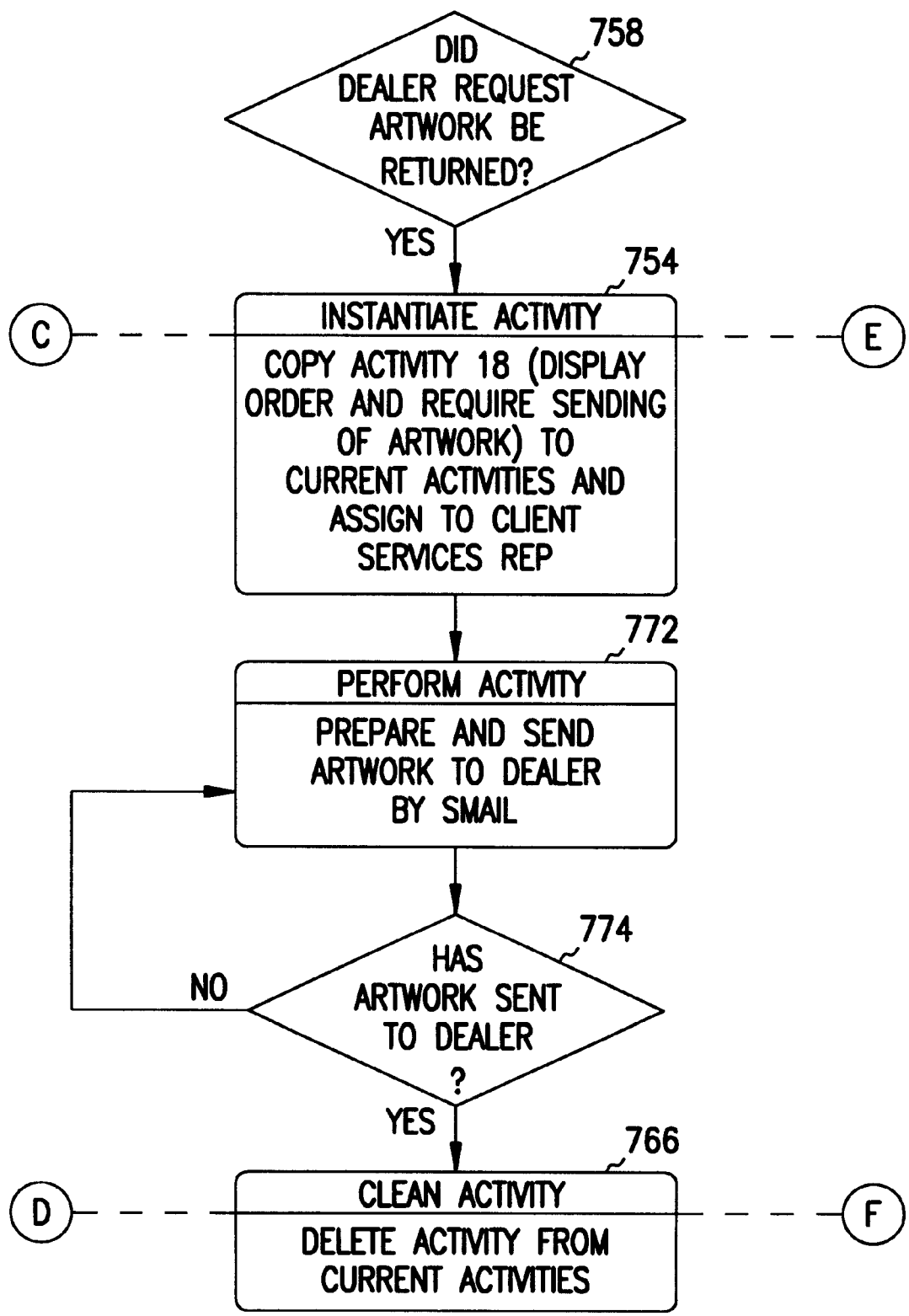
Figure 27D:
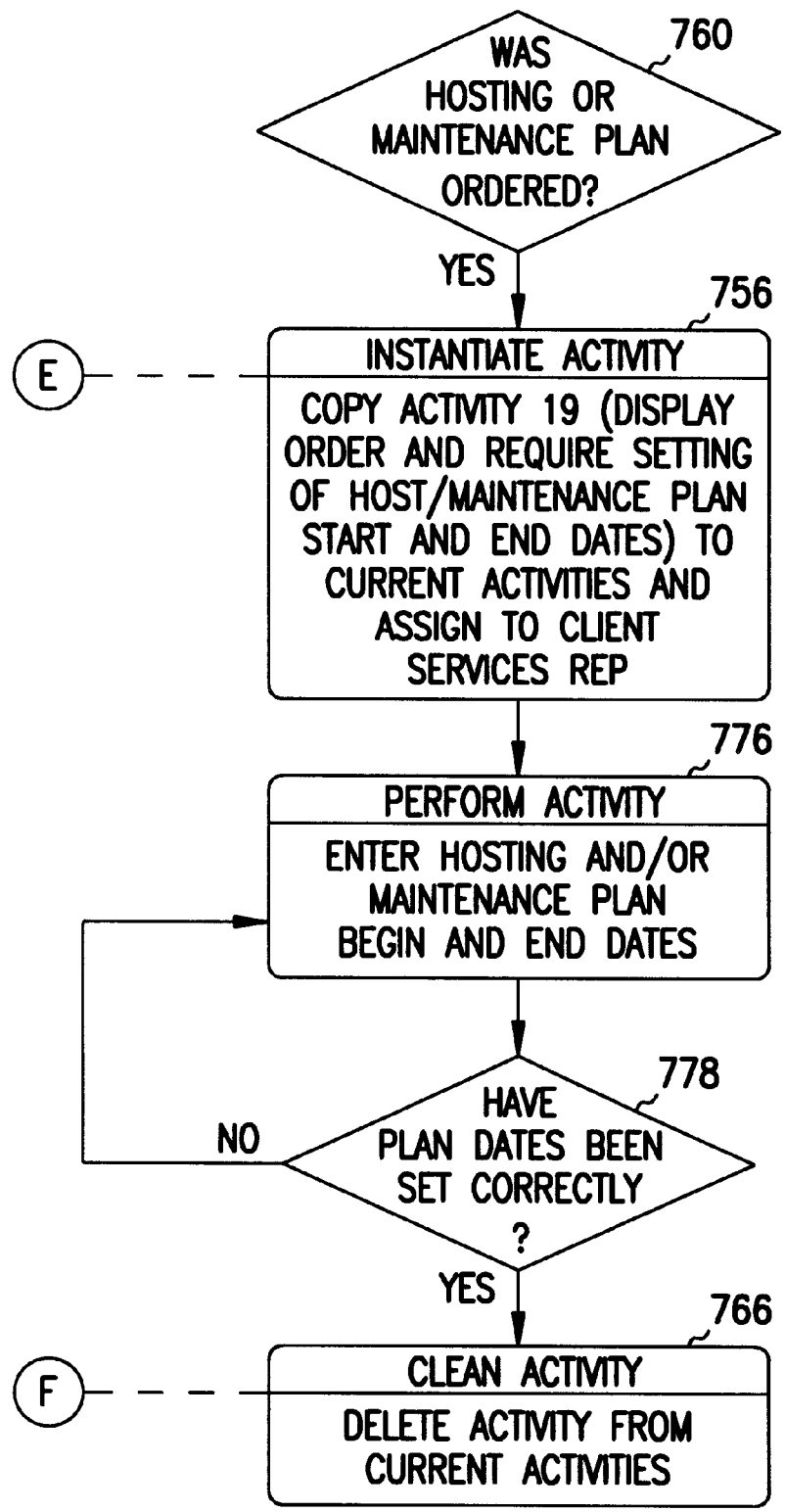

Referring next to FIG. 26, a diagram of the continuing performance of the first process of FIG. 23, specifically the spawning of a second process to run serially to the first process, is shown. In step 744, a second process is instantiated; a copy of the process is stored in the current process database table. The second process is instantiated and run as an activity in the first process (copied to the current activities database table, etc.). In step 746, once the second process has been completed, control reverts to step 748, and the activity of starting the second process is deleted from the current activities database table. It is noted that the continuing activities of the first process (as will be described in conjunction with FIGS. 27A, 27B, 27C, and 27D and FIG. 28) run serially to the second process—that is, they do not start until the second process has been completed.

Referring next to FIGS. 27A, 27B, 27C, and 27D, a diagram of the continuing performance of the first process of FIG. 23, specifically, the finishing of the web site order, is shown. The methods starting with steps 750, 752, 754 and 756 run concurrently to one another; the latter two methods (starting with step 754 and step 756) are only run if their respective conditionals 758 and 760 are met, however. In step 750, a sixteenth activity—that the order is displayed and a web site completion confirmation form is required to be sent—is instantiated (the fifth through the fifteenth activities are performed in conjunction with the second process, that will be described in conjunction with FIGS. 29–35) (copied to the current activities database table, etc.). In step 762, the activity is performed; the form is sent via e-mail, fax, etc. Once the sixteenth activity has been completed in step 764, it is deleted from the current activities database table in step 766.

In step 752, a seventeenth activity—that the order is displayed and the final invoice is required to be sent—is concurrently instantiated (copied to the current activities database table, etc.). In step 768, the activity is performed; the invoice is prepared and sent to the dealer, by postal service, etc. Once the seventeenth activity has been completed in step 770, it is deleted from the current activities database table in step 766.

In step 754, if the dealer had requested that any supplied artwork be returned such that the condition in step 758 is met, an eighteenth activity—that the order is displayed an the returning of artwork is required—is concurrently instantiated (copied to the current activities database table, etc.). In step 772 the activity is performed; the artwork is returned, by postal service, etc. Once the eighteenth activity has been completed in step 774, it is deleted from the current activities database table in step 766.

In step 756, if a hosting and/or maintenance plan were ordered such that the condition in step 760 is met, a nineteenth activity—that the order is displayed, and the setting of the hosting and/or maintenance plan beginning and ending dates is accomplished—is concurrently instantiated (copied to the current activities database table, etc.). In step 776, the activity is performed; the beginning and end dates for the hosting and/or maintenance plan are set. Once the nineteenth activity has been completed in step 778, it is deleted from the current activities database table in step 766.

Figure 28:
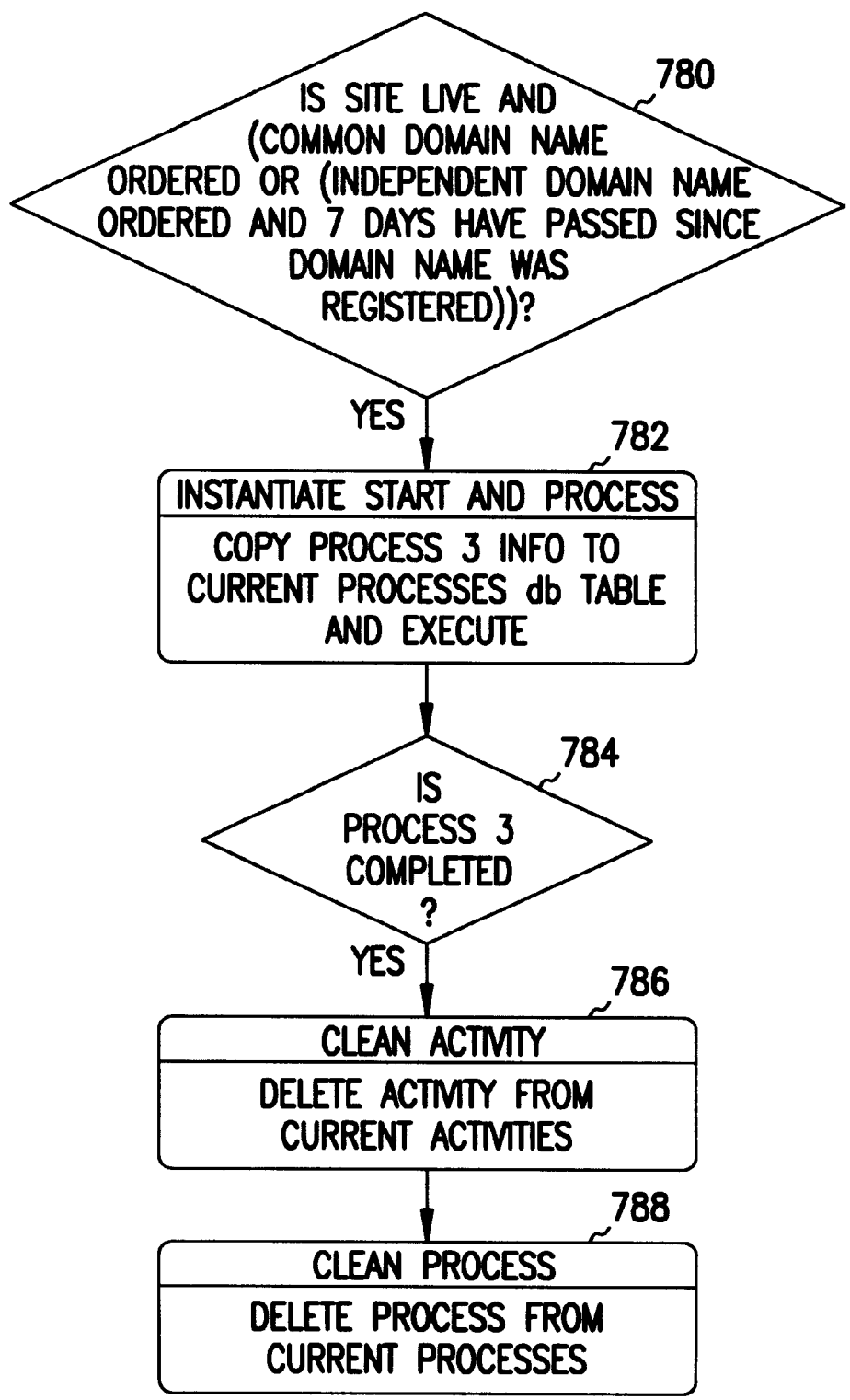

Referring next to FIG. 28, a diagram of the continuing performance of the first process of FIG. 23, specifically the spawning of a third process to run serially to the first process, is shown. In step 780, if the site is "live"—i.e., accessible to the public over the web—and if an independent domain name was ordered, seven days have passed since registration with InterNIC, control proceeds to step 782. In step 782, a third process is instantiated; a copy of the process is stored in the current process database table. The third process is instantiated run as an activity in the first process (copied to the current activities database table, etc.). In step 784, once the third process has been completed, control reverts to step 786, and the activity of starting the third process is deleted from the current activities database table. In step 788, the first process is then deleted from the current processes database table, ending the generation of the web site, as has been related to the generalized work flow of FIGS. 21A, 21B, 22A, and 22B.

Figure 29A:
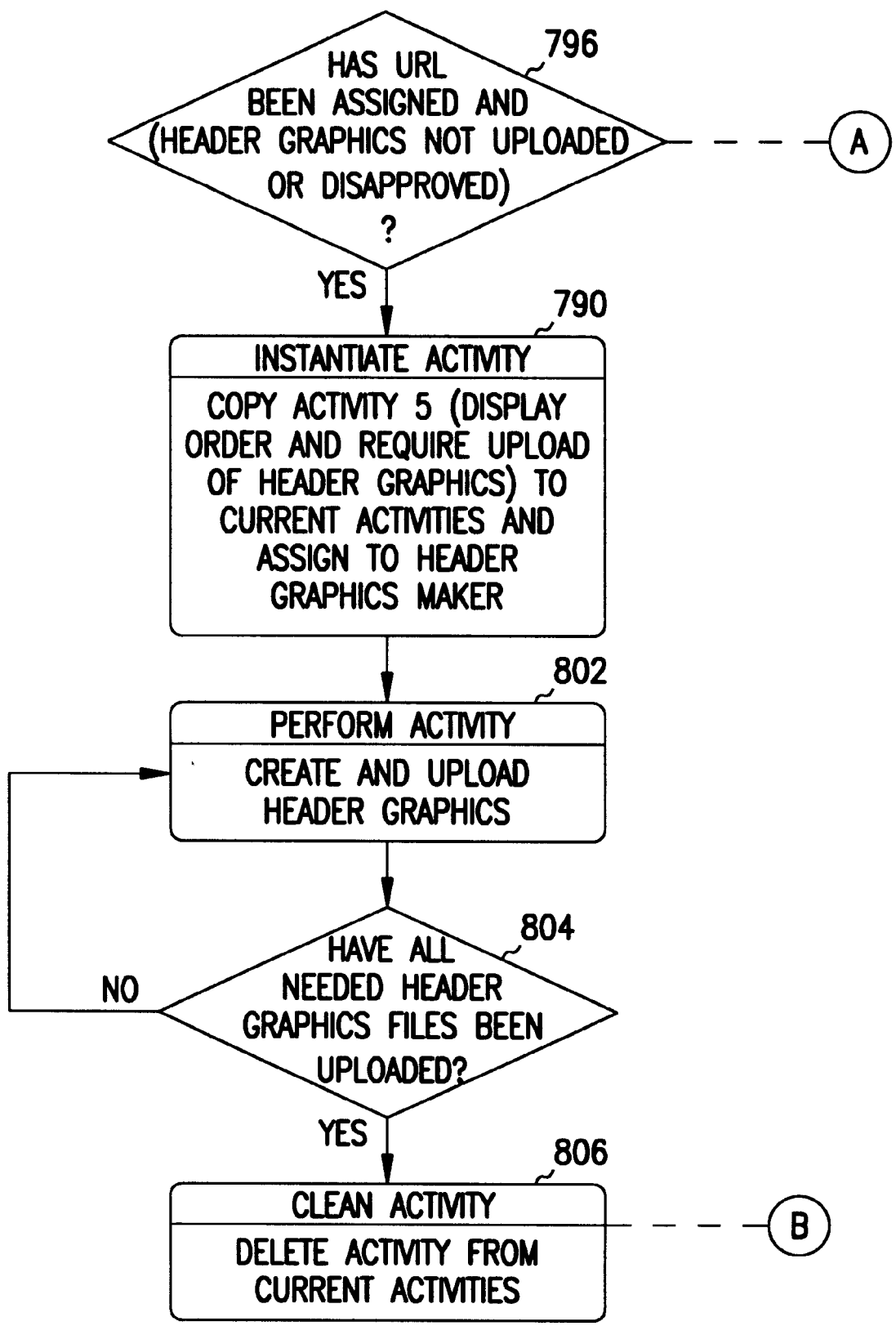
Figure 29B:
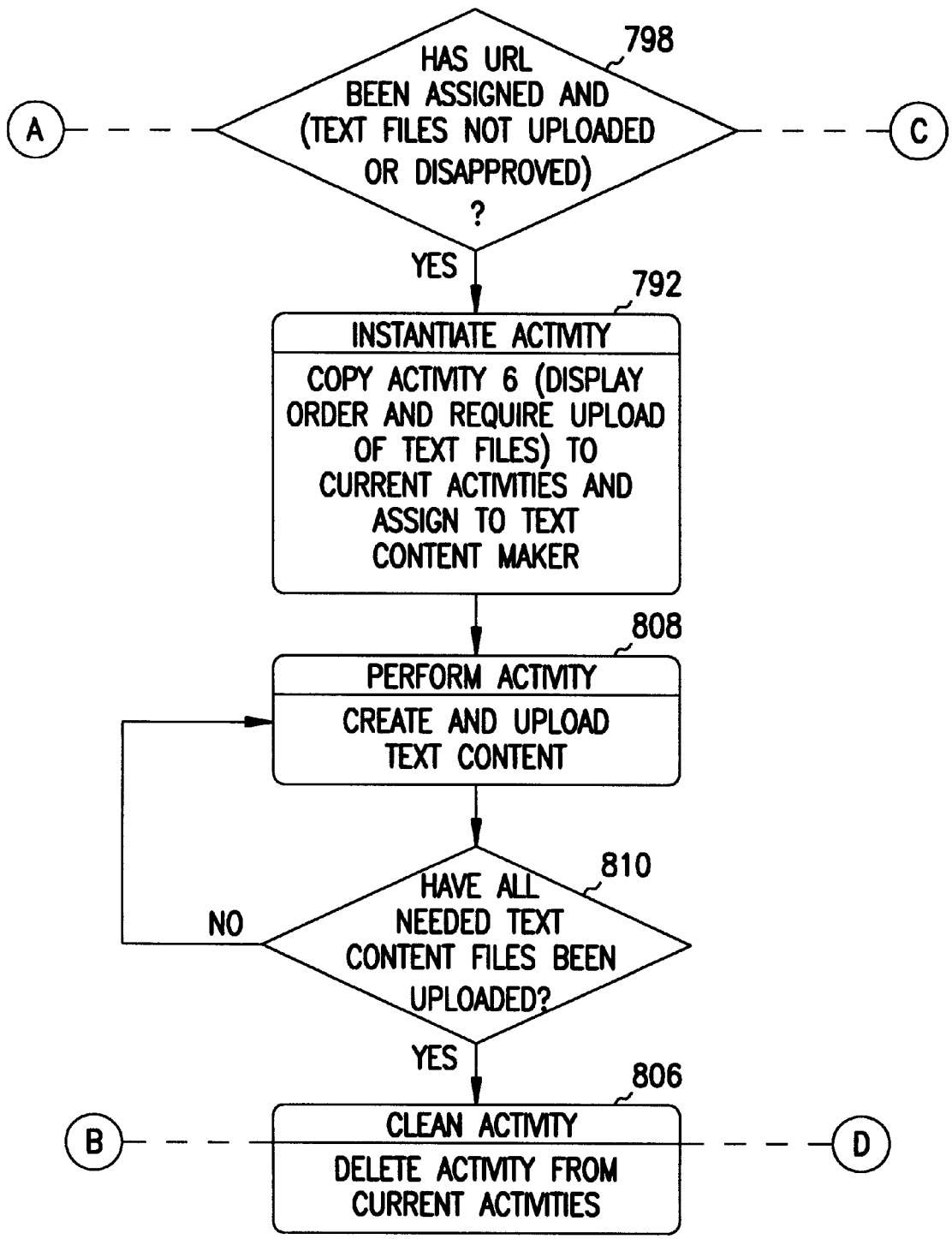
Figure 29C:
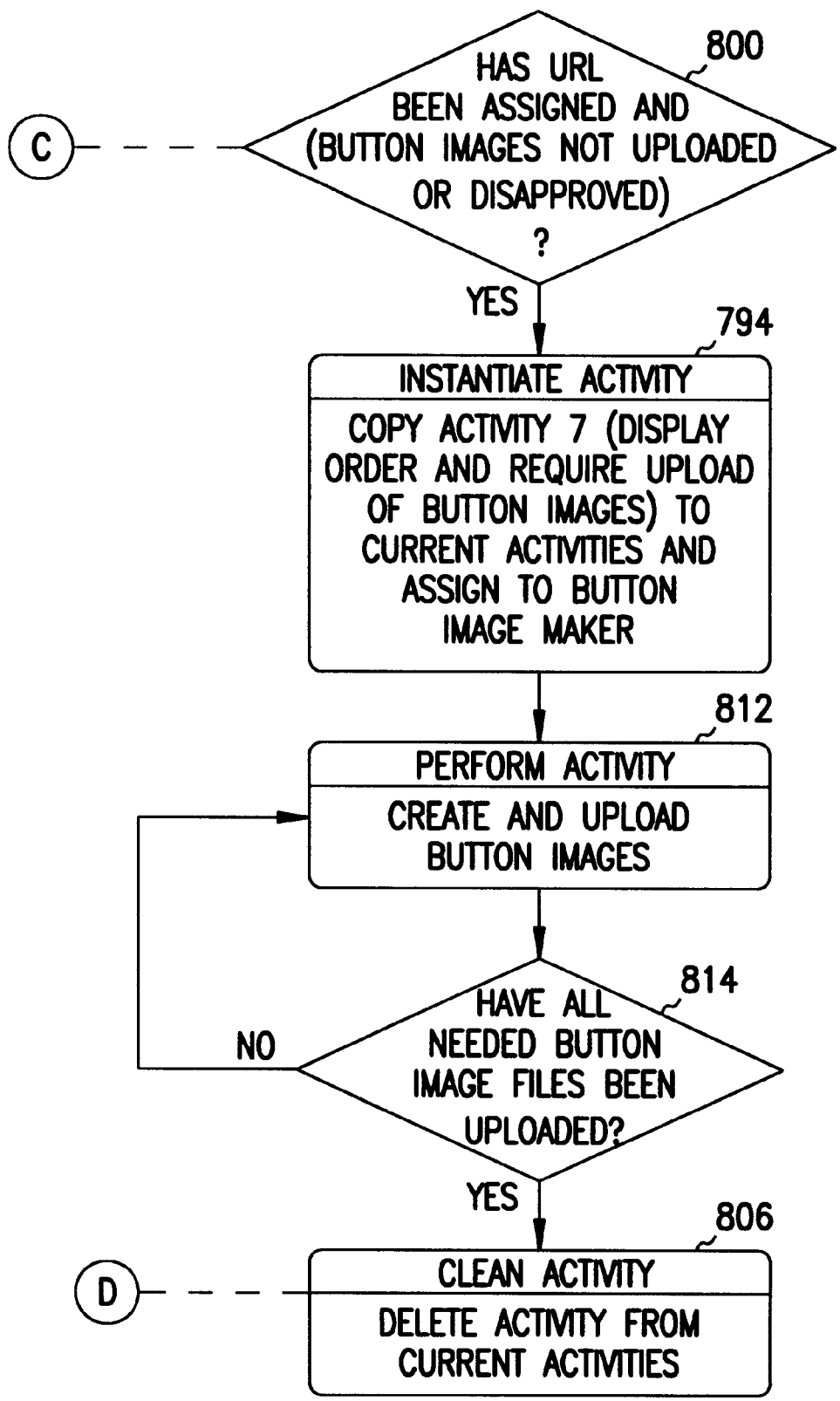

Referring next to FIGS. 29A, 29B, and 29C, a diagram of the performance of the second process that was instantiated in FIG. 26, specifically the creation of the web site, is shown. The methods starting with steps 790, 792 and 794 are run concurrently to one another; the individual methods are only run, however, if their respective conditionals 796, 798 and 800 are met. In step 790, if the URL has been assigned, and the header graphics have not been uploaded or disapproved such that the condition in step 796 is met, a fifth activity—that the order be displayed and the upload of header graphics be required—is instantiated (copied to the current activities database table, etc.). In step 802 the activity is performed; the header graphics are created and uploaded. Once the fifth activity has been completed in step 804, it is deleted from the current activities database table in step 806.

In step 792, if the URL has been assigned, and the text files have not been uploaded or disapproved such that the condition in step 798 is met, a sixth activity—that the order be displayed and the upload of text files be required—is concurrently instantiated (copied to the current activities database table, etc.). In step 808 the activity is performed; the text files are created and uploaded. Once the sixth activity has been completed in step 810, it is deleted from the current activities database table in step 806.

In step 794, if the URL has been assigned, and the button images have not been uploaded or disapproved such that the condition in step 800 is met, a seventh activity—that the order be displayed and the upload of button images be required—is concurrently instantiated (copied to the current activities database table, etc.). In step 812 the activity is performed; the button images are created and uploaded. Once the sixth activity has been completed in step 814, it is deleted from the current activities database table in step 806.

Figure 30A:
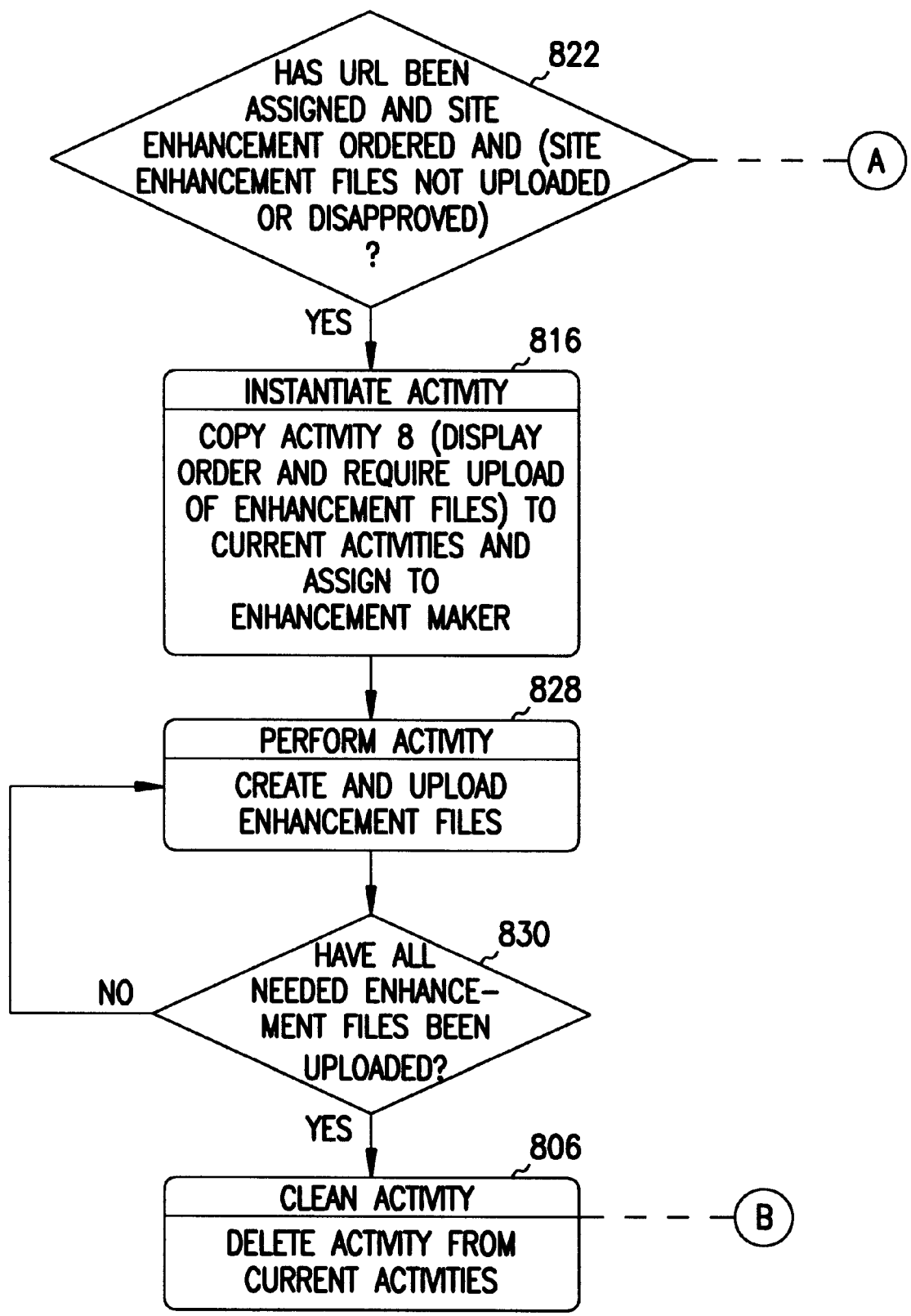
Figure 30B:
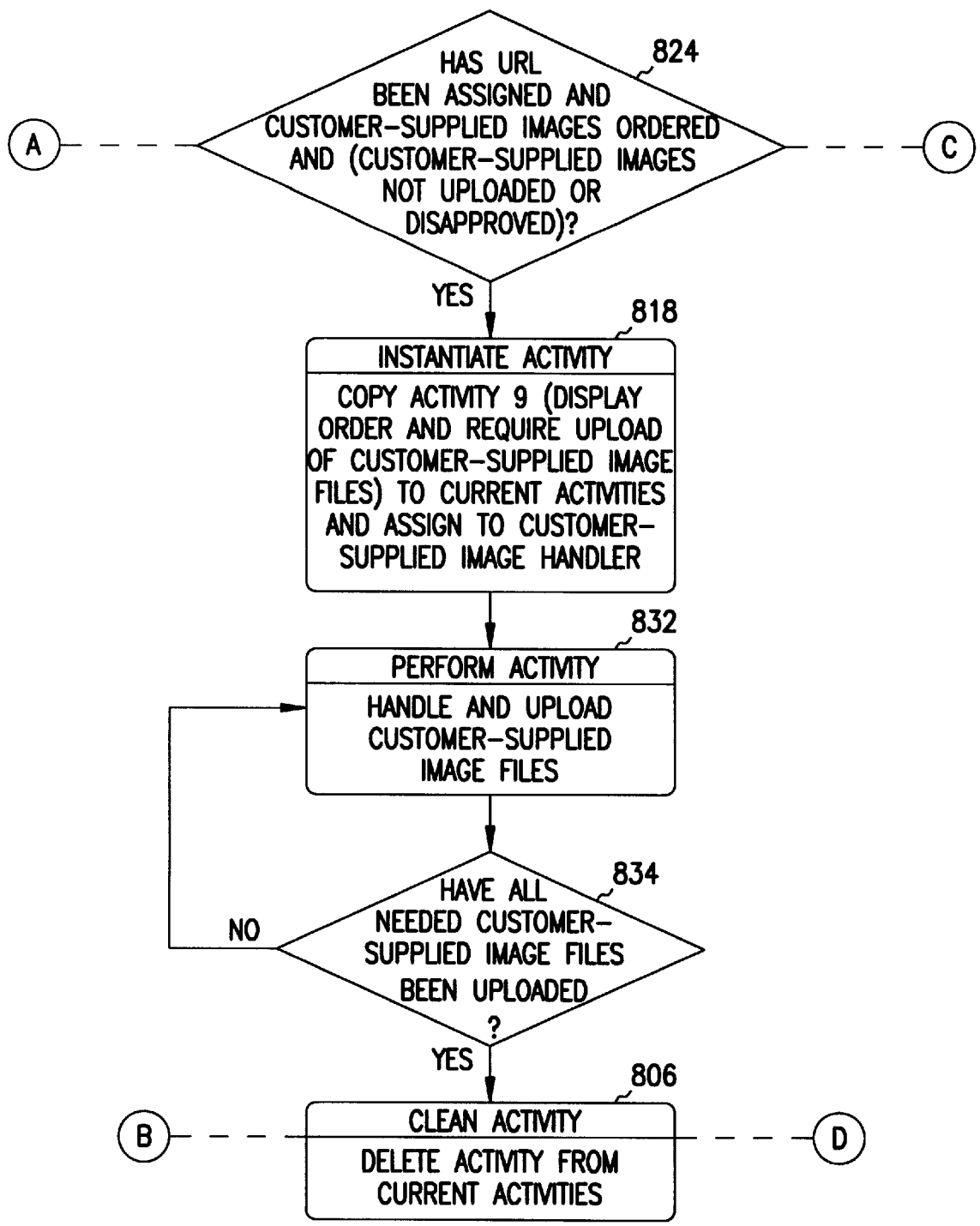
Figure 30C:
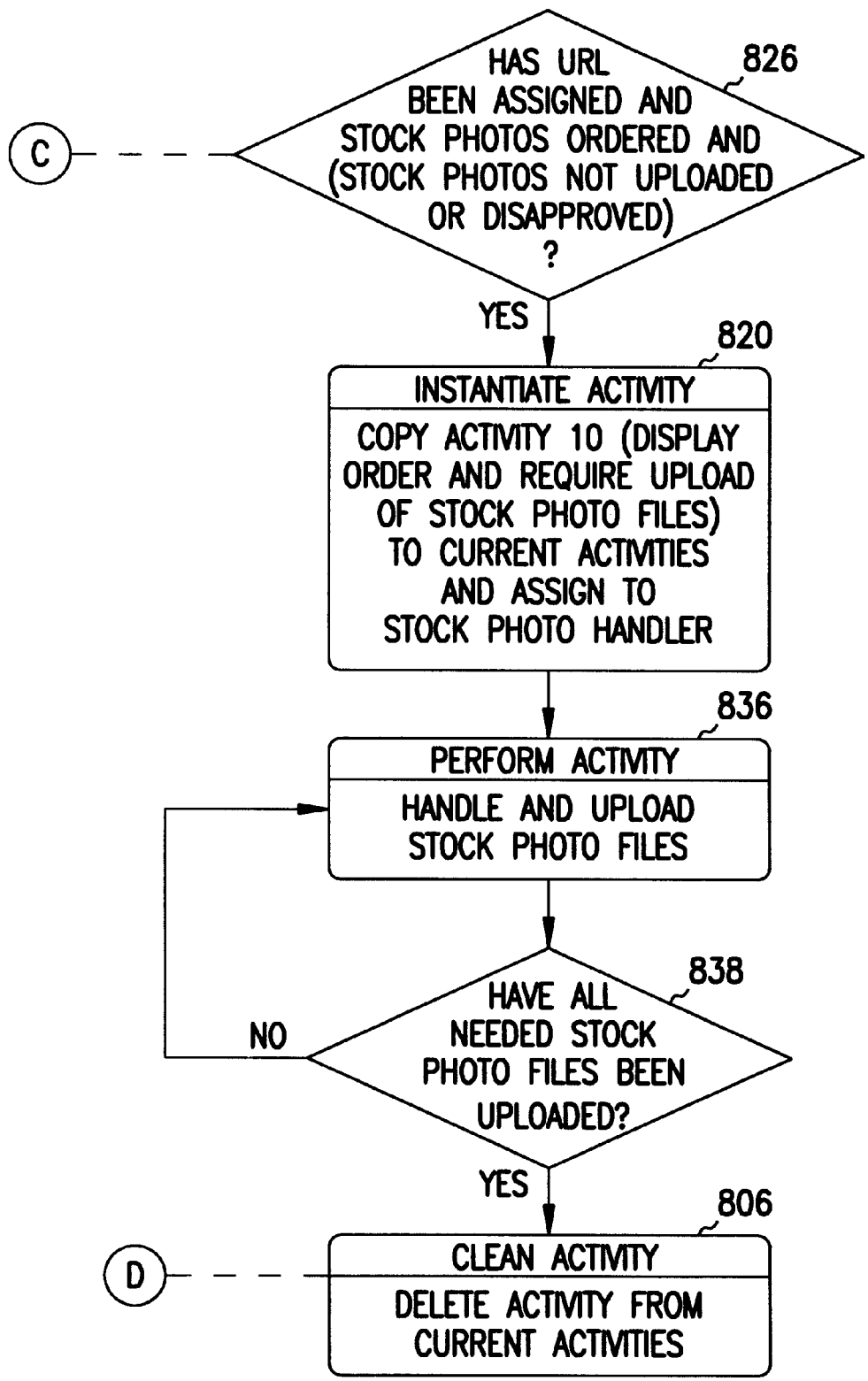

Referring next to FIGS. 30A, 30B, and 30C, a diagram of the continuing performance of the second process that was instantiated in FIG. 26, specifically the continuing creation of the web site, is shown. The methods starting with steps 816, 818 and 820 are run concurrently to one another, as well as concurrently to the methods of FIGA. 29A, 29B, and 29C starting with steps 790, 792 and 794; the individual methods are only run, however, if their respective conditionals 822, 824 and 826 are met. In step 816, if the URL has been assigned, and site enhancements have been order, but have not been uploaded or disapproved such that the condition in step 822 is met, an eighth activity—that the order be displayed and the upload of enhancement files be required—is instantiated (copied to the current activities database table, etc.). In step 828 the activity is performed; the enhancements are created and uploaded. Once the eighth activity has been completed in step 830, it is deleted from the current activities database table in step 806.

In step 818, if the URL has been assigned, and customer-supplied images have been ordered, but have not been uploaded or disapproved such that the condition in step 824 is met, a ninth activity—that the order be displayed and the upload of customer-supplied images be required—is instantiated (copied to the current activities database table, etc.). In step 832 the activity is performed; the images are processed and uploaded. Once the ninth activity has been completed in step 834, it is deleted from the current activities database table in step 806.

In step 820, if the URL has been assigned, and stock photographs have been ordered, but have not been uploaded or disapproved such that the condition in step 826 is met, a tenth activity—that the order be displayed and the upload of stock photos be required—is instantiated (copied to the current activities database table, etc.). In step 836 the activity is performed; the photos are processed and uploaded. Once the tenth activity has been completed in step 838, it is deleted from the current activities database table in step 806.

Figure 31:
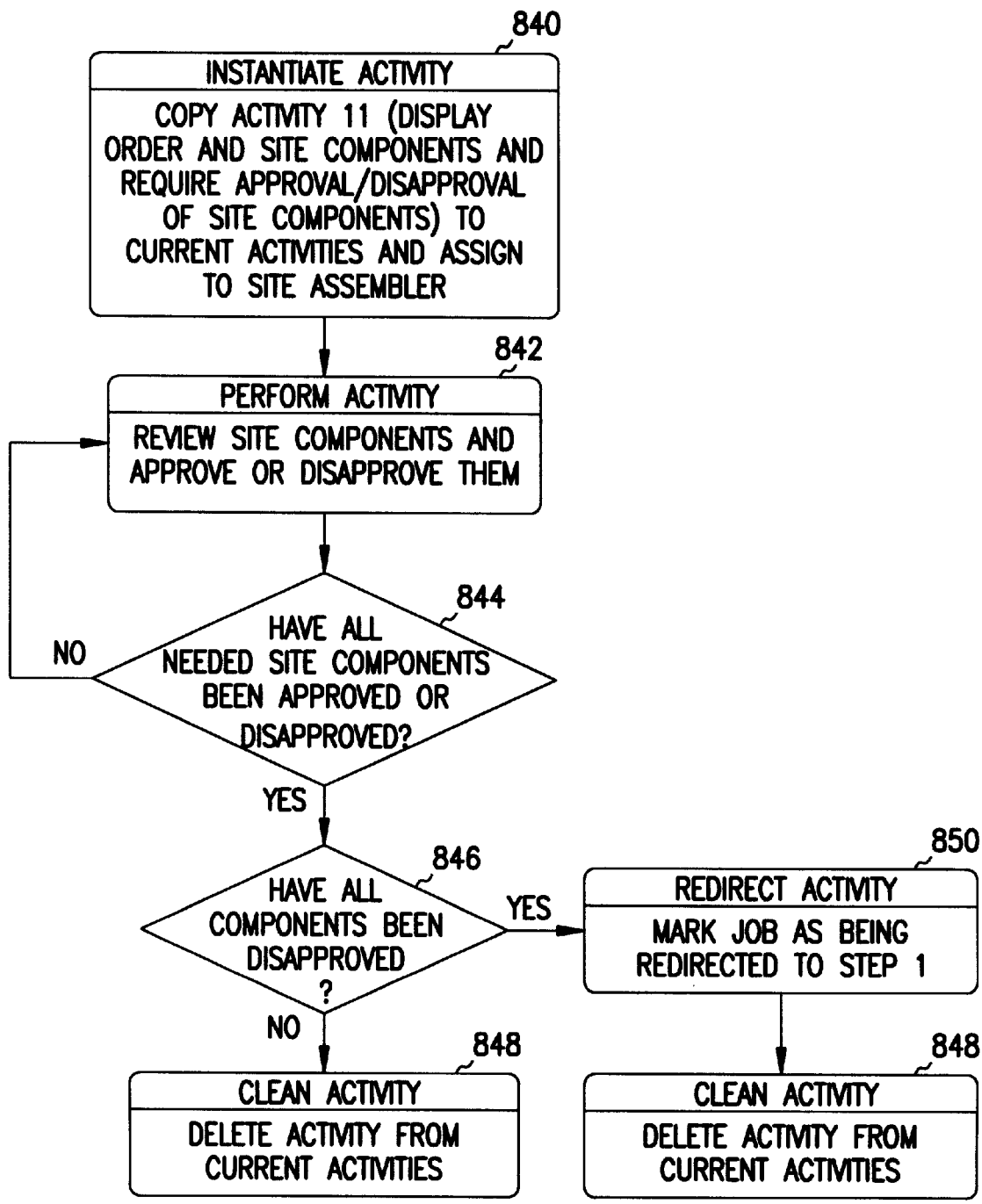

Referring next to FIG. 31, a diagram of the continuing performance of the second process that was instantiated in FIG. 26, specifically the review of the web site components, is shown. In step 840, an eleventh activity—that the order be displayed and the site components be approved or disapproved—is instantiated (copied to the current activities database table, etc.). In step 842, the activity is performed; the site components are reviewed and disapproved or approved. In step 844, if all the components have been reviewed and disapproved or approved, control reverts to step 846. If none of the components have been disapproved, the activity in step 848 is deleted from the current activities database table. Otherwise, in step 850, the eleventh activity is ultimately redirected to the methods of FIGS. 29A, 29B, 29C, 30A, 30B, and 30C, as have been described, and the activity is deleted from the current activities database table in step 848.

Figure 32:
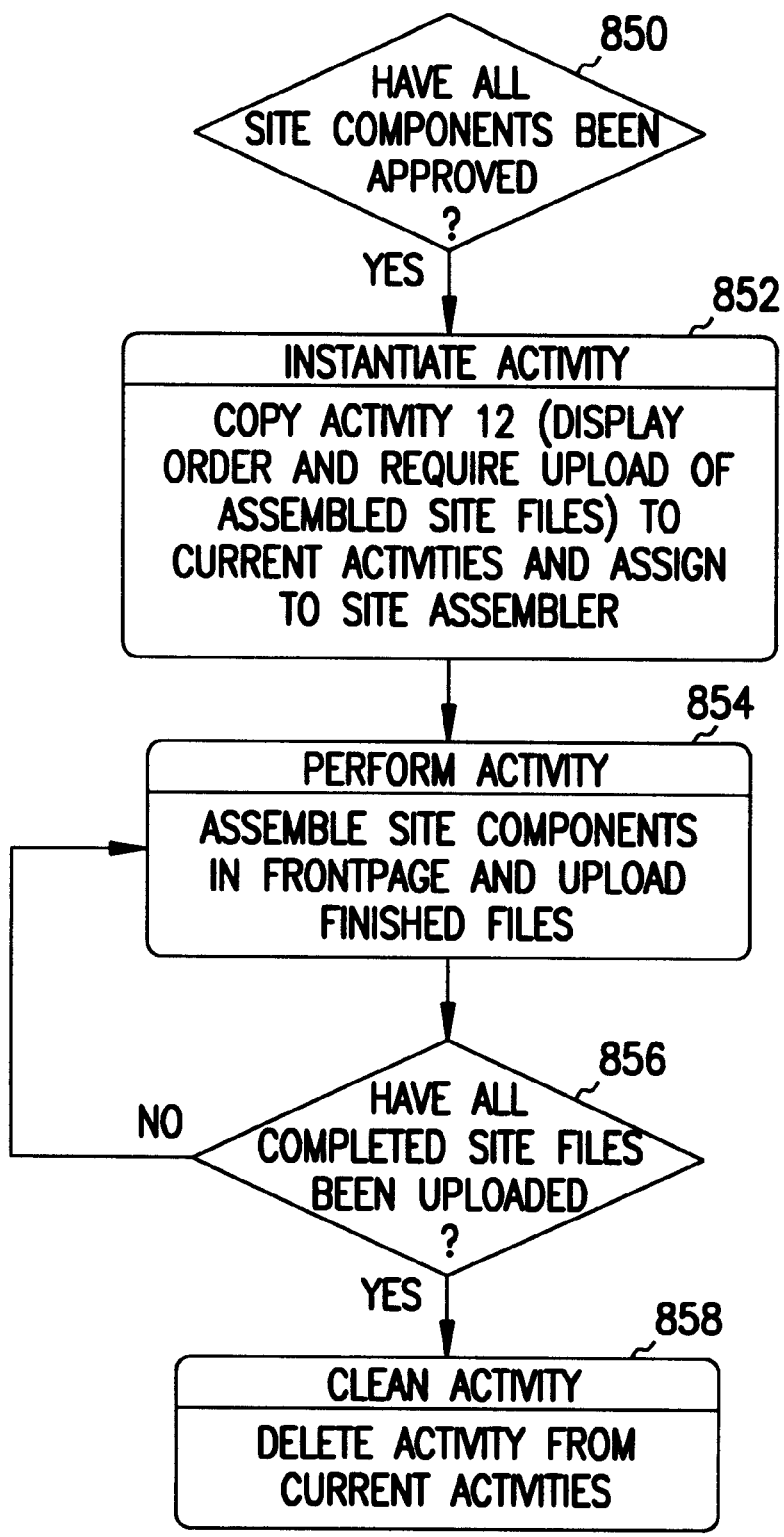

Referring next to FIG. 32, a diagram of the continuing performance of the second process that was instantiated in FIG. 26, specifically the assembly of the web site components, is shown. The method of FIG. 32 is performed following the approval of all the components in step 846 of FIG. 31. In step 852, if all the site components have been approved such that the condition in step 850 is met, a twelfth activity—that the order be displayed and the assembled web site files be uploaded—is instantiated (copied to the current activities database table, etc.). In step 854, the activity is performed; the web site components are assembled and uploaded. Once the activity has been completed in step 856, it is deleted from the current activities database table in step 858.

Figure 33:
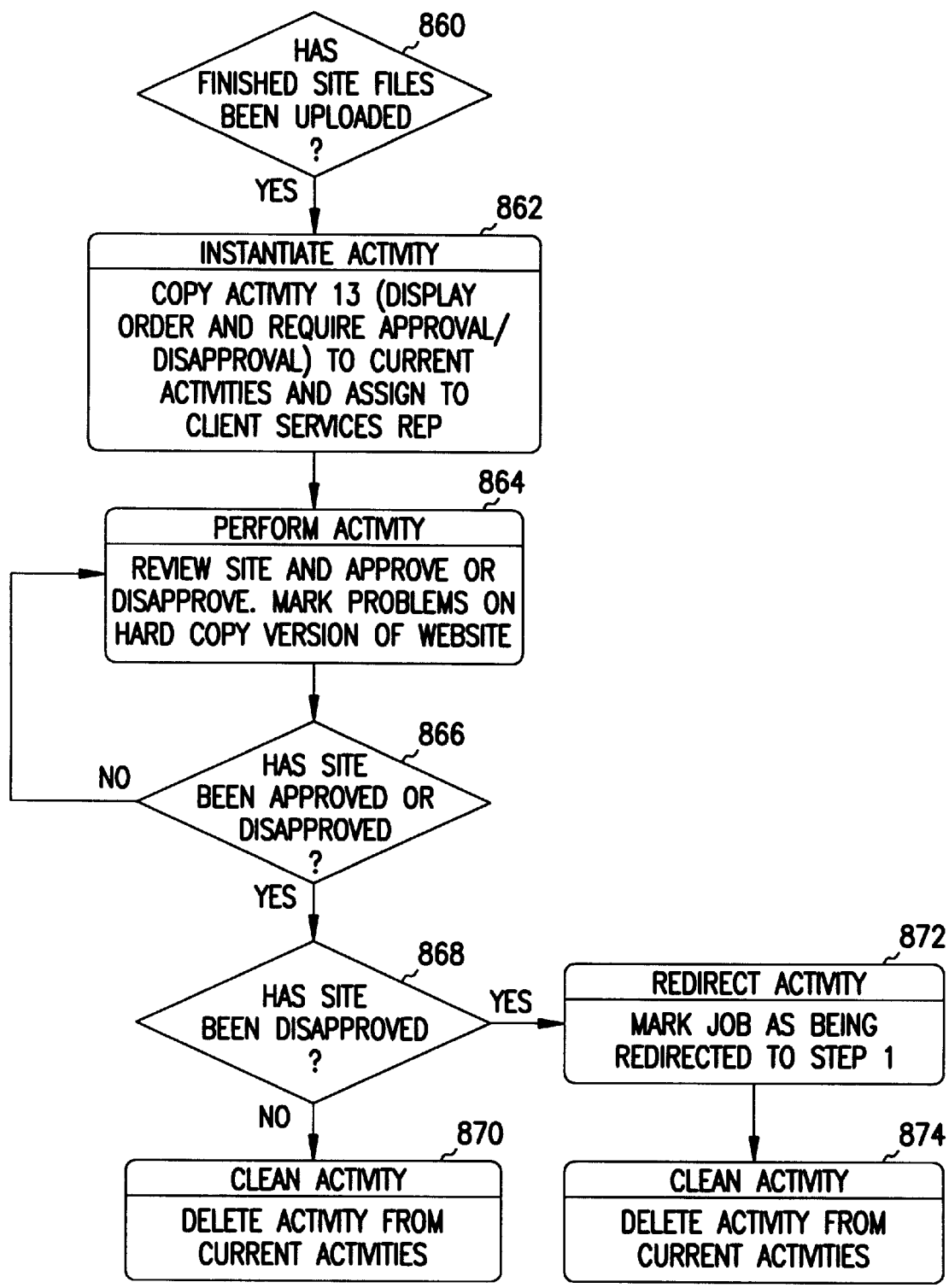

Referring next to FIG. 33, a diagram of the continuing performance of the second process that was instantiated in FIG. 26, specifically the review of the web site by the customer services representative, is shown. In step 862, if all the web site files have been uploaded such that the condition in step 860 is met, a thirteenth activity—that the order be displayed and the web site be approved or disapproved—is instantiated (copied to the current activities database table, etc.). In step 864, the activity is performed; the site is reviewed and approved or disapproved (if disapproved, problems are made on a hard copy of the web site). Once the activity has been completed in step 866, control proceeds to step 868. If the web site has been approved, the activity in step 870 is deleted from the current activities database table. Otherwise, in step 872, the activity is ultimately redirected to the methods of FIGS. 29A, 29B, 29C, 30A, 30B, and 30C, as have been described, and the activity is deleted from the current activities database table in step 874.

Figure 34:
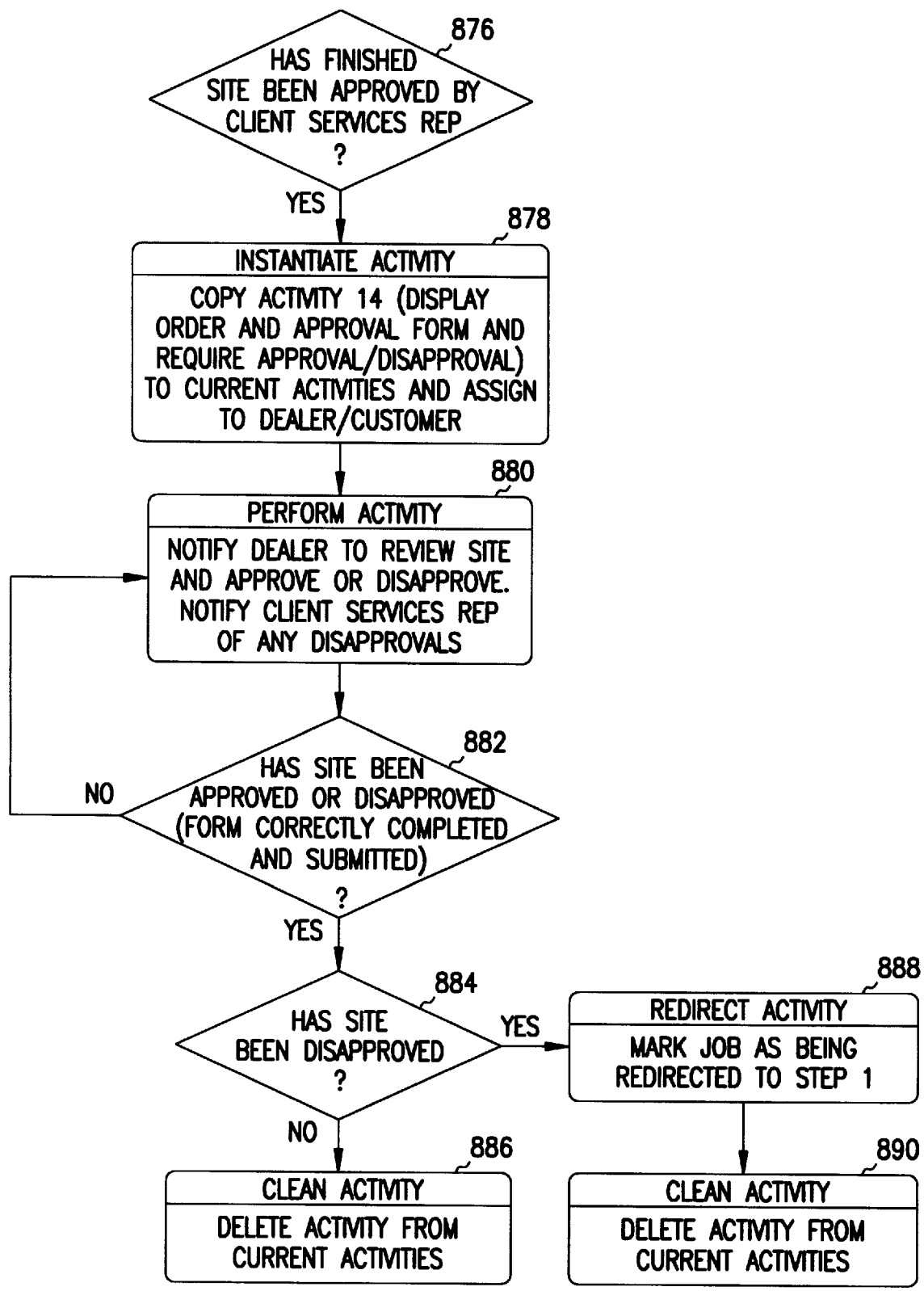

Referring next to FIG. 34, a diagram of the continuing performance of the second process that was instantiated in FIG. 26, specifically the customer/dealer review of the web site, is shown. In step 878, if the web site has been approved by the customer services representative such that the condition in step 876 is met, a fourteenth activity—that an approval form be sent to the dealer and the web site be approved or disapproved by the dealer and/or the customer—is instantiated (copied to the current activities database table, etc.). In step 880, the activity is performed; the site is reviewed and approved or disapproved (if disapproved, problems are made on the provided form). Once the activity has been completed in step 882, control proceeds to step 884. If the web site has been approved, the activity in step 886 is deleted from the current activities database table. Otherwise, in step 88, the activity is ultimately redirected to the methods of FIGS. 29A, 29B, 29C, 30A, 30B, and 30C, as have been described, and the activity is deleted from the current activities database table in step 890.

Figure 35:
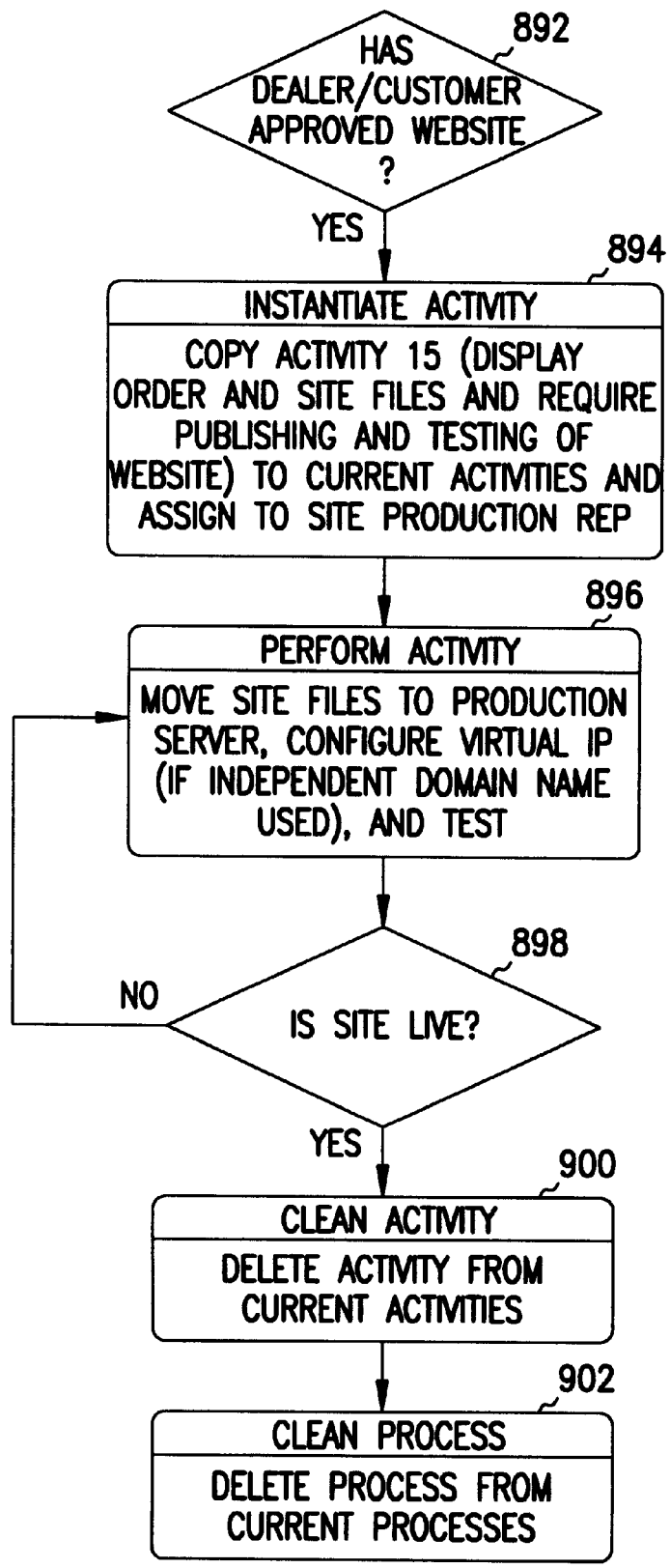

Referring next to FIG. 35, a diagram of the continuing performance of the second process that was instantiated in FIG. 26, specifically the publication of the web site, is shown. In step 894, if the web site has been approved by the dealer/customer such that the condition in step 892 is met, a fifteenth activity—that the order be displayed and the site files be published and the web sited be tested—is instantiated (copied to the current activities database table, etc.). In step 896, the activity is performed; the site files are moved to the production server, a virtual IP address is configured if an independent domain has been selected, and the web site is tested. Once the activity has been completed in step 896, control proceeds to step 898. If the testing of the web site succeeds (i.e., the site is "live"), control proceeds to step 900, where the fifteenth activity is deleted from the current activities database table, then to step 902, where the second process is removed from the current processes database table. Otherwise, control proceeds back to step 896.

Figure 36:
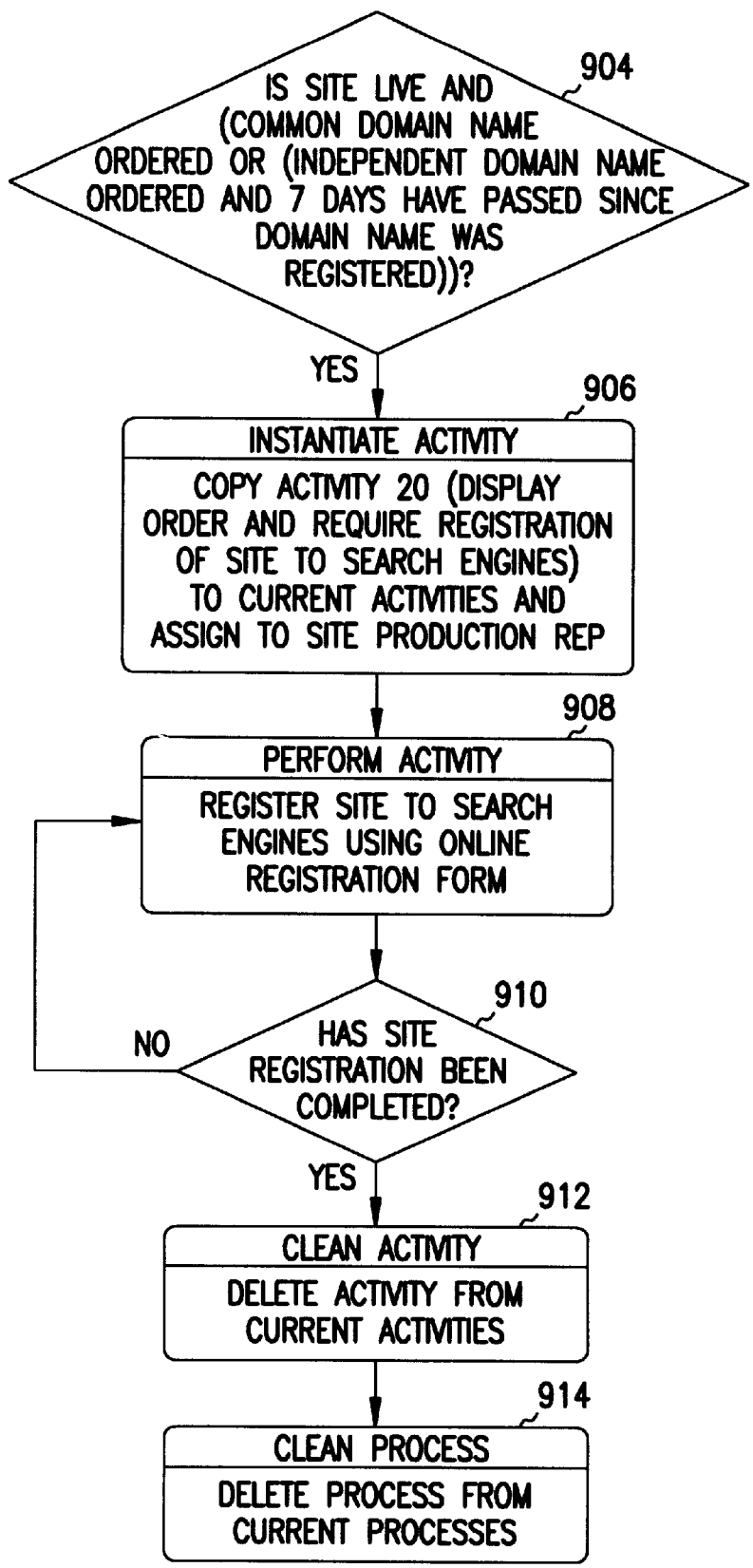

Referring finally to FIG. 36, a diagram of the performance of the third process that was instantiated in FIG. 28, specifically the registration of the web site with Internet search engines, is shown. In step 906, if the site is "live"—i.e., accessible to the public over the web—and if an independent domain name was ordered, seven days have passed since registration with InterNIC such that the condition in step 904 is met, a twentieth activity—that the order be displayed and the site be registered with Internet search engines—is instantiated (copied to the current activities database table, etc.). In step 908, the activity is performed; web site is registered with Internet search engines. Once the activity has been completed in step 908, control proceeds to step 910. If the site has been so registered, control proceeds to step 912, where the activity is deleted from the current activities database table, then to step 914, where the third process is removed from the current processes database table. Otherwise, control proceeds back to step 908.

A description of generalized work flow diagrams according to one embodiment of the invention has been presented. The description has additionally provided how the embodiments of the previous sections of the detailed description relate to and are instantiated from the generalized work flow diagrams. The description has been provided in conjunction with FIGS. 21–36.

Exemplary Coding of an Embodiment of the Invention

In this section, a listing of code to implement one specific embodiment of the invention is given. This embodiment of the invention implements a web generation computerized system as has been previously described. Those of ordinary skill within the art will recognize that the code has been written in the CGI scripting language. For each file, the file name, as well as a brief description of the function of the file, is provided. The files shown, except for Np.ini, are CGI source files, that may be compiled by a compiler application program. Note that only the source files for the actual web generation computerized system have been provided; the source files governing the interface (i.e., the individual web page content, etc.) have not been provided, since they do not relate directly to web generation work flow (i.e., the embodiment of one invention).

CheckST.wml

This file verifies that the session token that the user has just submitted matches one stored in the shared variables metadatabase.

```
<!--- CheckST.wml
    This file verifies that the session token which the user has just submitted
    matches one stored in the shared variables metadatabase. --->
<!--- The active users metadatabase contains the following variables:
        s, r, username, userid, lastAccessTime, admin
    These key names are generated with the following algorithm:
        #"shared.s" & #s# & "netPropulsion" & keyname (as listed above)#
--->
```

-continued

```
<webIf #not(ParameterExists (r) and ParameterExists (s))#>
    <!--- User did not submit r, s --->
    <webSet #STError# = "Our system is not sure that you are a valid user. Please log in again.">
<webElseIf #not(IsNumeric (r) and IsNumeric (s))#>
    <!--- User tried a non-numeric session token --->
    <webSet #STError# = "Our system is not sure that you are a valid user. Please log in again.">
<webElse>
    <webInclude Script="/np/settings.wml">
    <webIf #!parameterExists(treatedAsVar("shared.s" & s & varID & "r"))#>
        <!--- shared variables may have been lost due to a restart of web+ server, so check with db --->
        <webdbQuery name="checkActiveUserTableQry" datasource="#ds#" SQL="select * from NP_ActiveUsers where
        s=#s# and r=#r#">
        <webif #!checkActiveUserTableQry.recordCount#>
            <!--- not an existing session --->
            <webSet #STError#= "Our system is not sure that you are a valid user. Please log in again.">
        <webelse>
            <!--- fix LastST and FirstST --->
            <webset #treatedAsVar("shared." & varID & "LastST")# = #If(parameterExists(treatedAsVar("shared." & varID
& "LastST")),if(treatedAsVar("shared." & varID & "LastST") gt s,treatedAsVar("shared." & varID & "LastST"),s),s)#>
            <webset #treatedAsVar("shared." & varID & "FirstST")# = #If(parameterExists(treatedAsVar("shared." & varID
& "FirstST")),if(treatedAsVar("shared." & varID & "FirstST") lt s,treatedAsVar("shared." & varID & "FirstST"),s),s)#>
                <!--- session token is good, so rebuild the shared variable quasi-table entry --->
                <webSet #treatedAsVar("shared.s" & s & varID & "r")# = #checkActiveUserTableQry.r#>
                <webset #treatedAsVar("shared.s" & s & varID & "UserID")# = #cheekActiveUserTableQry.userID#>
                <webset #treatedAsVar("shared.s" & s & varID & "LastAccessTime")# = #currentDateTime( )#>
                <webset #treatedAsVar("shared.s" & s & varID & "UserName")# = #checkActiveUserTableQry.userName#>
                <webset #treatedAsVar("shared.s" & s & varID & "accessLevel")# = #checkActiveUserTableQry.accessLevel#>
                <webset #treatedAsVar("shared.s" & s & varID & "UserType")# = #checkActiveUserTableQry.UserType#>
                <webset #treatedAsVar("shared.s" & s & varID & "Interface")# = #checkActiveUserTableQry.Interface#>
                <webset #treatedAsVar("shared.s" & s & varID & "RoleID")# = #checkActiveUserTableQry.RoleID#>
        </webif>
    <webElseIf #treatedAsVar("shared.s" & s & varID & "r") != r#>
        <!--- user submitted wrong value for r --->
        <webSet #STError# = "Our system is not sure that you are a valid user. Please log in again.">
    <webelseif #pageQry.recordcount#>
        <webif #treatedAsVar("shared.s" & s & varID & "UserType") != pageQry.UserType && treatedAsVar("shared.s" & s &
varID & "UserType") != "E"#>
            <!--- user is attempting to access a page they don't have access to --->
            <webSet #STError# = "You do not have access to that page.">
        </webif>
    <!webIf>
</webIf>
<!--- Check that there was no session token error. --->
<webIf #ParameterExists (STError)#>
    <!--- Session token was not verified; we'll log the error and have the user log in again. --->
    <!--- Make the user log in again --->
    <webLocation URL = "/cgi-bin/webplus.exe?script=/np/login.wml&message=#URLEncodedFormat(sterror)#">
    <webAbort><!--- Because there was an ST Error --->
</webIf>
<!--- User is legitimate. We'll update the lastAccessTime in the active users shared quasi-table --->
<webset #treatedAsVar("shared.s" & s & varID & "LastAccessTime")# = currentDateTime( )#>
```

Content.wml
This file verifies the user's session token.

```
<!--- verify the user's session token --->
<webdbQuery name="PageQry" datasource ="NetPropulsion" SQL="
select * from NP_Pages where pageID = #strReplace(p,"-",".")#">
<webinclude Script="/np/checkst.wml">
<!-- Get the info for page -->
<!---
<webdbQuery name="PageQry" datasource ="#ds#" SQL="select Links,Title,Cache,DealersNotAllowed,TitleImage,
TitleWidth,TitleHeight from NP_Pages where pageID = #strReplace(p,"-",".")#">
--->
<webset #thisDealer# = ",#treatedAsVar("shared.s" & s & varID & "UserID")#,">
<webif #PageQry.DealersNotAllowed !? thisDealer#>
    <webIf #PageQry.RecordCount#>
        <webSet #PageQryLinks# = #StrReplace (PageQry.Links," "," ")#>
        <webset #PageQryLinks# = #if(PageQryLinks=" ",0,PageQryLinks)#>
        <webDBQuery name = "ButtonQry" datasource = "#ds#" SQL = "select PageID, Title from NP_Pages
            where PageID in (#PageQryLinks#)">
<!---
        <webDBQuery name = "ButtonQry" datasource = "#ds#" SQL = "select PageID, Title from NP_Pages
            where DealersNotAllowed not like '%,#treatedAsVar("shared.s" & s & varID & "UserID")#,%'
            and PageID in ('#PageQryLinks#')">
```

-continued

```
--->
        <webIf #ButtonQry.RecordCount != 0#>
            <webSet #FirstPageLink# = #ButtonQry.PageID#>
        </webIf>
    </webIf>
    <html>
    </head>
    <webIf#! PageQry.Cache#>
        <META HTTP-EQUIV="Pragma" CONTENT="no-cache"></META>
    </webIf>
    <title>Vallon Online</title>
    </head>
    <webInclude script = "#ScriptDir#Interfaces/Interface#treatedAsVar("shared.s" & s & varID & "Interface")#/interfacecontent.wml">
<webelse>
    <br><br><font size="4" color="#FF0000">You do not have access to this feature.</font>
</webif>
</html>
```

Findplan.wml
This file determines which plan the user should see.

```
<!--- Figure Out which plan the user should see --->
<webIf #ParameterExists (s)#>
    <webif #!parameterExists(treatedAsVar("shared.s" & s & varID & "Interface")#>
        <!--- Check the server name --->
        <webSet #HostName# = #CGI.Server_Name#>
        <webDBQuery name = "FindHostPlanQry" datasource = "#ds#" SQL = "select InterfaceID from NP_HostInterfaces
            where HostName = '#HostName#'">
        <webIf #FindHostPlanQry.RecordCount#>
            <webSet #Interface# = #FindHostPlanQry.InterfaceID#>
        <webElse>
            <webSet #Interface# = 0>
        </webIf>
    </webif>
<webElse>
    <!--- Check the server name --->
    <webSet #HostName# = #CGI.Server_Name#>
    <webDBQuery name = "FindHostPlanQry" datasource = "#ds#" SQL = "select InterfaceID from NP_HostInterfaces
        where HostName = '#HostName#'">
    <webIf #FindHostPlanQry.RecordCount#>
        <webSet #Interface# = #FindHostPlanQry.InterfaceID#>
    <webElse>
        <webSet #Interface# = 0>
    <webIf>
</webIf>
```

Login.wml
This file logs in the user.

```
<html><head><title>Net Propulsion Online</title></head>
<webInclude Script="/np/settings.wml">
<!--- Figure out which plan's form is to be shown --->
<webInclude script = "#ScriptDir#Findplan.wml">
<webset #good# = 0>
<webset #error# = 0>
<!--- user has submitted login form, so validate the username/password --->
<webIf #ParameterExists(Login)#>
    <webGetProfile file=#Npini# section="Misc" key="BruteForce" result=#BruteForce# password=#readPasswd#>
    <webGetProfile file=#npINI# section="Misc" key="BruteForceTime" result=#BruteForceTime#password=#readpasswd#>
    <webif #trim(userName) != " "#>
        <webif #trim(password) != " "#>
            <webDBQuery Name="verifyUser" dataSource="#ds#" SQL="select
Users.UserID,Users.CompanyName,Users.RealName,Users.email,Users.Username,Users.password,Users.UserType,Users.AccessLevel,Users.Inte
rFace.Users.NumBadAttempts,Users.LastBadAttempt,
                RolesUsers.RoleID
                from Users inner join RolesUsers on Users.UserID=RolesUsers.UserID where Users.Username='#userName#'
and Users.Password='#password#'">
                <webIf #verifyUser.recordcount=1#>
                    <webIf #verifyUser.NumBadAttempts gte BruteForce &&
(dateDiff("n",verifyUser.LastBadAttempt,CurrentDateTime( )) lt BruteForceTime)#>
                        <!--- User has been locked out due to repeated bad login attempts --->
```

-continued

```
                <webDBQuery name = "IncNumBadAttemptsQry" datasource ="#ds#"
                SQL = "update Users set NumBadAttempts = NumBadAttempts + 1 where UserID = #verifyUser.UserID#">
                <webDBQuery name = "SetLastBadAttemptQry" datasource = "#ds#"
                SQL = "update Users set LastBadAttempt = '#CurrentDateTime( )#'where UserID = #verifyUser.UserID#">
                <webSet #message# = "Sorry, but this account has been de-activated for #bruteForceTime# minutes because of repeated incorrect attempts to log in.<br>
                Please try again at ##dateAdd(""n"",bruteForceTime,CurrentTime( ))## on ##DateFormat(dateAdd(""n"",bruteForceTime,CurrentDateTime( )), ""mm/dd/yyyy"")##.")
            <webelse>
                <webset #good# = 1>
                <webset #userID# = #verityUser.UserID#>
                <webset #userType# =#verifyUser.UserType#>
            </webif>
        <webelse>
            <webdbQuery name="verifyName" datasoruce="ds#"
            SQL="select * from Users where Username='#userName#'">
            <webif #!verifyName.recordcount#>
                <!--- Bad userName --->
                <webset #message# = "Sorry, but you were not found in our list of valid users. Please check your username and log in again.">
                <webElseIf #verifyName.NumBadAttempts gte BruteForce && (dateDiff("n",verifyName.LastBadAttempt,CurrentDateTime( )) It BruteForceTime)#>
                <!--- User bas been locked out due to repeated bad login attempts -->
                <webDBQuery name ="IncNumBadAttemptsQry" datasource ="#ds#"
                SQL ="update Users set NumBadAttempts = NumBadAttempts + 1 where UserID = #verifyName.UserID#">
                <webDBQuery name ="SetLastBadAttemptQry" datasource ="#ds#"
                SQL ="update Users set LastBadAttempt = '#CurrentDateTime( )#'where UserID = #verifyName.UserID#">
                <webSet #message# = "Sorry, but this account has been de-activated for #bruteForceTime# minutes because of repeated incorrect attempts to log in.<br>
                Please try again at ##dateAdd(""n"",bruteForceTime,CurrentTime( ))## on ##DataFormat(dateAdd(""n"",bruteForceTime,CurrentDateTime( )),""mm/dd/yy"")##.">
            <webelse>
                <!-- Bad password --->
                <webDBQuery name ="IncNumBadAttemptsQry" datasource ="#ds#"
                SQL ="update Users set NumBadAttempts = NumBadAttempts + 1 where UserID = #verifyName.UserID#">
                <webDBQuery name ="SetLastBadAttemptQry" datasource = "#ds#"
                SQL ="update Users set LastBadAttempt = '#CurrentDateTime( )#' where UserID = #verifyName.UserID#">
                <webset #message# = "Sorry, but the username and password you entered were not correct. Please try again. <br>Make sure to distinguish between upper- and lower-case letters.">
            </webif>
        </webif>
        <webelse>
            <!--- password was empty --->
            <webset #message# = "Your password must be entered. Please try again. <br>Make sure to distinguish between upper- and lower-case letters#">
        </webif>
    <webelse>
        <!--- username was empty --->
        <webset #message#= "Your username must be entered. Please check your user name and log in again.">
    </webIf>
</webIf>
<!--- Username and password was successfully validated --->
<webif #good#>
    <!--- reset the NumBadAttempts (if there are any) --->
    <webIf #verifyUser.NumBadAttempts gt 0#>
        <webDBQuety name = "ResetNumBadAttemptsQry" datasource ="#ds#"
            SQL = "update Users set NumBadAttempts = 0 where UserID = #verifyUser.UserID#">
    </webIf>
    <webinclude Script ="#scriptdir#stgenerate.wml">
    <!--- and let's get on with the show --->
    <webif #treatedAsVar("shared.s" & s & varID & "UserType") ="E"#>
        <webLocation URL="#URL#&s=#s#&r=#r#&p=2"> <!--- employee has entered --->
    <webelseif #treatedAsVar("shared.s" & s & varID & "UserType") ="D"#>
        <webLocation URL="#URL#&s=#s#&r=#r#&p=1"> <!--- dealer has entered --->
    </webif>
</webif>
<!--- include the Login form --->
<form method="post" action="/cgi-bin/webplus.exc?script=/np/login.wml" target="_top">
<webinclude script= "#ScriptDir#Interfaces/Interface#interface#/loginform.wml">
</form>
</body></html>
```

Np.ini

Unlike the other files, which are .wml files to be compiled by a CGI compiler, the Np.ini file is the .ini file, as known within the art, for the run-time application program.

```
[misc]
BruteForce=5
BruteForceTime=5
MaxSTLifeTime=7
;absolute path leading to the "newsites" directory (where new np sites will be constructed)
AbsolutePath=D:›eb ewsites
;absolute path leading to the "newsites" directory (where new np sites will be constructed)
FilesAbsolutePath=D:›ebffiles
;send domain name registration form to "internic" or "admin"?
```

-continued

```
dnrMailTo=admin
;email address where auto-emails are sent from
emailFrom=info@vallon.com
;send auto-emails to dealers and/or customers (1= send emails, O= don't send emails)
mailCustomer=1
mailDealer=1
```

Settings.wml

This file provides the settings governing the execution of the run-time application program.

```
<webSet #scriptDir# = "/np/">
<webset #varid# = "NetPropulsion">
<webset #imagesDir# = "/NetPropulsionImages/Interfaces/Interface#If(ParameterExists (treatedAsVar("shared.s" & s & varID & "Interface")), treatedAsVar("shared.s" & s & varID & "Interface"), 0)#/">
<webSet #CommonImagesDir# = "NetPropulsionImages/">
<webSet #InterfacePageDir# = "#ScriptDir#Interfaces/Interface#If(ParameterExists (treatedAsVar("shared.s" & s & varID & "Interface")), treatedAsVar("shared.s" & s & varID & "Interface"), 0)#/pageContent/">
<webset #NewSitesDir# = "/newsites/">
<webset #filesDir# = "/Files/">
<webSet #npINI# = "#ScriptDir#np.ini">
<webset #readpasswd# = " ">
<webset #writePasswd# = " ">
<webset #phoneNumberLength# = 10>
<webSet #URL# = "/cgi-bin/webplus.exe?script=#ScriptDir#content.wml">
<webset #ds# = "NetPropulsion"><!--- ODBC data source --->
<webIf #ParameterExists (r) and Parameter Exists (s)#>
    <webSet #Page# = "/cgi-bin/webplus.exe?script=#ScriptDir#content.wml&s=#s#&r=#r#&p=">
    <webSet #IncludePage# = "#ScriptDir#pagecontent/np">
</webIf>
```

Showbuttons.wml

This file shows the option buttons.

```
<!--- Show the option buttons. We assume that PageQry returned a page, and ButtonQry.RecordCount > 0 --->
<table border = 0 cellspacing = 0 cellpadding = 0><tr><td>
<br><br><br><br><br><br><br><br><br>
<!---
<img src = "<webPrint>#ImagesDir#</webPrint>buttons/optionsbar.gif" alt = "Options" width = 146 height = 33 align="top"><br>
--->
<h4>Options</h4>
<webPrint query = "ButtonQry">
    <webIf #PageID != FirstPageLink#>
        <!--- <img src="#ImagesDir#buttons/optionstrip.gif align="top"><br>--->
    </webIf>
    <a href= "#Page##PageID#">#PageQry.Title#</a><br>
    <!---<img border = 0 src = "#ImagesDir#buttons/button#PageID#.gif" align = "top" alt = "#PageQry.Title#" width = 146 height = 18></a><br>--->
</webPrint>
</td></table>
```

Status.wml

This file permits customers and dealers to view the status for a specified order.

```
<!--- this page allows anyone (customers/dealers) to view the status for a specified order (by order ID) --->
<webinclude script="/np/settings.wml">
<html><head>
<title>Vallon Online</title>
<script language="javaScript">
<!---
function verifyForm( ) {
```

```
        var orderNum = document.StatusForm.OrderID.value;
        if(orderNum == " ") {
            alert ("You must enter your Net Propulsion order number to see the status of your order.");
            return(false);
        } else {
            var IntOrderNum = parseInt(orderNum);
            if(isNaN(IntOrderNum)) {
                alert ("You must enter your Net Propulsion order number to see the status of your order.");
                return (false);
            } else {
                document.StatusForm.OrderID.value = IntOrderNum;
                return(true);
            }
        }
    }
}
// -->
</script>
</head>
<body bgcolor="#FFFFFF" text="#000000" "link="#4400AA" alink="#FFFFFF" vlink="666666">
<table width-"99%"><tr><td align=Left">
<webprint><img src="#imagesDir#Titles/smallEye.jpg" width="104" height="79" alt="Vallon Online" align="middle"></webprint></td>
<td align="right"><font size="5">Net Propulsion Order Status</font></td></tr></table>
<center>
<webif #parameterExists(OrderID)#>
    <webdbquery name="OrderQry" datasource=#ds# SQL="select statusID from Orders where Orders.OrderID = #orderID#">
    <webif #OrderQry.recordcount#>
        <webdbquery name="statusQry" datasource=#ds# SQL="select StatusDescription,statusID from Status order by statusID">
        <webif #statusQry.recordcount#>
            <table bgcolor="#EEEEEE" cellpadding=5 cellspacing=0>
            <tr bgcolor="#DDDDDD"><td>Your order's status <webprint>(<b>order #orderID#</b>)</webprint>is shown
in <b>bold</b></td></tr>
            <tr><td>
            <webprint query="statusQry">
                #if(OrderQry.statusID = StatusQry.StatusID,"<b>" & statusDescription &
"</b>",statusDescription)#<br>
            </webprint>
            </td></tr></table>
        </webif>
    <webelse>
        <webprint><font color="##FF0000" size="4">Order Number '#orderID#' is not valid. Please try
again.</font><br><br></webprint>
    </webif>
</webif>
<webprint><form action="/cgi-bin/webplus.exe?script=#scriptdir#status.wml" method="post" name="StatusForm" onSubmit="return
verifyForm( )"></webprint>
<table bgcolor="#EEEEEE" border = 1>
<tr bgcolor="#DDDDDD"><td><b>To view the status of your Net Propulsion order, enter the order number in the blank below.</b></td></tr>
<tr><td align=center> <br>
Order Number: <input type="text" size="10" maxlength="10" name="OrderID" value="">
<input type="submit" value="See Status"><br>
 </td></tr>
</table>
</center>
```

Stgenerate.wml
  This file sets the user's session token.

```
<!--- set the user's session token --->
<webif #!parameterExists(treatedAsVar("shared." & varID & "LastST"))#>
    <webset #treatedAsVar("shared." & varID & "LastST")# = 0>
<!webif>
<webset #treatedAsVar("shared." & varID & "LastST")# = #treatedAsVar("shared." & varID & "LastST") + 1#>
<webset #s# = #treatedAsVar("shared." & varID & "LastST")#>
<!---
<webFileOpen Name = "#scriptDir#STlog.txt" Mode = "Append" As = "LogFile" Ret = #FileReturnCode# Password = #WritePasswd#>
<webSet #LogLine# = #"Create" & chr (9) & "s=" & s & chr (9) & if(parameterExists(treatedAsVar("shared.s" & st & varID &
"LastAccessTime")),"firstST=" & treatedAsVar("shared.s" & st & varID & "firstST")," ") & chr (9) & i(parameterExists(treatedAsVar("shared.s"
& st & varID & "LastAccessTime")),"LastST=" & treatedAsVar("shared.s" & st & varID & "LastST")," ") & chr (9) & CurrentDateTime( )#>
<webFilePutLine file = "LogFile " value = #LogLine# password = #WritePasswd#>
<webFileClose File = "LogFile">
--->
<!-- set the shared variables for the active users metaDatabase --->
<webset #treatedAsVar("shared.s" & s & varID & "r")# = #abs(Format(md (9) * 1000000000, "0"))#>
<webset #r# = #treatedAsVar("shared.s" & s & varID & "r")#>
<webset #treatedAsVar("shared.s" & s & varID & "UserID")# = #userID#>
```

-continued

```
<webset #treatedAsVar("shared.s" & s & varID & "LastAccessTime")# = #CurrentDateTime( )#>
<webset #treatedAsVar("shared.s" & s & varID & "UserName")# = #verifyUser.userName#>
<webset #treatedAsVar("shared.s" & s & varID & "accessLevel")# = #verifyUser.accessLevel#>
<webset #treatedAsVar("shared.s" & s & varID & "UserType")# = #verifyUser.UserType#>
<webset #treatedAsVar("shared.s" & s & varID & "Interface")# = #verifyUser.Interface#>
<webset #treatedAsVar("shared.s" & s & varID & "RoleID")# = #verifyUser.RoleID#>
<!--- insert these shared variables into the ActiveUsers DB table for redundancy. These will only be read in the case
      of problems with the shared variables --->
<webdbQuery name="verifyActiveUserQry" datasource="#ds#" SQL = "select * from NP_ActiveUsers where s=#s#">
<webif #verifyActiveUserQry.recordcount#>
    <webdbQuery name="updateActiveUserQry" datasource="#ds#" sQL = "update NP_ActiveUsers set r=#r#, UserID=#userID#,
    LoginTime='#treatedAsVar("shared.s" & s & varID & "LastAccessTime")#',UserName='#verifyUser.userName#',
accessLevel=#verifyUser.accesslevel#, usertype='#verifyUser.userType#', RoleID=#verifyUser.RoleID#,
    interface=#verifyUser.interface# where s=#s#">
<webelse>
    <webdbquery name="insertActiveUserQry" datasource="#ds#" SQL="insert into NP_ActiveUsers
    (s,r,UserID,LoginTime,UserName,accessLevel,UserType,Interface,RoleID) values (#s#,#r#,#userID#,
    '#treatedAsVar("shared.s" & s & varID & "LastAccessTime")#','#verifyUser.userName#',#verifyUser.accessLevel#,
    '#verifyUser.UserType#',#verifyUser.Interface#,#verifyUser.RoleID#)">
</webif>
<!--- Delete old session tokens --->
<webset #sessionTokenLifeTime# = 1>
<webset #treatedAsVar("shared." & varID & "FirstST")# = #If(parameterExists(treatedAsVar("shared." & varID &
"FirstST")),treatedAsVar("shared." & varID & "FirstST"),0)#>
<webfor #st# = #treatedAsVar("shared." & varID & "FirstST")# to #treatedAsVar("shared." & varID & "LastST")#>
    <webIf #parameterExists(treatedAsVar("shared.s" & st & varID & "LastAccessTime"))#>
        <webif #dateDiff("h",treatedAsVar("shared.s" & st & varID & "LastAccessTime"),currentDateTime( )) gt
SessionTokenLifeTime#>
<!---
<webFileOpen Name = "#scriptDir#STlog.txt" Mode = "Append" As = "LogFile" Ret = #FileReturnCode# Password = #WritePasswd#>
<webSet #LogLine# = #"Delete" & chr (9) & "st=" & st & chr (9) & "firstST=" & treatedAsVar("shared." & varID & "FirstST") & chr (9) &
"LastST=" & treatedAsVar("shared." & varID & "LastST") & chr (9) & if(parameterExists(treatedAsVar("shared.s" & st & varID &
"LastAccessTime")),"lastAccessTime=" & treatedAsVar("shared.s" & st & varID & "LastAccessTime"),"  ") & chr (9) & CurrentDateTime( )#>
<webFilePutLine file = "LogFile" value = #LogLine# password = #WritePasswd#>
<webFileClose File = "LogFile">
--->
            <webDeleteVar #treatedAsVar("shared.s" & st & varID & "r")#>
            <webDeleteVar #treatedAsVar("shared.s" & st & varID & "Username")#>
            <webDeleteVar #treatedAsVar("shared.s" & st & varID & "UserID")#>
            <webDeleteVar #treatedAsVar("shared.s" & st & varID & "LastAccessTime")#>
            <webDeleteVar #treatedAsVar("shared.s" & st & varID & "accessLevel")#>
            <webDeleteVar #treatedAsVar("shared.s" & st & varID & "UserType")#>
            <webDeleteVar #treatedAsVar("shared.s" & st & varID & "Interface")#>
            <webDeleteVar #treatedAsVar("shared.s" & st & varID & "RoleID")#>
        </webif>
    <webelse>
        <webif #st = treatedAsVar("shared." & varID & "firstST")#>
<!---
<webFileOpen Name = "#scriptDir#STlog.txt" Mode = "Append" As = "LogFile" Ret = #FileReturnCode# Password = #WritePasswd#>
<webSet #LogLine# = #"Delete" & chr (9) & "st=" & st & chr (9) & "firstST=" & treatedAsVar("shared." & varID & "FirstST") & chr (9) &
"LastST=" & treatedAsVar("shared." & varID & "LastST") & chr (9) & if(parameterExists(treatedAsVar("shared.s" & st & varID &
"LastAccessTime")),"LastAccessTime=" & treatedAsVar("shared.s" & st & varID & "LastAccessTime"),"  ") & chr (9) & CurrentDateTime( )#>
<webFilePutLine file = "LogFile" value = #LogLine# password = #WritePasswd#>
<webFileClose File = "LogFile">
--->
            <webDeleteVar #treatedAsVar("shared.s" & st & "varID" & "r")#>
            <webDeleteVar #treatedAsVar("shared.s" & st & varID & "Username")#>
            <webDeleteVar #treatedAsVar("shared.s" & st & varID & "UserID")#>
            <webDeleteVar #treatedAsVar("shared.s" & st & varID & "LastAccessTime")#>
            <webDeleteVar #treatedAsVar("shared.s" & st & varID & "accessLevel")#>
            <webDeleteVar #treatedAsVar("shared.s" & st & varID & "UserType")#>
            <webDeleteVar #treatedAsVar("shared.s" & st & varID & "Interface")#>
            <webDeleteVar #treatedAsVar("shared.s" & st & varID & "RoleID")#>
            <webset #treatedAsVar("shared." & varID & "firstST")# = #treatedAsVar("shared." & varID & "firstST") + 1#>
        </webif>
    <webif>
</webfor>
<!---Delete old users from the ActiveUsers DB table--->
<!---
<webGetProfile file=#npINI# section="Misc" key="MaxSTLifeTime" result=#MaxSTLifeTime# password=#readPasswd#>
<webDBQuery name = "DeleteOldUsersQry" datasource = "#ds#" SQL = "delete from NP_ActiveUsers
    where DateDiff (hour, LoginTime, GetDate( )) >#MaxSTLifeTime * 24#">
--->
```

Conclusion

A computerized work flow system, and a specific instantiation of that work flow system as it applies to web site generation, has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized method for tracking work flow of a function comprising:

selecting one of a list of defined processes;

instantiating the one of the list of defined processes as a current process;

adding the current process to a database of current processes;

instantiating one of a list of activities for the current process, wherein each activity may be performed independently from the other activities;

assigning the performance of the one of the list of defined activities as a role to a user;

adding the one of the list of activities to a database of current activities; and, removing the one of the list of activities from the database of current activities upon completion by the user.

2. The computerized method of claim 1, further comprising removing the current process from the database of current processes upon completion of the activities within the list of defined activities for the current process.

3. The computerized method of claim 1, wherein the function comprises web site generation.

4. The computerized method of claim 3, wherein the process comprises creating a new web site.

5. The computerized method of claim 3, wherein the list of activities comprises:

completing an online web site order form;

confirming one of a new domain name and a new company identifier; and, assigning a URL address for the new web site.

6. The computerized method of claim 3, wherein the list of activities comprises starting a second process, the second process having a second list of activities comprising:

completing header graphics for the web site;

completing textual content for the web site; and, completing button images for the web site.

7. The computerized method of claim 6, wherein the second list of activities further comprises completing site enhancements for the web site.

8. The computerized method of claim 6, wherein the second list of activities further comprises processing customer-supplied images for the web site.

9. The computerized method of claim 6, wherein the second list of activities further comprises processing ordered stock photographs for the web site.

10. The computerized method of claim 6, wherein the second list of activities further comprises approving created components of the web site.

11. The computerized method of claim 10, wherein the second list of activities further comprises assembling the created components of the web site.

12. The computerized method of claim 11, wherein the second list of activities further comprises approving the created components of the web site as assembled.

13. The computerized method of claim 12, wherein the second list of activities further comprises requesting customer approval of the created components of the web site as assembled.

14. The computerized method of claim 13, wherein the second list of activities further comprises publishing and testing the web site.

15. The computerized method of claim 3, wherein the list of activities comprises:

sending a web site completion confirmation form; and, sending a web site generation invoice.

16. The computerized method of claim 3, wherein the list of activities comprises returning customer-submitted artwork.

17. The computerized method of claim 3, wherein the list of activities comprises setting hosting and maintenance plan information.

18. The computerized method of claim 3, wherein the list of activities comprises starting a third process, the third process having a third list of activities comprising registering the web site with at least one Internet search engine.

* * * * *